United States Patent
Patil et al.

(10) Patent No.: US 12,324,009 B2
(45) Date of Patent: Jun. 3, 2025

(54) EARLY CRITICAL UPDATE INDICATIONS FOR MULTI-LINK DEVICES

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Sai Yiu Duncan Ho, San Diego, CA (US); Yanjun Sun, San Diego, CA (US); Sandip Homchaudhuri, San Jose, CA (US); Yongchun Xiao, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/188,307

(22) Filed: Mar. 22, 2023

(65) Prior Publication Data

US 2023/0224939 A1    Jul. 13, 2023

Related U.S. Application Data

(63) Continuation of application No. 17/225,086, filed on Apr. 7, 2021, now Pat. No. 11,778,645.
(Continued)

(51) Int. Cl.
*H04W 72/53* (2023.01)
*H04W 40/24* (2009.01)
(Continued)

(52) U.S. Cl.
CPC ......... *H04W 72/53* (2023.01); *H04W 40/244* (2013.01); *H04W 72/0446* (2013.01); *H04W 72/27* (2023.01); *H04W 92/20* (2013.01)

(58) Field of Classification Search
CPC ............... H04W 72/53; H04W 40/244; H04W 72/0446; H04W 72/27; H04W 92/20;
(Continued)

(56) References Cited

U.S. PATENT DOCUMENTS 11,324,046 B2   5/2022   Jang et al.
11,382,158 B2   7/2022   Zhang et al.
(Continued)

FOREIGN PATENT DOCUMENTS

KR    20200030981 A    3/2020
TW       201906452 A    2/2019
(Continued)

OTHER PUBLICATIONS

Gan M., et al., (HUAWEI): "Power Save for Multi-Link," IEEE Draft, 11-19-1988-01-00BE-POWER-SAVE-FOR-MULTI-LINK, IEEE-SA Mentor, Piscataway, NJ USA, vol. 802.11 EHT, 802.11be, No. 1, Nov. 2019, (Nov. 11, 2019), Jan. 15, 2020 (Jan. 15, 2020), pp. 1-18, XP068165328, Retrieved from the Internet: URL: https://mentor.ieee.org/802.11/dcn/19/11-19-1988-01-00be-power-save-for-multi-link.pptx title="Link: https://mentor.ieee.org/802.11/dcn/19/11-19-1988-01-00be-power-save-for-multi-link.pptx">https://mentor.ieee.org/802.11/dcn/19/11-19-1988-01-00be-power-save-for-multi-link.pptx [retrieved on Jan. 15, 2020], p. 2-p. 10.
(Continued)

*Primary Examiner* — Chae S Lee
(74) *Attorney, Agent, or Firm* — Kevin M. Donnelly; Holland & Hart LLP

(57) ABSTRACT

An access point (AP) of an AP multi-link device (MLD) is associated with a first communication link, and one or more secondary APs of the AP MLD are associated with one or more respective secondary communication links of the AP MLD. The first AP of the AP MLD generates a frame including a first change sequence field, one or more sec-
(Continued)

ondary change sequence fields, and a critical update flag subfield. The first change sequence field carries a value of the most-recent critical update for the first AP. The one or more secondary change sequence fields carry values of the most-recent critical updates for the one or more respective secondary APs. The critical update flag subfield carries an indication of a change in value of at least one of the secondary change sequence fields. The first AP transmits the frame over the first communication link of the AP MLD.

20 Claims, 32 Drawing Sheets

Related U.S. Application Data

(60) Provisional application No. 63/075,816, filed on Sep. 8, 2020, provisional application No. 63/051,375, filed on Jul. 13, 2020, provisional application No. 63/007,299, filed on Apr. 8, 2020.

(51) Int. Cl.
*H04W 72/0446* (2023.01)
*H04W 72/27* (2023.01)
*H04W 92/20* (2009.01)

(58) Field of Classification Search
CPC ..... H04W 76/19; H04W 84/12; H04W 76/15; H04W 74/006; H04W 48/16; H04W 74/002; H04L 45/16; H04L 45/24; H04B 7/0413
See application file for complete search history.

(56) References Cited

U.S. PATENT DOCUMENTS

| | | |
|---|---|---|
| 11,540,200 B2 | 12/2022 | Chu et al. |
| 11,596,021 B2 | 2/2023 | Cariou et al. |
| 2015/0282157 A1 | 10/2015 | Kim et al. |
| 2016/0360473 A1 | 12/2016 | Kim et al. |
| 2017/0033850 A1 | 2/2017 | Kasher et al. |
| 2018/0206284 A1 | 7/2018 | Zhou et al. |
| 2019/0150214 A1 | 5/2019 | Zhou et al. |
| 2019/0158413 A1 | 5/2019 | Patil et al. |
| 2019/0335454 A1 | 10/2019 | Huang et al. |
| 2020/0037288 A1 | 1/2020 | Huang et al. |
| 2020/0045555 A1 | 2/2020 | Huang et al. |
| 2020/0404737 A1* | 12/2020 | Cariou ............... H04W 48/14 |
| 2021/0029588 A1* | 1/2021 | Cariou ............... H04W 40/244 |
| 2021/0045175 A1 | 2/2021 | Huang et al. |
| 2021/0051574 A1 | 2/2021 | Chu et al. |
| 2021/0112490 A1* | 4/2021 | Cariou ............... H04W 84/12 |
| 2021/0212156 A1 | 7/2021 | Kwon et al. |
| 2021/0250848 A1 | 8/2021 | Seok et al. |
| 2021/0321243 A1 | 10/2021 | Patil et al. |
| 2021/0321410 A1 | 10/2021 | Patil et al. |
| 2022/0225236 A1 | 7/2022 | Bang et al. |
| 2022/0255849 A1* | 8/2022 | Huang ............... H04W 28/06 |
| 2023/0164859 A1 | 5/2023 | Jang et al. |
| 2023/0403545 A1 | 12/2023 | Patil et al. |

FOREIGN PATENT DOCUMENTS

| | | |
|---|---|---|
| TW | 201933922 A | 8/2019 |
| WO | WO2021201504 A1 | 10/2021 |

OTHER PUBLICATIONS

International Search Report and Written Opinion—PCT/US2021/026336—ISA/EPO—Jul. 23, 2021.
International Search Report and Written Opinion—PCT/US2021/026353—ISA/EPO—Jul. 22, 2021.
Laurent C., et al., "Multi-Link Discovery-Part 1", Mar. 15, 2020 (Mar. 15, 2020), XP055824264, Retrieved from the Internet: URL: https://mentor.ieee.org/802.11/dcn/20/11-20-0389-00-00be-multi-link-discovery-part-1.pptx>https://mentor.ieee.org/802.11/dcn/20/11-20-0389-00-00be-multi-link-discovery-part-1.pptx. [Retrieved on Jul. 14, 2021], 12 Pages, p. 2-p. 7.
Laurent C., et al., "Multi-Link Discovery—Part 2", Feb. 2020, Mar. 15, 2020 (Mar. 15, 2020) , XP055824267 , Retrieved from the Internet: URL: https://mentor.ieee.org/802.11/dcn/20/11-20-0390-00-00be-multi-link-discovery-part-2.pptx>https://mentor.ieee.org/802.11/dcn/20/11-20-0390-00-00be-multi-link-discovery-part-2.pptx. [Retrieved on Jul. 14, 2021], 12 pages, p. 2-p. 8.
Patil A., et al., (Qualcomm): "MLO Discovery Signaling", MLO: Discovery and Beacon-Bloating, IEEE Draft, 11-20-0356-03-00BE-MLO-Discovery-and-Beacon-Bloating, IEEE-SA Mentor, Piscataway, NJ, USA vol. 802.11 EHT, 802.11be, Mar. 15, 2020 (Mar. 15, 2020), pp. 1-16, XP068167069, Retrieved from the Internet: URL: mentor.ieee.org/802.11/dcn/20/11-20-0356-00-00be-mlo-discovery-and-beacon-bloating.pptx>https://mentor.ieee.org/802.11/dcn/20/11-20-0356-00-00be-mlo-discovery-and-beacon-bloating.pptx. [retrieved on Mar. 15, 2020], p. 2-p. 3.
Seok Y., et al., "Multi-Link BSS Parameter Update," Name Affiliations Address Phone Email, Mar. 15, 2020 (Mar. 15, 2020), XP055683145, 14 pages, Retrieved from the Internet : URL: https://mentor.ieee.org/802.11/dcn/20/11-20-0337-00-00be-multi-link-bss-parameter-update.pptx title="Link: https://mentor.ieee.org/802.11/dcn/20/11-20-0337-00-00be-multi-link-bss-parameter-update.pptx">https://mentor.ieee.org/802.11/dcn/20/11-20-0337-00-00be-multi-link-bss-parameter-update.pptx [retrieved on Apr. 6, 2020] p. 2-p. 11.
Cariou L(Intel)., et al., "Multi-Link Discovery—Part 1", IEEE 802.11-20/0389r2, IEEE, Feb. 2020, Mar. 15, 2020, pp. 4 to 6, pp. 1-12.
Seok Y., et al., "Multi-link BSS Parameter Update", IEEE802.11-20, Mar. 13, 2020, doc.: IEEE 802.11-20/0337r0, Jan. 2020, pp. 1-14.
Seok Y(Mediatek Inc)., et al., "Multi-Link BSS Parameter Update", IEEE 802.11-20/0337r0, Jan. 2020, IEEE, Mar. 13, 2020, pp. 3 to 10 and 13 to 14, pp. 1-14.
Taiwan Search Report—TW110112693—TIPO—Aug. 24, 2024 (203769TW).
Taiwan Search Report—TW110112757—TIPO—Sep. 21, 2024 (206629TW).
Cariou L(Intel)., et al., "Multi-Link Discovery—Part 1", IEEE 802.11-20/0389r0, IEEE, Feb. 2020, Mar. 15, 2020, pp. 1-12.
Gan M (Huawei) ., et al., "Power Save for Multi-Link," doc: IEEE 802.11-19/1988-01-00be, Nov. 11, 2019, pp. 1-18.

* cited by examiner

1600

| Element ID 1601 | Length 1602 | Element ID Extension 1603 | Common Parameters 1604 | Optional Subelements 1605 |

| Subelement 1611 | Length 1612 | Data 1613 |

| Element ID 1621 | Length 1624 | Element ID Extension 1621 | Control 1624 | Operating Class 1624 | Channel Number 1626 | BSSID 1627 | TSF Offset 1628 | Beacon Interval 1629 |

| Link ID 1641 | Active Link 1642 | Independent MLA Bitmap 1643 | Anchor 1644 |

| Element ID 1631 | Length 1632 | Element ID Extension 1633 | Data 1634 |

*Figure 16C*

EARLY CRITICAL UPDATE INDICATIONS FOR MULTI-LINK DEVICES

CROSS-REFERENCE TO RELATED APPLICATIONS

The present application for patent is a Continuation of U.S. patent application Ser. No. 17/225,086 entitled "EARLY CRITICAL UPDATE INDICATIONS FOR MULTI-LINK DEVICES" filed Apr. 7, 2021, which claims priority to U.S. Provisional Patent Application No. 63/051,375 entitled "EARLY CRITICAL UPDATE INDICATIONS FOR MULTI-LINK DEVICES" and filed on Jul. 13, 2020, to U.S. Provisional Patent Application No. 63/007,299 entitled "INDICATIONS OF CRITICAL UPDATES FOR MULTI-LINK DEVICES" and filed on Apr. 8, 2020, and to U.S. Provisional Patent Application No. 63/075,816 entitled "CCONTEXT UPDATES FOR MULTI-LINK DEVICES" and filed on Sep. 8, 2020, all of which are assigned to the assignee hereof. The disclosures of all prior applications are considered part of and are incorporated by reference in this patent application.

TECHNICAL FIELD

This disclosure relates generally to wireless communication, and more specifically, to indications of critical updates for communication links associated with multi-link devices (MLDs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To improve data throughput, the AP may communicate with one or more STAs over multiple concurrent communication links. Each of the communication links may be of various bandwidths, for example, by bonding a number of 20 MHz-wide channels together to form 40 MHz-wide channels, 80 MHz-wide channels, or 160 MHz-wide channels. The AP may establish BSSs on any of the different communication links, and therefore it is desirable to improve communication between the AP and the one or more STAs over each of the communication links.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by an access point (AP) multi-link device (MLD) including a first AP associated with a first communication link of the AP MLD and including one or more secondary APs associated with one or more respective secondary communication links of the AP MLD. In some implementations, the method may include generating a frame including a first change sequence field, one or more secondary change sequence fields, and a critical update flag subfield. In some instances, the first change sequence field may carry a value of the most-recent critical update for the first AP of the AP MLD, the one or more secondary change sequence fields may carry values of the most-recent critical updates for the one or more respective secondary APs of the AP MLD, and the critical update flag subfield may carry an indication of a change in value of at least one of the one or more secondary change sequence fields. The method may also include transmitting the frame over the first communication link of the AP MLD.

In some implementations, the frame may be one of a beacon frame, a probe response frame, an association response frame, a reassociation response frame, or a fast initial link setup (FILS) discovery frame. The most-recent critical update for the first AP may correspond to a change in one or more operation parameters of a basic service set (BSS) associated with the first AP of the AP MLD. The most-recent critical update for a respective secondary AP may correspond to a change in one or more operation parameters of the BSS associated with the respective secondary AP of the AP MLD. In some instances, the one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the first change sequence field may be included in a Multi-Link Element (MLE) of the frame, and the one or more secondary change sequence fields may be included in one or more respective Reduced Neighbor Report (RNR) elements of the frame. In some instances, the MLE may also include one or more per-link profile subelements, each per-link profile subelement carrying a partial set of operation parameters or a complete set of operation parameters of a BSS associated with a respective secondary AP of the AP MLD.

The critical update flag subfield may be carried in each beacon frame or probe response frame transmitted by the first AP during a time period. In some instances, the critical update flag subfield may be carried in a Capability Information field of the beacon frame or probe response frame. The time period may be a DTIM period. In some implementations, the method may also include transmitting all beacon frames within a DTIM period with the value carried in the critical update flag subfield.

In some implementations, the method may also include receiving a notification of the critical update for a respective secondary AP of the AP MLD. The method may also include incrementing the value carried in the secondary change sequence field associated with the respective secondary AP in response to the notification. The method may also include updating the critical update flag subfield in response to incrementing the value carried in the secondary change sequence field associated with the respective secondary AP.

Another innovative aspect of the subject matter described in this disclosure can be implemented in a wireless communication device. In some implementations, the wireless communication device may be an AP MLD including a first AP associated with a first communication link of the AP MLD and including one or more secondary APs associated with one or more respective secondary communication links of the AP MLD. The AP MLD may include at least one modem, at least one processor communicatively coupled with the at least one modem, and at least one memory communicatively coupled with the at least one processor. The memory may store processor-readable code that, when executed by the at least one processor in conjunction with the at least one modem, causes the AP MLD to perform operations including generating a frame including a first change sequence field, one or more secondary change sequence fields, and a critical update flag subfield. In some instances, the first change sequence field may carry a value of the most-recent critical update for the first AP of the AP MLD, the one or more secondary change sequence fields may carry values of the most-recent critical updates for the one or more respective secondary APs of the AP MLD, and the critical update flag subfield may carry an indication of a change in value of at least one of the one or more secondary change sequence fields. The operations may also include transmitting the frame over the first communication link of the AP MLD.

In some implementations, the frame may be one of a beacon frame, a probe response frame, an association response frame, a reassociation response frame, or a FILS discovery frame. The most-recent critical update for the first AP may correspond to a change in one or more operation parameters of a BSS associated with the first AP of the AP MLD. The most-recent critical update for a respective secondary AP may correspond to a change in one or more operation parameters of the BSS associated with the respective secondary AP of the AP MLD. In some instances, the one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the first change sequence field may be included in a Multi-Link Element (MLE) of the frame, and the one or more secondary change sequence fields may be included in one or more respective Reduced Neighbor Report (RNR) elements of the frame. In some instances, the MLE may also include one or more per-link profile subelements, each per-link profile subelement carrying a partial set of operation parameters or a complete set of operation parameters of a BSS associated with a respective secondary AP of the AP MLD.

The critical update flag subfield may be carried in each beacon frame or probe response frame transmitted by the first AP during a time period. In some instances, the critical update flag subfield may be carried in a Capability Information field of the beacon frame or probe response frame. The time period may be a DTIM period. In some implementations, the operations may also include transmitting all beacon frames within a DTIM period with the value carried in the critical update flag subfield.

In some implementations, the operations may also include receiving a notification of the critical update for a respective secondary AP of the AP MLD. The operations may also include incrementing the value carried in the secondary change sequence field associated with the respective secondary AP in response to the notification. The operations may also include updating the critical update flag subfield in response to incrementing the value carried in the secondary change sequence field associated with the respective secondary AP.

Another innovative aspect of the subject matter described in this disclosure can be implemented in a method for wireless communication. The method may be performed by a wireless station (STA) of a STA MLD, and may include associating with a first AP of an AP MLD that also includes one or more secondary APs associated with one or more respective secondary communication links of the AP MLD. The method may also include receiving a frame from the first AP of the AP MLD over a first communication link of the AP MLD. The frame may include a first change sequence field, one or more secondary change sequence fields, and a critical update flag subfield. In some instances, the first change sequence field may carry a value of the most-recent critical update for the first AP of the AP MLD, the one or more secondary change sequence fields may carry values of the most-recent critical updates for the one or more respective secondary APs of the AP MLD, and the critical update flag subfield may carry an indication of a change in value of at least one of the secondary change sequence fields.

In some implementations, the frame may be one of a beacon frame, a probe response frame, an association response frame, a reassociation response frame, or a FILS discovery frame. The most-recent critical update for the first AP may correspond to a change in one or more operation parameters of a BSS associated with the first AP of the AP MLD. The most-recent critical update for a respective secondary AP may correspond to a change in one or more operation parameters of the BSS associated with the respective secondary AP of the AP MLD. In some instances, the one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the first change sequence field may be included in a Multi-Link Element (MLE) of the frame, and the one or more secondary change sequence fields may be included in one or more respective Reduced Neighbor Report (RNR) elements of the frame. In some instances, the MLE may also include one or more per-link profile subelements, each per-link profile subelement carrying a partial set of operation parameters or a complete set of operation parameters of a BSS associated with a respective secondary AP of the AP MLD.

In some implementations, the STA MLD may receive the frame by waking up from a power save mode, sequentially decoding a plurality of fields or elements of the beacon frame, determining that the critical update flag subfield indicates a change in value of at least one of the first change sequence field or the one or more secondary change sequence fields, and continuing the sequential decoding of the plurality of fields or elements of the beacon frame at least until the first change sequence field is decoded, irrespective of information carried in a traffic indication map (TIM) element of the beacon frame.

Another innovative aspect of the subject matter described in this disclosure can be implemented in a wireless communication device. In some implementations, the wireless communication device may be a STA of a STA MLD. The STA MLD may include at least one modem, at least one processor communicatively coupled with the at least one modem, and at least one memory communicatively coupled with the at least one processor. The memory may store processor-readable code that, when executed by the at least one processor in conjunction with the at least one modem, causes the STA MLD to perform operations including associating with a first AP of an AP MLD that also includes one or more secondary APs associated with one or more respective secondary communication links of the AP MLD. The operations may also include receiving a frame from the first AP of the AP MLD over a first communication link of the AP MLD. The frame may include a first change sequence field, one or more secondary change sequence fields, and a critical update flag subfield. In some instances, the first change sequence field may carry a value of the most-recent critical update for the first AP of the AP MLD, the one or more secondary change sequence fields may carry values of the most-recent critical updates for the one or more respective secondary APs of the AP MLD, and the critical update flag subfield may carry an indication of a change in value of at least one of the secondary change sequence fields.

In some implementations, the frame may be one of a beacon frame, a probe response frame, an association response frame, a reassociation response frame, or a FILS discovery frame. The most-recent critical update for the first AP may correspond to a change in one or more operation parameters of a BSS associated with the first AP of the AP MLD. The most-recent critical update for a respective secondary AP may correspond to a change in one or more operation parameters of the BSS associated with the respective secondary AP of the AP MLD. In some instances, the one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the first change sequence field may be included in a Multi-Link Element (MLE) of the frame, and the one or more secondary change sequence fields may be included in one or more respective Reduced Neighbor Report (RNR) elements of the frame. In some instances, the MLE may also include one or more per-link profile subelements, each per-link profile subelements carrying a partial set of operation parameters or a complete set of operation parameters of a BSS associated with a respective secondary AP of the AP MLD.

In some implementations, the STA MLD may receive the frame by waking up from a power save mode, sequentially decoding a plurality of fields or elements of the beacon frame, determining that the critical update flag subfield indicates a change in value of at least one of the first change sequence field or the one or more secondary change sequence fields, and continuing the sequential decoding of the plurality of fields or elements of the beacon frame at least until the first change sequence field is decoded, irrespective of information carried in a traffic indication map (TIM) element of the beacon frame.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 16A shows an example MLE usable for communications between wireless communication devices.

FIG. 16B shows an example data field of the MLE of FIG. 16A.

FIG. 16C shows another example data field of the MLE of FIG. 16A.

Like reference numbers and designations in the various drawings indicate like elements.

DETAILED DESCRIPTION

Figure 1:
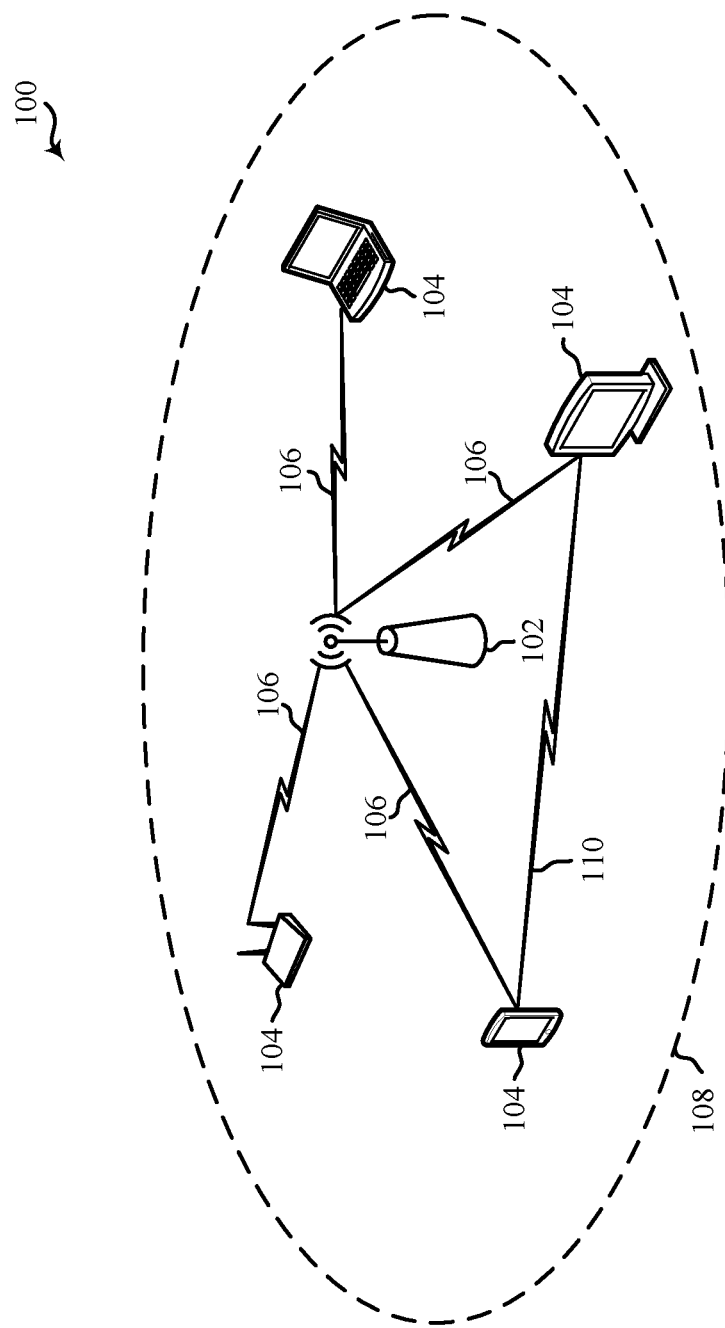
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to multi-link (ML) communications, and specifically to establishing an ML communication session between multi-link devices (MLDs) such as (but not limited to) AP MLDs and STA MLDs. Specifically, aspects of the present disclosure provide a single ML context that can be used to discover and associate MLDs with one another over a plurality of different wireless channels or communication links based on discovery and association information exchanged on a single channel or communication link. The single ML context may also allow the MLDs to establish a common block acknowledgement (BA) session over multiple communication links using a single BA setup operation, to dynamically change or re-map affiliations between traffic identifier (TID) values and certain communication links, and to dynamically switch communications from one communication link to another communication link without disassociating or re-associating with each other. In some implementations, the communication links associated with a respective MLD may be in different radio frequency spectrums including (but not limited to) the 2.4 GHz frequency spectrum, the 5 GHz frequency spectrum, and the 6 GHz frequency spectrum.

In some implementations, an AP MLD may include a first AP associated with a first communication link, and may include one or more secondary APs associated with one or more respective secondary communication links. The AP MLD may generate a frame including a first change sequence field, one or more secondary change sequence fields, and a critical update flag subfield. The first change sequence field may carry a change sequence number (CSN) or value of the most-recent critical update for the first AP of the AP MLD. Each of the one or more secondary change sequence fields may carry the CSN or value of the most-recent critical update for a corresponding secondary AP of the AP MLD. The critical update flag subfield may carry a critical update flag or sequence number change indicator indicating a change in value of at least one of the one or more secondary change sequence fields. The first AP of the AP MLD may transmit the frame over the first communication link to one or more wireless communication devices such as (but not limited to) STA MLDs. In some instances, the most-recent critical update for the first AP corresponds to a change in one or more operation parameters of a basic service set (BSS) associated with the first AP of the AP MLD. The most-recent critical update for a respective secondary AP corresponds to a change in one or more operation parameters of the BSS associated with the respective secondary AP of the AP MLD. In some aspects, the one or more operation parameters include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Particular implementations of the subject matter described in this disclosure can be implemented to realize one or more of the following potential advantages. By transmitting indications of critical updates to the BSS operation parameters for the first AP of the AP MLD and each of the secondary APs of the AP MLD in a single frame over the first communication link, the AP MLD may allow associated devices such as STA MLDs to receive critical update information for each of the communication links of the AP MLD while operating or camping on the first communication link. In this way, STA MLDs and other wireless communication devices associated with the AP MLD can be informed of changes in operation parameters for one or more secondary communication links of the AP MLD without leaving the first communication link. That is, the STA MLDs and other wireless communication devices associated with the AP MLD may receive critical update information for one or more secondary communication links of the AP MLD without probing or passively scanning any of the secondary communication links of the AP MLD. The ability of a wireless communication device operating on the first communication link of an AP MLD to receive critical update information for one or more secondary communication links of the AP MLD without performing off-channel scanning operations may reduce power consumption and also reduce the likelihood that the wireless communication device switches to a secondary communication link having changed operation parameters that may no longer be compatible with the wireless communication device.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
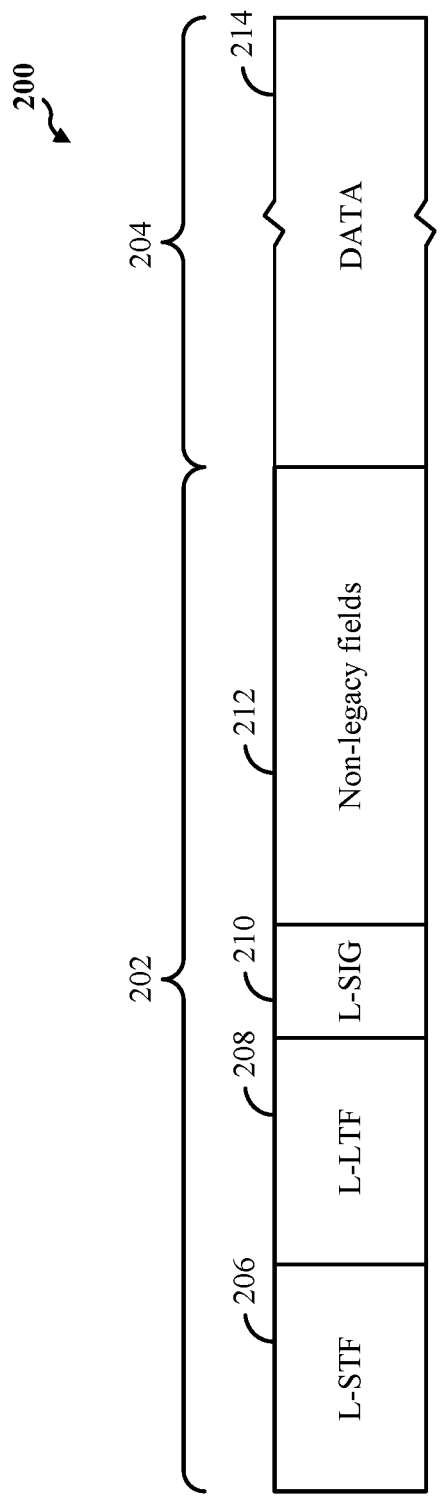
FIG. 2A shows an example protocol data unit (PDU) usable for communications between an access point (AP) and a number of stations (STAs)

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
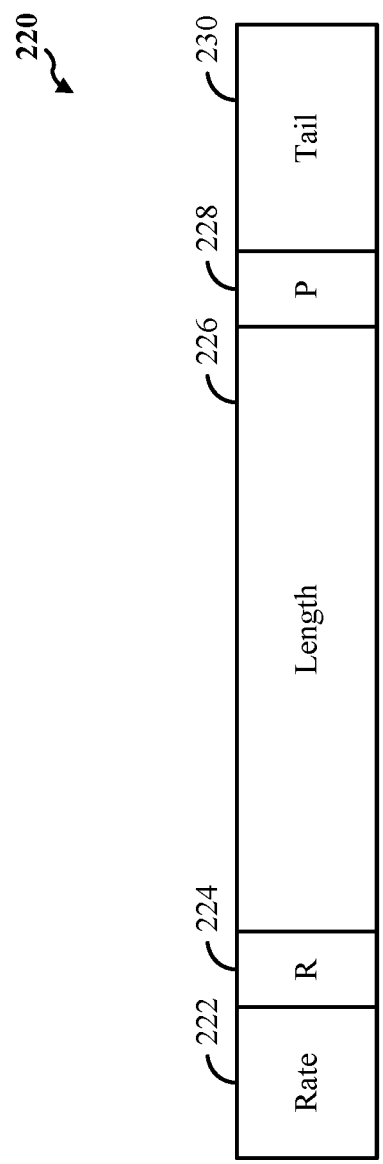
FIG. 2B shows an example field in the PDU of FIG. 2A.
Figure 3A:
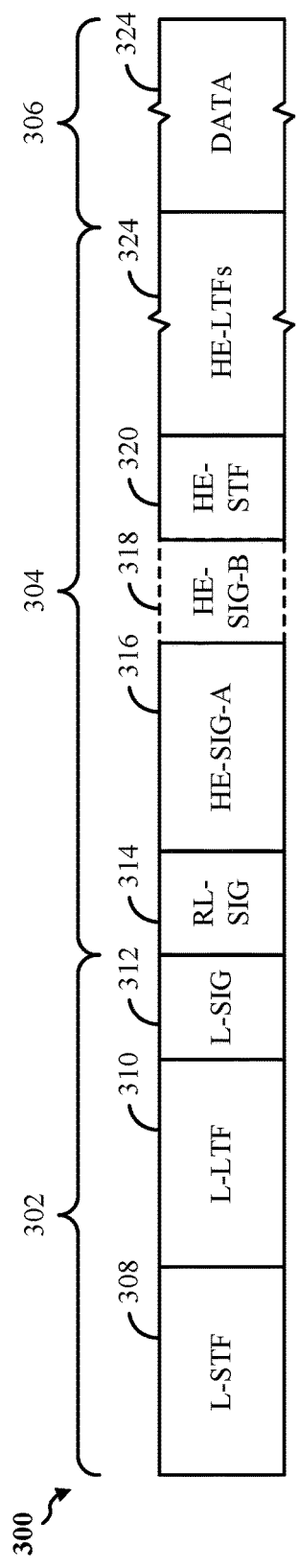
FIG. 3A shows another example PDU usable for communications between an AP and one or more STAs.

FIG. 2B shows an example L-SIG field 220 in the PDU of FIG. 2A. The L-SIG 220 includes a data rate field 222, a reserved bit 224, a length field 226, a parity bit 228, and a tail field 220. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 220 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs). FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
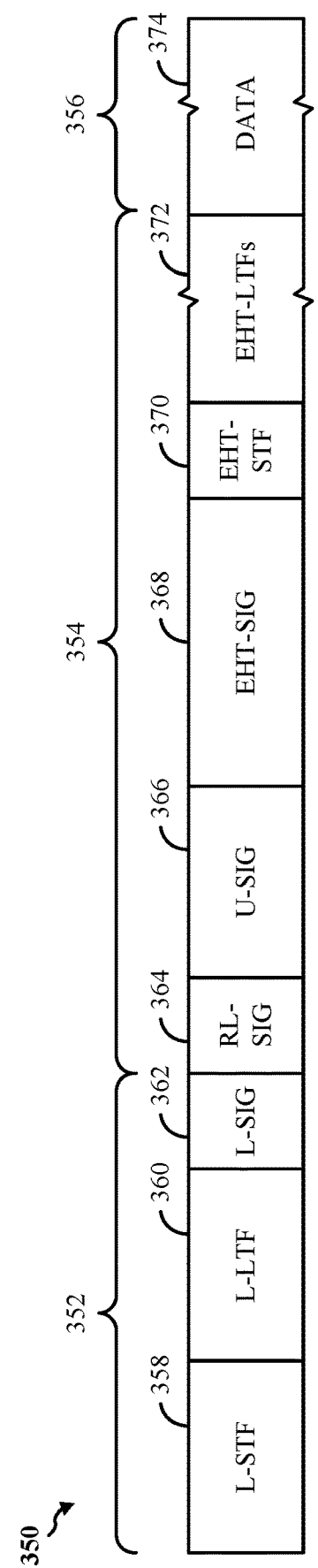
FIG. 3B shows another example PDU usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure 4:
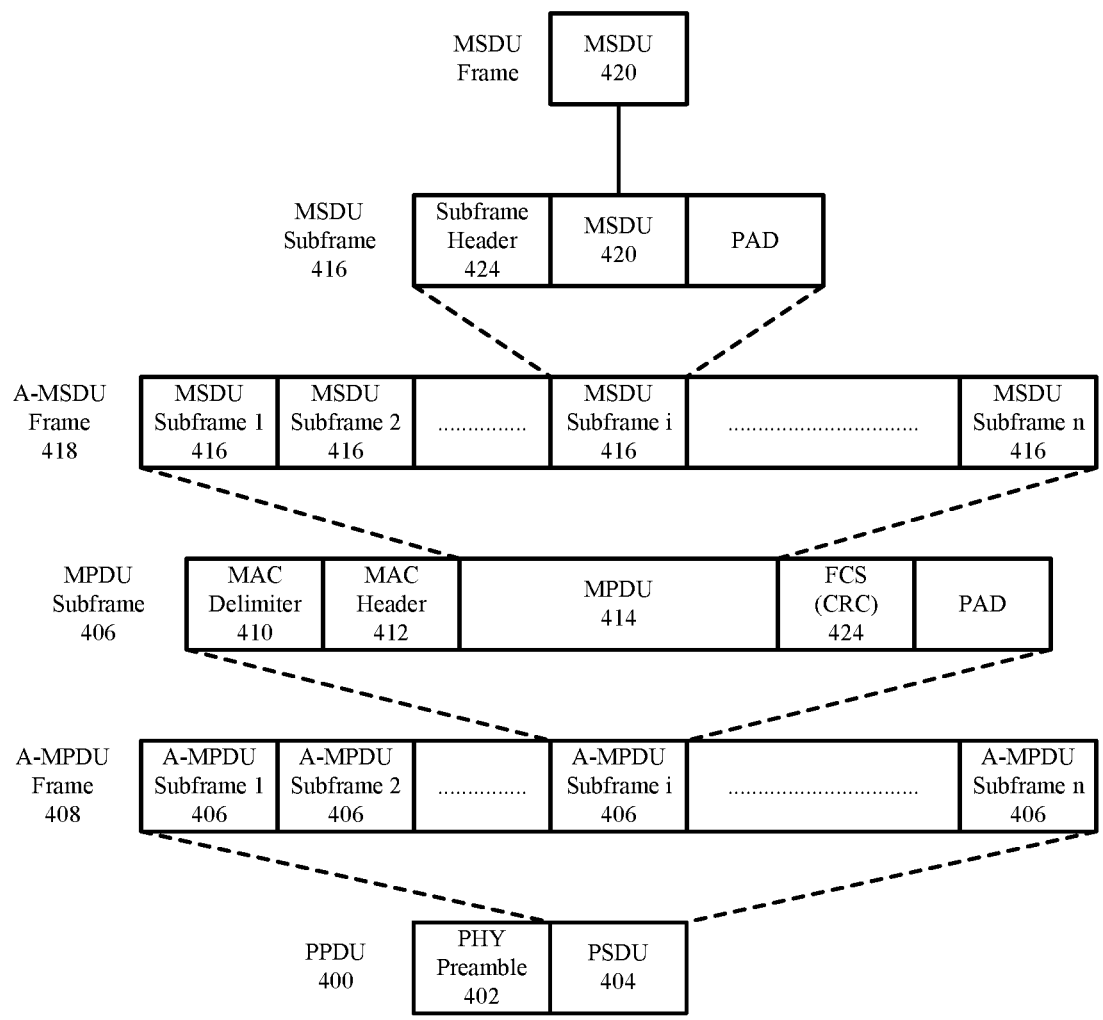
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address, or a destination address. The MAC header 412 may include a frame control field containing control information. The frame control field specifies the frame type, for example, a data frame, a control frame, or a management frame. The MAC header 412 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 416 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
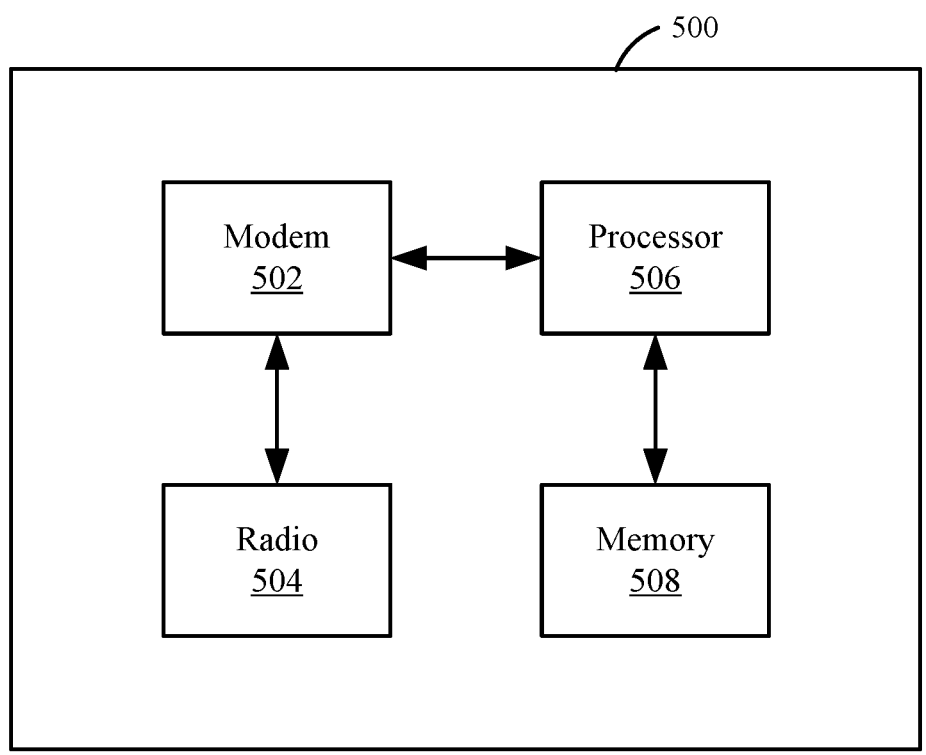
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506"), and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
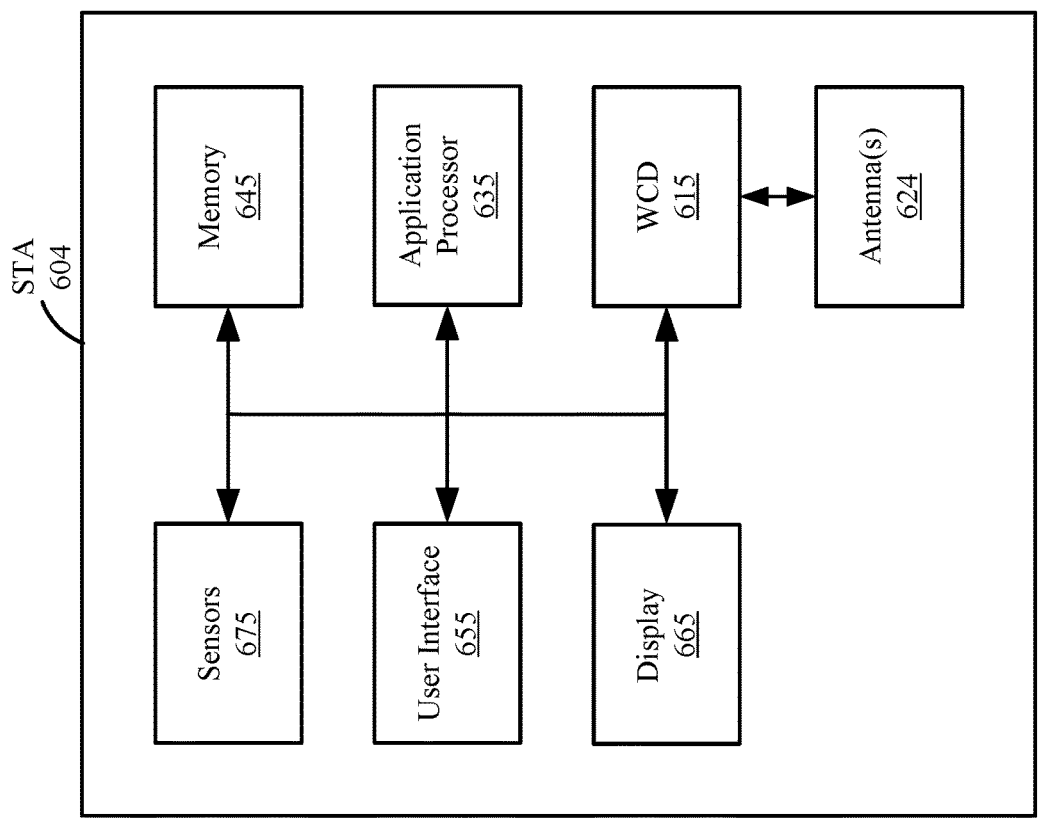
FIG. 6B shows a block diagram of an example station (STA).
Figure 6A:
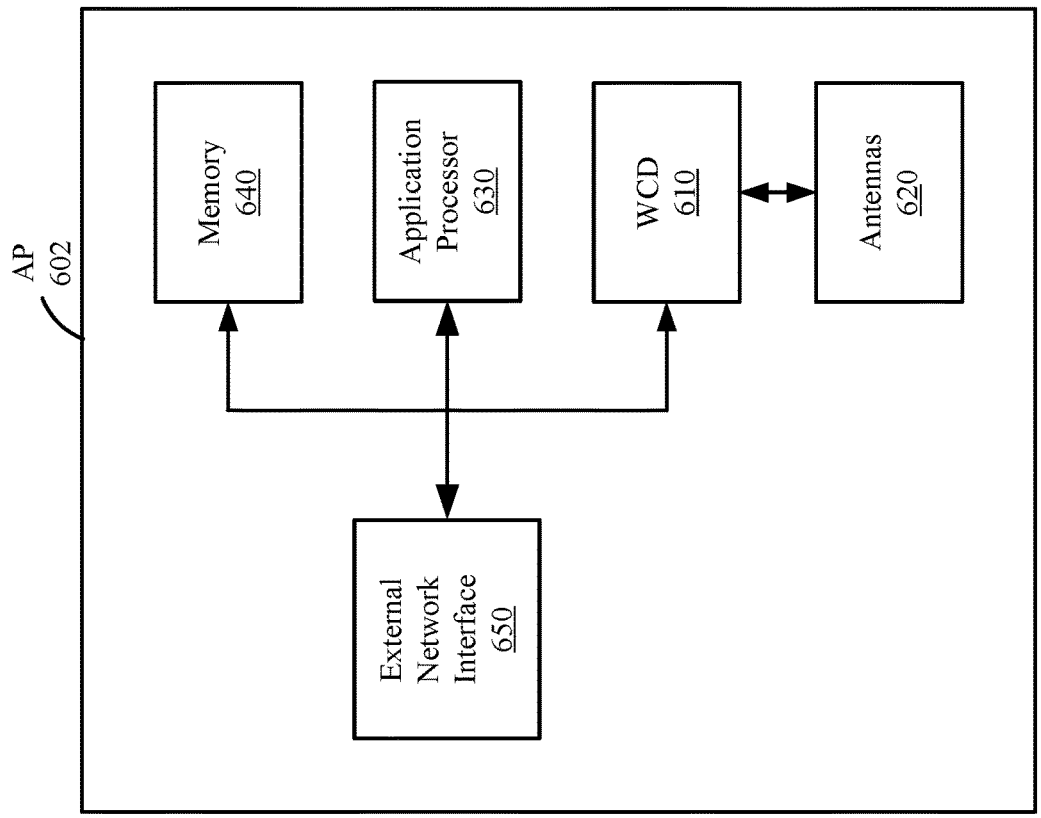
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, various implementations relate generally to ML communications, and specifically to establishing an ML communication session between wireless communication devices. Aspects of the present disclosure provide a single MLA context for a plurality of links shared between multiple MLDs. Under certain conditions, such as if congestion on a first link is high, the MLDs may switch from communicating on the first link to communicating on a second link. Aspects of the present disclosure provide a single MLA context that can be shared between the MAC-SAP endpoints of the MLDs so that the MLDs may dynamically communicate over any link shared between the MLDs without disassociating or re-associating. Thus, in some implementations, associating on one link allows the MLDs to use the same association configuration, encryption keys, among other ML communication parameters, for communication on any of the links.

Some implementations more specifically relate to an AP MLD including a first AP associated with a first communication link and one or more secondary APs associated with respective secondary communication links. A first AP of the AP MLD generates a frame including one or more operation parameters for the first communication link, a first change sequence number (CSN) indicating a presence or absence of a critical update for the first communication link of the AP MLD, and one or more secondary CSNs each indicating a presence or absence of a critical update for a corresponding secondary communication link of the AP MLD. The first AP transmits the frame to a STA of a STA MLD on the first communication link. The first CSN indicates a most recent critical update to one or more operation parameters for the first communication link, and each secondary CSN indicates a most recent critical update to one or more operation parameters for the corresponding secondary communication link. In some implementations, each of the secondary CSNs may be carried in a corresponding per-link profile subelement of a MLE. In some other implementations, each of the secondary CSNs may be carried in a corresponding neighbor AP information field of a Reduced Neighbor Report (RNR) element. Alternatively, the first CSN and the one or more secondary CSNs may be carried in a sequence counter field of the frame or in an information element of the frame.

Particular implementations of the subject matter described in this disclosure can be implemented to realize one or more of the following potential advantages. By advertising one or more of critical updates, DNT conditions, or operation parameters of one or more secondary communication links using frames transmitted on the first communication link, a STA (such as a STA of a STA MLD) may receive the one or more of critical updates, DNT conditions, or operation parameters of each secondary communication link without monitoring the secondary communication links, which may allow the STA to conserve power associated with performing scanning or listening operations on each of the secondary communication links.

Figure 7A:
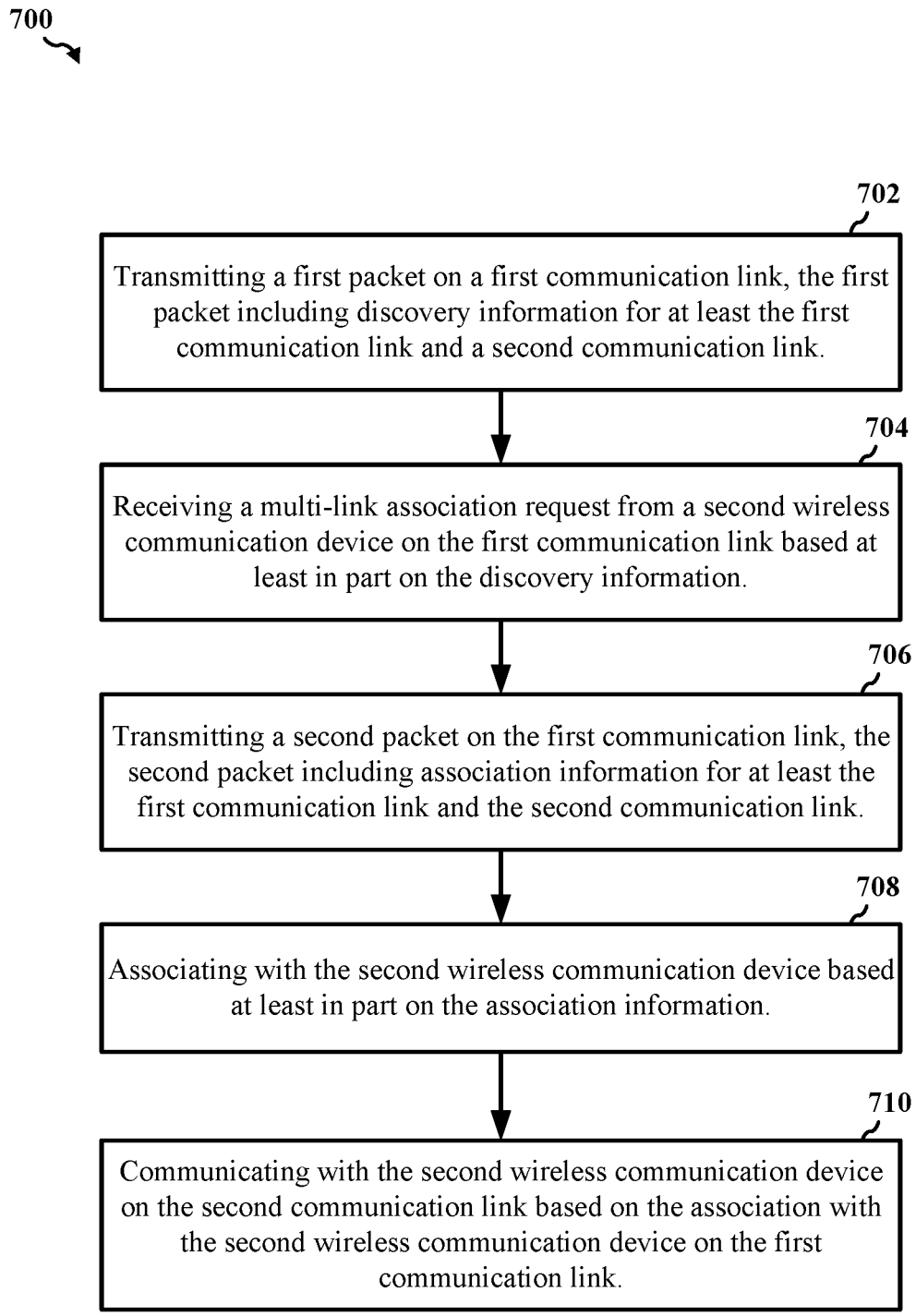
FIG. 7A shows a flowchart illustrating an example process for wireless communication that supports communications between multi-link devices (MLDs) according to some implementations.

FIG. 7A shows a flowchart illustrating an example process 700 for wireless communication that supports communications between MLDs according to some implementations. The process 700 may be performed by a first wireless communication device such as the wireless communication device 500 described above with reference to FIG. 5. In some implementations, the process 700 may be performed by a wireless communication device operating as or within a STA, such as one of the STAs 104 and 604 described above with reference to FIGS. 1 and 6B, respectively. In other implementations, the process 700 may be performed by a wireless communication device operating as or within an AP, such as one of the APs 102 and 602 described above with reference to FIGS. 1 and 6A, respectively.

In some implementations, the process 700 begins in block 702 with transmitting a first packet on a first communication link, the first packet including discovery information for at least the first communication link and a second communication link. In block 704, the process 700 proceeds with receiving a ML association request from a second wireless communication device on the first communication link based at least in part on the discovery information. In block 706, the process 700 proceeds with transmitting a second packet on the first communication link, the second packet including association information for at least the first communication link and the second communication link.

In block 708, the process 700 proceeds with associating with the second wireless communication device based at least in part on the association information. In some implementations, the associating includes establishing at least one ML communication parameter for communicating with the second wireless communication device on the first and the second communication links. The at least one ML communication parameter may be the same for each of the first and the second communication links. In some other implementations, the associating includes establishing a common security context between a first medium access control service access point (MAC-SAP) endpoint of the first wireless communication device and a second MAC-SAP endpoint of the second wireless communication device. Each of the first and second MAC-SAP endpoints may be used to communicate over both the first and second communication links. In block 710, the process 700 proceeds with communicating with the second wireless communication device on the second communication link based on the association with the second wireless communication device on the first communication link.

Figure 7B:
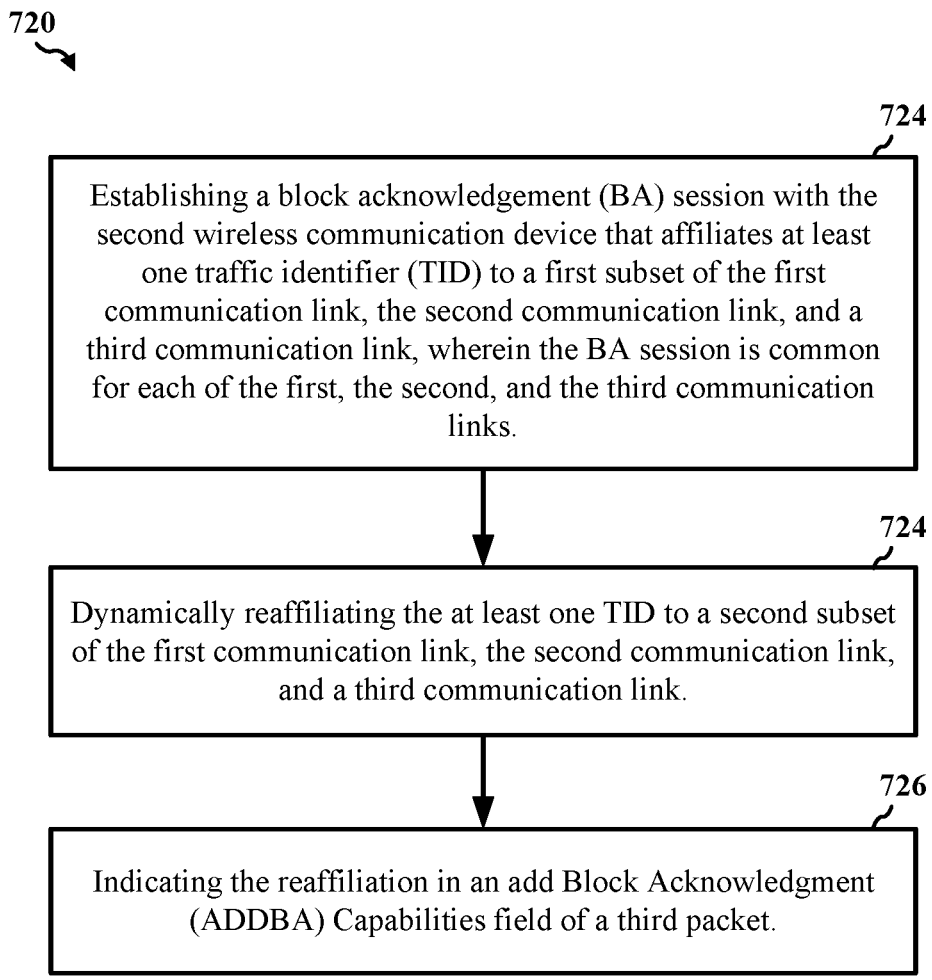
FIG. 7B shows a flowchart illustrating an example process for wireless communication that supports communications between MLDs according to some implementations.

FIG. 7B shows a flowchart illustrating an example process 720 for wireless communication that supports communications between MLDs according to some implementations. The process 720 may be performed by a wireless communication device such as the wireless communication device 500 described above with reference to FIG. 5. In some implementations, the process 720 may be performed by a wireless communication device operating as or within a STA, such as one of the STAs 104 and 604 described above with reference to FIGS. 1 and 6B, respectively. In other implementations, the process 720 may be performed by a wireless communication device operating as or within an AP, such as one of the APs 102 and 602 described above with reference to FIGS. 1 and 6A, respectively.

With reference to FIG. 7A, the process 720 may be a more detailed implementation of the ML communication operation described in block 710 of the process 700. For example, the process 720 may begin, in block 722, after the association with the second wireless communication device in block 708 of the process 700.

In block 722, the process 720 proceeds with establishing a block acknowledgement (BA) session with the second wireless communication device that affiliates at least one traffic identifier (TID) to a first subset of the first communication link, the second communication link, and a third communication link. The BA session may be common for each of the first, the second, and the third communication links. In block 724, the process 720 proceeds with dynamically reaffiliating the at least one TID to a second subset of the first communication link, the second communication link, and a third communication link. In block 726, the process 720 proceeds with indicating the reaffiliation in an add Block Acknowledgment (ADDBA) Capabilities field of a third packet.

Figure 8A:
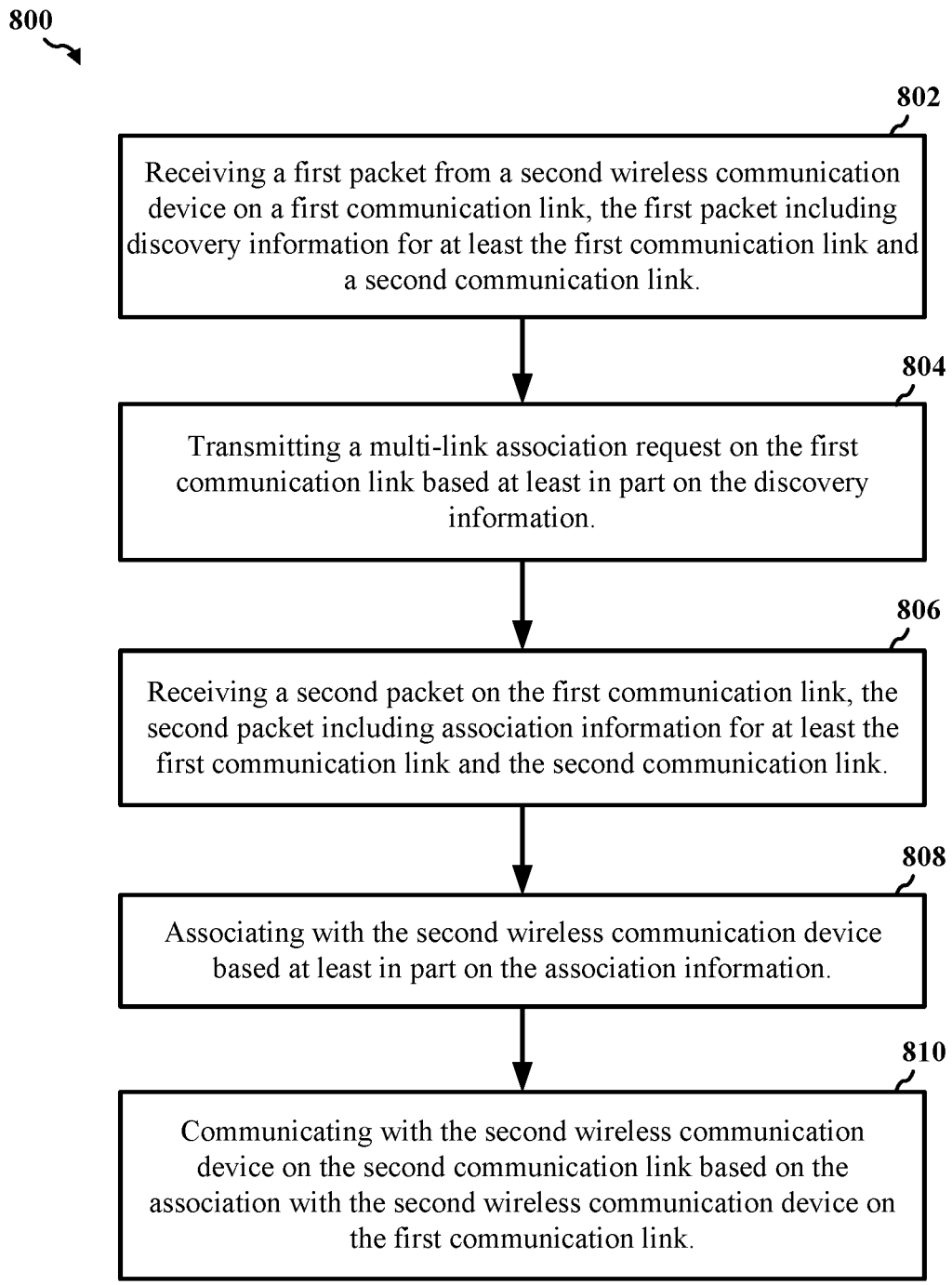
FIG. 8A shows a flowchart illustrating an example process for wireless communication that supports communications between MLDs according to some other implementations.

FIG. 8A shows a flowchart illustrating an example process 800 for wireless communication that supports communications between MLDs according to some implementations. The process 800 may be performed by a first wireless communication device such as the wireless communication device 500 described above with reference to FIG. 5. In some implementations, the process 800 may be performed by a wireless communication device operating as or within a STA, such as one of the STAs 104 and 604 described above with reference to FIGS. 1 and 6B, respectively. In other implementations, the process 800 may be performed by a wireless communication device operating as or within an AP, such as one of the APs 102 and 602 described above with reference to FIGS. 1 and 6A, respectively.

In some implementations, the process 800 begins in block 802 with receiving a first packet from a second wireless communication device on a first communication link, the first packet including discovery information for at least the first communication link and a second communication link. In block 804, the process 800 proceeds with transmitting an ML association request on the first communication link based at least in part on the discovery information. In block 806, the process 800 proceeds with receiving a second packet on the first communication link, the second packet including association information for at least the first communication link and the second communication link. In some implementations, the first A-MPDU subframe may be aligned with codeword boundaries in the PSDU such that portions of the first A-MPDU subframe are not encapsulated within the same LDPC codeword as portions of another A-MPDU subframe in the PSDU.

In block 808, the process 800 proceeds with associating with the second wireless communication device based at least in part on the association information. In some implementations, the associating includes establishing at least one ML communication parameter for communicating with the second wireless communication device on the first and the second communication links. The at least one ML communication parameter may be the same for each of the first and the second communication links. In some other implementations, the associating includes establishing a common security context between a first medium access control service access point (MAC-SAP) endpoint of the first wireless communication device and a second MAC-SAP endpoint of the second wireless communication device. Each of the first and second MAC-SAP endpoints may be used to communicate over the first and second communication links. In block 810, the process 800 proceeds with communicating with the second wireless communication device on the second communication link based on the association with the second wireless communication device on the first communication link.

Figure 8B:
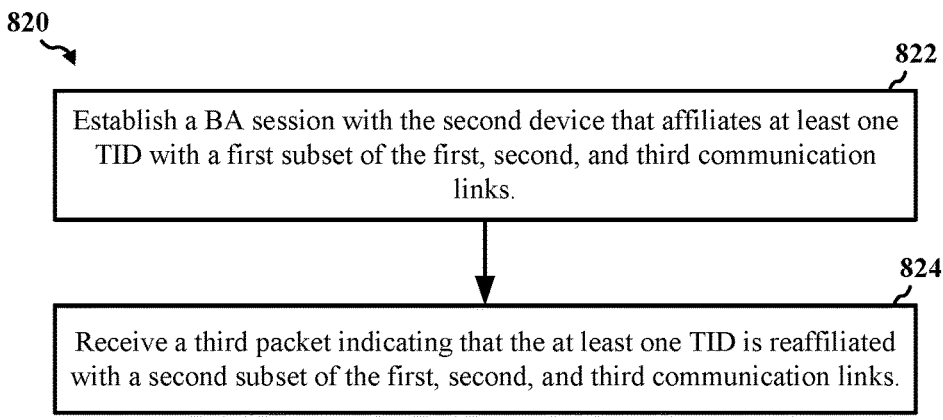
FIG. 8B shows a flowchart illustrating an example process for wireless communication that supports communications between MLDs according to some other implementations.

FIG. 8B shows a flowchart illustrating an example process 820 for wireless communication that supports communications between MLDs according to some implementations. The process 820 may be performed by a wireless communication device such as the wireless communication device 500 described above with reference to FIG. 5. In some implementations, the process 820 may be performed by a wireless communication device operating as or within a STA, such as one of the STAs 104 and 604 described above with reference to FIGS. 1 and 6B, respectively. In other implementations, the process 820 may be performed by a wireless communication device operating as or within an AP, such as one of the APs 102 and 602 described above with reference to FIGS. 1 and 6A, respectively.

With reference to FIG. 8A, the process 820 may be a more detailed implementation of the ML communication operation described in block 810 of the process 800. For example, the process 820 may begin, in block 822, after the association with the second wireless communication device in block 808 of the process 800.

In block 822, the process 820 proceeds with establishing a block acknowledgement (BA) session with the second wireless communication device that affiliates at least one traffic identifier (TID) with a first subset of the first communication link, the second communication link, and a third communication link. The BA session may be common for each of the first, the second, and the third communication links. In block 824, the process 820 proceeds with receiving a third packet indicating, in an add Block Acknowledgment (ADDBA) Capabilities field, that the at least one TID is reaffiliated with a second subset of the first communication link, the second communication link, and a third communication link.

Figure 9:
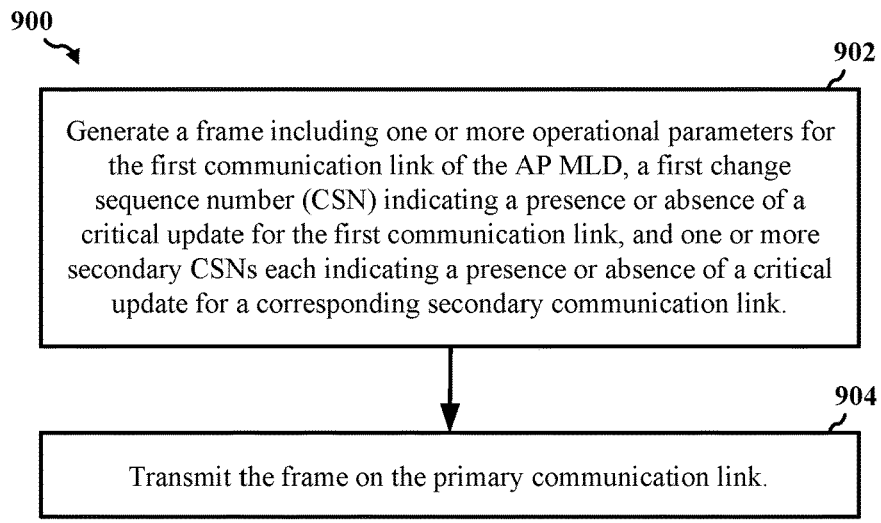
FIG. 9 shows a flowchart illustrating an example process for wireless communication that supports indicating critical updates for MLDs according to some other implementations.

FIG. 9 shows a flowchart illustrating an example process 900 for wireless communication that supports communications between MLDs according to some implementations. The process 900 may be performed by a first wireless communication device such as the wireless communication device 500 described above with reference to FIG. 5. In some implementations, the process 900 may be performed by a wireless communication device operating as or within an AP, such as one of the APs 102 and 602 described above with reference to FIGS. 1 and 6A, respectively. For the example of FIG. 9A, the process 900 is performed by an access point (AP) multi-link device (MLD) including a first AP and one or more secondary APs. The first AP may be associated with a first communication link of the AP MLD, and each secondary AP may be associated with a corresponding secondary communication link of one or more secondary communication links of the AP MLD.

At block 902, the first AP of the AP MLD generates a frame including one or more operation parameters for the first communication link, a first change sequence number (CSN) indicating a presence or absence of a critical update for the first communication link of the AP MLD, and one or more secondary CSNs each indicating a presence or absence of a critical update for a corresponding secondary communication link of the AP MLD. At block 904, the first AP transmits the frame on the first communication link. The frame may be one of a beacon frame, a probe response frame, an association response frame, or a reassociation response frame.

In some implementations, the first CSN indicates a most recent critical update to the one or more operation parameters for the first communication link, and each secondary CSN indicates a most recent critical update to the one or more operation parameters for the corresponding secondary communication link of the AP MLD. In some instances, the first CSN and the one or more secondary CSNs are carried in a sequence counter field of the frame. In some other instances, the first CSN and the one or more secondary CSNs are carried in an information element.

In some implementations, the frame includes a Multi-Link Element (MLE) element carrying the one or more secondary CSNs. In some instances, the MLE includes one or more per-link profile subelements, each per-link profile subelement carrying a corresponding secondary CSN of the one or more secondary CSNs. In some other instances, the one or more per-link profile subelements include an information element (IE) that includes the corresponding secondary CSN of the one or more secondary CSNs. In some other instances, the MLE includes a common parameters field carrying the one or more secondary CSNs.

In some other implementations, the frame may be a beacon frame including one or more per-link profile elements, each per-link profile element of the one or more per-link profile elements carrying the secondary CSN and a complete set of operation parameters for a corresponding secondary communication link of the one or more secondary communication links. In some instances, the beacon frame may include one or more per-link profile elements, where each per-link profile subelement carries the secondary CSN and a complete set of operation parameters for a corresponding secondary communication link. In some other implementations, each per-link profile subelement may carry only the portions of the operation parameters that were updated or changed.

In some implementations, the frame includes a Multi-Link Element (MLE) carrying the one or more secondary CSNs. In some instances, the MLE may include one or more per-link profile subelements each carrying a corresponding secondary CSN of the one or more secondary CSNs. In some instances, each per-link profile subelements may include an information element (IE) that includes the corresponding secondary CSN. In some other instances, the MLE may include a common parameters field carrying the secondary CSNs.

In some implementations, the frame may include a reduced neighbor report (RNR) element carrying the one or more secondary CSNs. In some instances, the RNR element may include one or more neighbor AP information fields, where each neighbor AP information field carries a corresponding secondary CSN of the one or more secondary CSNs.

In some implementations, the critical update may correspond to a change in one or more operation parameters of a basic service set (BSS) associated with at least one of the first communication link or the one or more secondary communication links.

In some implementations, the one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the frame may further include one or more Do Not Transmit (DNT) indications, where each DNT indication is associated with a corresponding secondary communication link of the AP MLD. In some instances, the frame may further include a DNT indication for the first communication link. Each DNT indication may indicate whether wireless communication devices are to refrain from transmitting on the corresponding secondary communication link of the AP MLD. In some instances, at least some of the wireless communication devices may monitor the first communication link but not the one or more secondary communication links for the DNT indications. In some implementations, the DNT indication for a respective secondary communication link may be based on one or more of a channel switch announcement for the respective secondary communication link, a quiet time announcement for the respective secondary communication link, or an unavailability of the secondary AP of the AP MLD associated with the respective secondary communication link.

In some implementations, the DNT indication for the first communication link and the one or more DNT indications for the one or more respective secondary communication links may be carried in a bitmap of the frame. In some other implementations, the one or more DNT indications for the one or more respective secondary communication links may be carried in a multiple link attribute (MLA) element of the frame. In some instances, the MLE may include one or more per-link profile subelements, where each per-link profile subelement carries the DNT indication for the corresponding secondary communication link. In some other instances, each per-link profile subelement may also carry a complete set of operation parameters for the corresponding secondary communication link.

In some implementations, the frame may be a beacon frame including one or more per-link profile elements, where each per-link profile element carries the DNT indication for the corresponding secondary communication link. In some instances, each per-link profile element of the one or more per-link profile elements may be an information element (IE). In some other instances, the MLE may include a common parameters field carrying the one or more DNT indications for the one or more respective secondary communication links. In some other implementations, the beacon frame may carry frame may carry one or more profiles, where each profile carries a complete set of operation parameters for a corresponding secondary communication link of the one or more secondary communication links.

In some implementations, the one or more DNT indications may be carried in a reduced neighbor report (RNR) element of the frame. In some instances, the RNR element may include one or more neighbor AP information fields, where each neighbor AP information field carries the DNT indication for the corresponding secondary communication link.

Figure 10A:
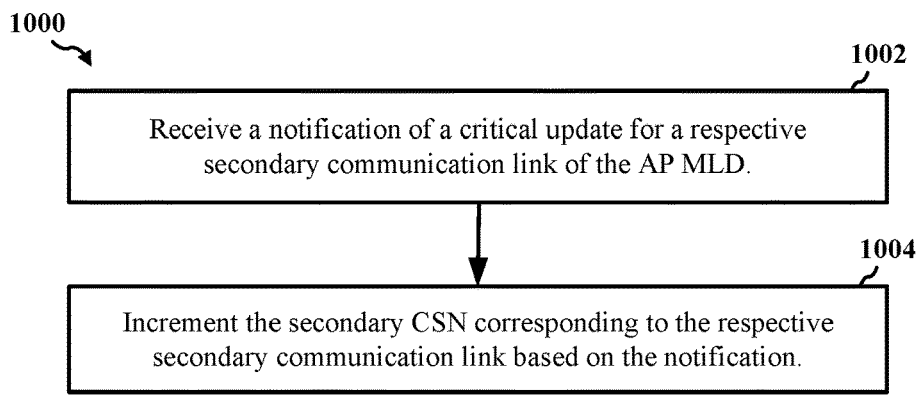
FIGS. 10A-10H show flowcharts illustrating example processes for wireless communication that supports indicating critical updates for MLDs according to some implementations.

FIG. 10A shows a flowchart illustrating an example process 1000 for wireless communication that supports communications between MLDs according to some implementations. The process 1000 may be performed by a first wireless communication device such as the wireless communication device 500 described above with reference to FIG. 5. In some implementations, the process 1000 may be performed by a wireless communication device operating as or within an AP, such as one of the APs 102 and 602 described above with reference to FIGS. 1 and 6A, respectively. For the example of FIG. 10A, the process 1000 is performed by the AP MLD described with reference to FIG. 9. In some implementations, the process 1000 of FIG. 10A may be performed after the AP MLD transmits the frame in block 904 of FIG. 9.

At block 1002, the first AP receives, from a secondary AP of the one or more secondary APs of the AP MLD associated with a respective secondary communication link, a notification of a critical update for the respective secondary communication link. At block 1004, the first AP increments the secondary CSN corresponding to the respective secondary communication link based on the notification.

In some implementations, the critical update for at least one of the first communication link or one or more of the secondary communication links may correspond to a change in one or more operation parameters of a basic service set (BSS) associated with the at least one of the first communication link or the one or more secondary communication links.

Figure 10B:
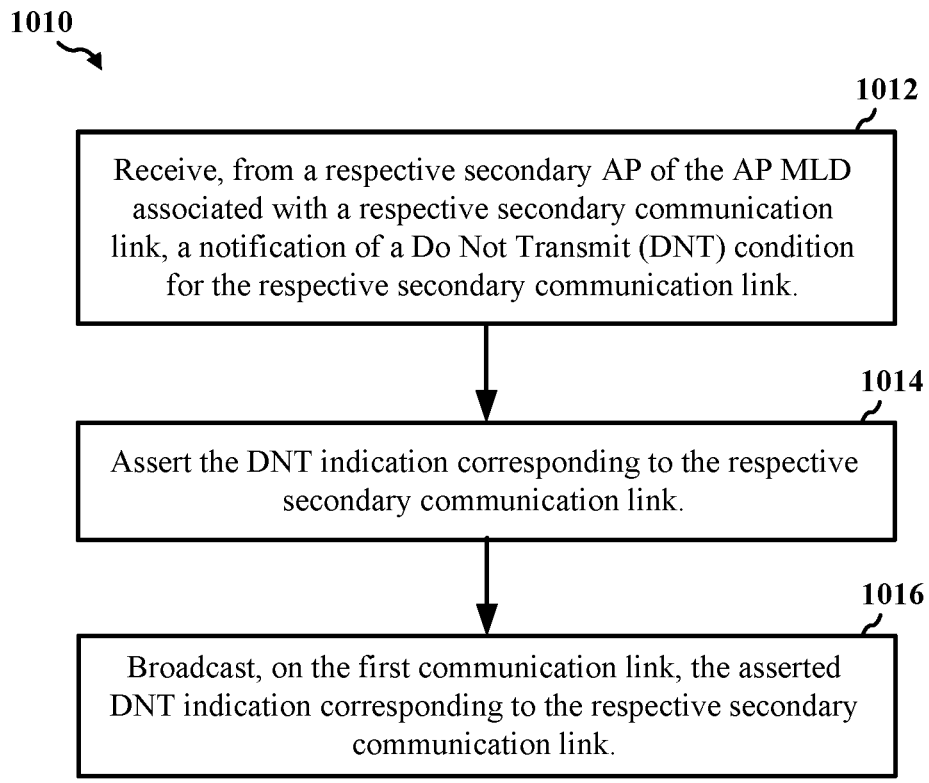

FIG. 10B shows a flowchart illustrating an example process 1010 for wireless communication that supports communications between MLDs according to some implementations. The process 1010 may be performed by a first wireless communication device such as the wireless communication device 500 described above with reference to FIG. 5. In some implementations, the process 1010 may be performed by a wireless communication device operating as or within an AP, such as one of the APs 102 and 602 described above with reference to FIGS. 1 and 6A, respectively. For the example of FIG. 10B, the process 1010 is performed by the AP MLD described with reference to FIG. 9. In some implementations, the process 1010 of FIG. 10B may be performed after the AP MLD transmits the frame in block 904 of FIG. 9.

At block 1012, the first AP receives, from a respective secondary AP of the AP MLD associated with a respective secondary communication link, a notification of a Do Not Transmit (DNT) condition for the respective secondary communication link. At block 1014, the first AP asserts the DNT indication corresponding to the respective secondary communication link. At block 1014, the first AP broadcasts, on the first communication link, the asserted DNT indication corresponding to the respective secondary communication link.

In some implementations, each DNT indication may indicate whether wireless communication devices are to refrain from transmitting on the corresponding secondary communication link of the AP MLD. In some instances, at least some of the wireless communication devices may monitor the first communication link but not the one or more secondary communication links for the DNT indications. In some implementations, the DNT indication for a respective secondary communication link may be based on one or more of a channel switch announcement for the respective secondary communication link, a quiet time announcement for the respective secondary communication link, or an unavailability of the secondary AP of the AP MLD associated with the respective secondary communication link.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 10C:
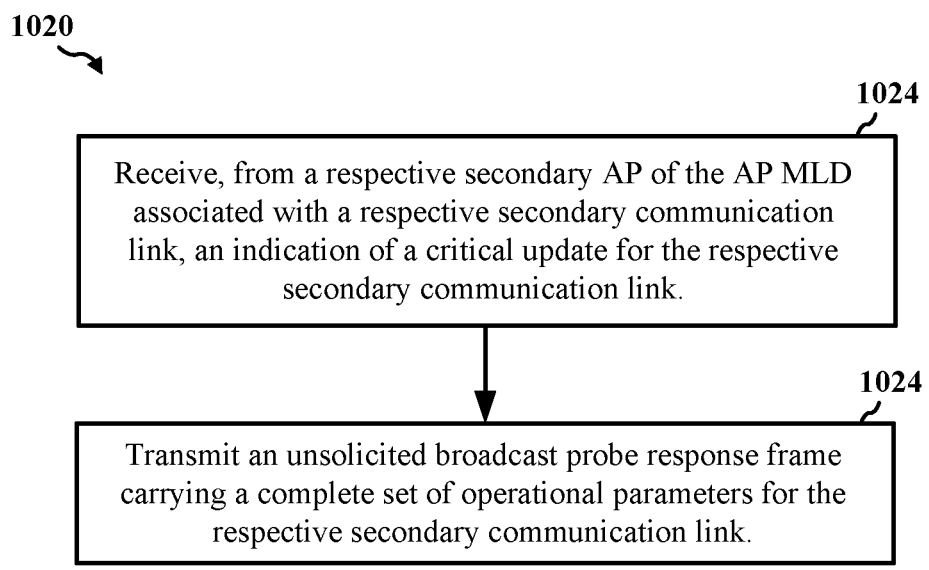

FIG. 10C shows a flowchart illustrating an example process 1020 for wireless communication that supports communications between MLDs according to some implementations. The process 1020 may be performed by a first wireless communication device such as the wireless communication device 500 described above with reference to FIG. 5. In some implementations, the process 1020 may be performed by a wireless communication device operating as or within an AP, such as one of the APs 102 and 602 described above with reference to FIGS. 1 and 6A, respectively. For the example of FIG. 10C, the process 1020 is performed by the AP MLD described with reference to FIG. 9. In some implementations, the process 1020 of FIG. 10C may be performed after the AP MLD transmits the frame in block 904 of FIG. 9.

At block 1022, the first AP receives, from a respective secondary AP of the AP MLD associated with a respective secondary communication link, an indication of a critical update for the respective secondary communication link. At block 1024, the first AP transmits an unsolicited broadcast probe response frame carrying a complete set of operation parameters for the respective secondary communication link. In some other implementations, the unsolicited broadcast probe response frame may carry the complete set of operation parameters for each secondary communication link of the one or more secondary communication links. In some other implementations, the unsolicited broadcast probe response frame may carry only the portions of the operation parameters that were updated or changed.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 10D:
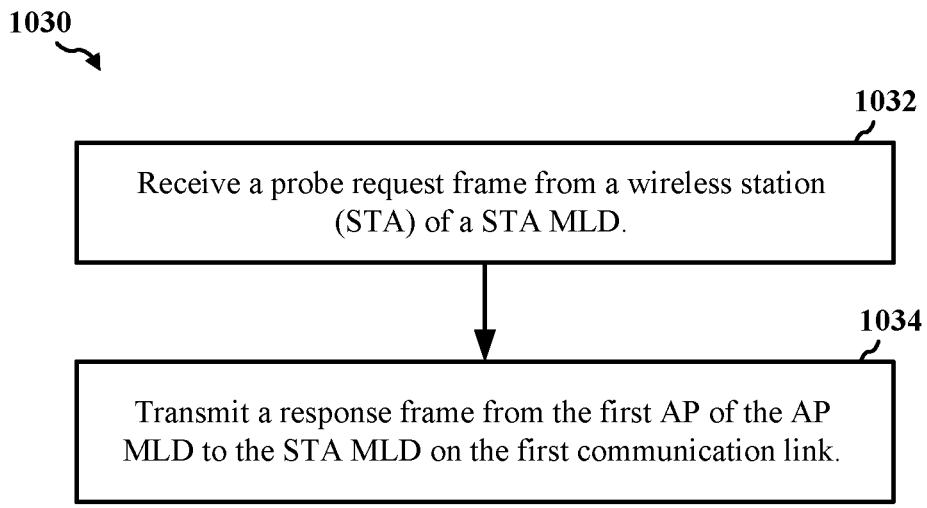

FIG. 10D shows a flowchart illustrating an example process 1030 for wireless communication that supports communications between MLDs according to some implementations. The process 1030 may be performed by a first wireless communication device such as the wireless communication device 500 described above with reference to FIG. 5. In some implementations, the process 1030 may be performed by a wireless communication device operating as or within an AP, such as one of the APs 102 and 602 described above with reference to FIGS. 1 and 6A, respectively. For the example of FIG. 10D, the process 1030 is performed by the AP MLD described with reference to FIG. 9. In some implementations, the process 1030 of FIG. 10D may be performed after the AP MLD transmits the frame in block 904 of FIG. 9.

At block 1032, the first AP receives a probe request frame from a wireless station (STA) of a STA MLD. At block 1034, the first AP transmits a response frame from the first AP of the AP MLD to the STA MLD on the first communication link.

In some implementations, the response frame may carry a complete set of operation parameters for a respective secondary communication link for which one or more operation parameters were updated. In some instances, the request frame may be received by one of the first AP of the AP MLD on the first communication link or by a respective secondary AP of the AP MLD on the respective secondary communication link. In some other implementations, the response frame may carry a complete set of operation parameters for each secondary communication link of the one or more secondary communication links. In some instances, the request frame may be a broadcast probe request frame. In some other implementations, the response frame may carry only the portions of the operation parameters that were updated or changed.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 10E:
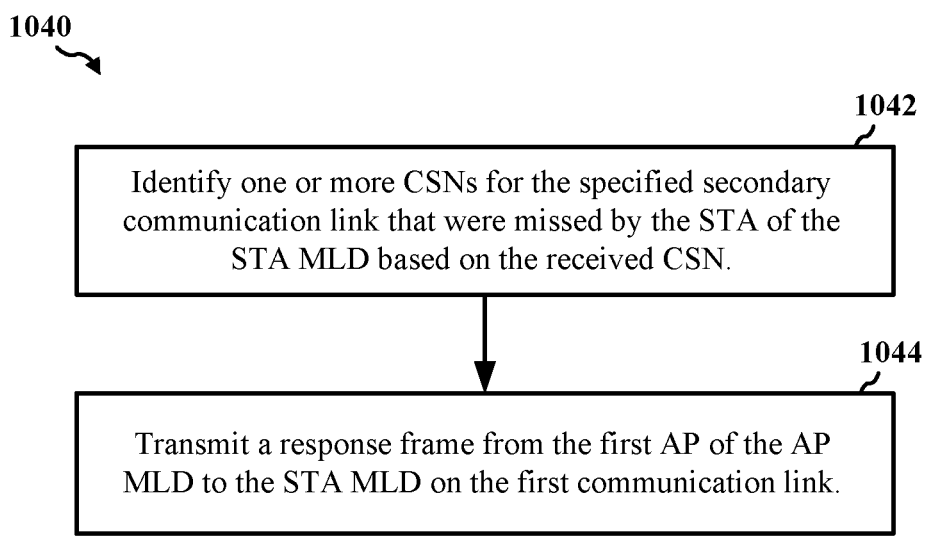

FIG. 10E shows a flowchart illustrating an example process 1040 for wireless communication that supports communications between MLDs according to some implementations. The process 1040 may be performed by a first wireless communication device such as the wireless communication device 500 described above with reference to FIG. 5. In some implementations, the process 1040 may be performed by a wireless communication device operating as or within an AP, such as one of the APs 102 and 602 described above with reference to FIGS. 1 and 6A, respectively. For the example of FIG. 10E, the process 1040 is performed by the AP MLD described with reference to FIG. 9. In some implementations, the process 1040 of FIG. 10E may be performed after the AP MLD transmits the frame in block 904 of FIG. 9. In some implementations, the probe request frame may carry a CSN indicating a most-recently received critical update for a specified secondary communication link of the one or more secondary communication links of the AP MLD.

At block 1042, the first AP identifies one or more CSNs for the specified secondary communication link that were missed by the STA of the STA MLD based on the received CSN. At block 1044, the first AP transmits the response frame with an indication of the one or more secondary CSNs for the specified secondary communication link that were missed by the STA of the STA MLD.

In some implementations, the response frame may be a unicast probe response frame carrying one or more critical updates for the specified secondary communication link that were missed by the STA. In some instances, the one or more critical updates missed by the STA may be determined based on a comparison between the received CSN and the one or more secondary CSNs that were missed by the STA.

In some implementations, the response frame may be one of a unicast probe response frame or a broadcast probe response frame that carries a complete set of operation parameters for the specified secondary communication link. In some instances, the response frame may be a broadcast probe response frame that carries a complete set of operation parameters for each secondary communication link of the specified secondary communication link and the other non-specified secondary communication links. In some other implementations, the frames may carry only the portions of the operation parameters that were updated or changed.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 10F:
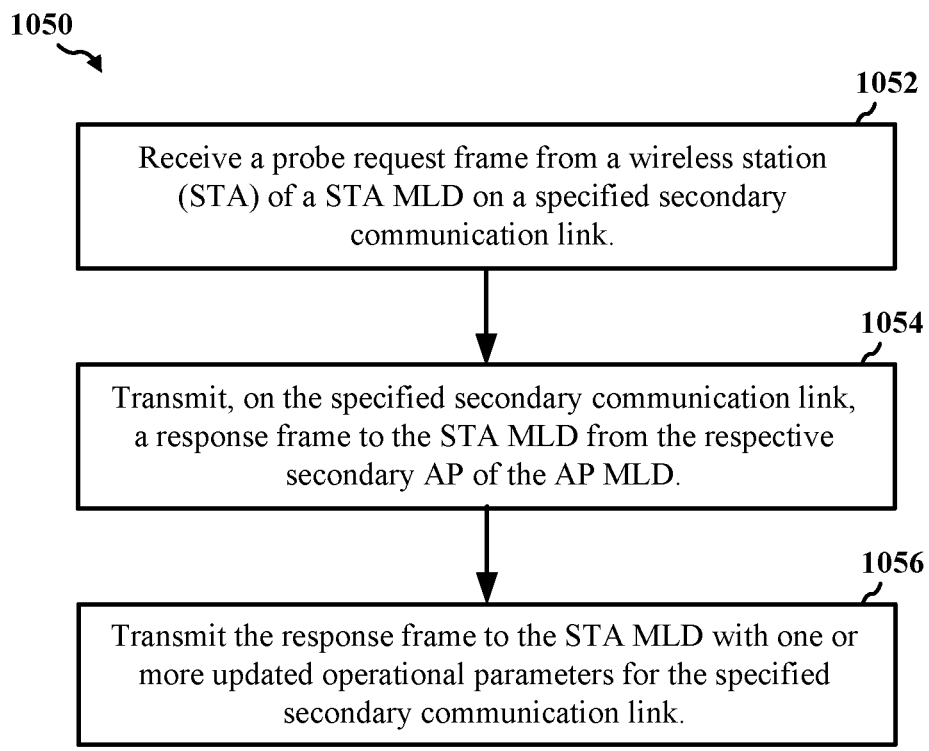

FIG. 10F shows a flowchart illustrating an example process 1050 for wireless communication that supports communications between MLDs according to some implementations. The process 1050 may be performed by a first wireless communication device such as the wireless communication device 500 described above with reference to FIG. 5. In some implementations, the process 1050 may be performed by a wireless communication device operating as or within an AP, such as one of the APs 102 and 602 described above with reference to FIGS. 1 and 6A, respectively. For the example of FIG. 10F, the process 1050 is performed by the AP MLD described with reference to FIG. 9. In some implementations, the process 1050 of FIG. 10F may be performed after the AP MLD transmits the frame in block 904 of FIG. 9.

At block 1052, a respective secondary AP of the AP MLD may receive a probe request frame from a wireless station (STA) of a STA MLD on a specified secondary communication link. At block 1054, the respective secondary AP may transmit, on the specified secondary communication link, a response frame to the STA MLD. At block 1056, the first AP may transmit the response frame to the STA MLD with one or more updated operation parameters for the specified secondary communication link.

In some implementations, the probe request frame may carry the CSN indicating the most-recently received critical update for the specified secondary communication link. In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 10G:
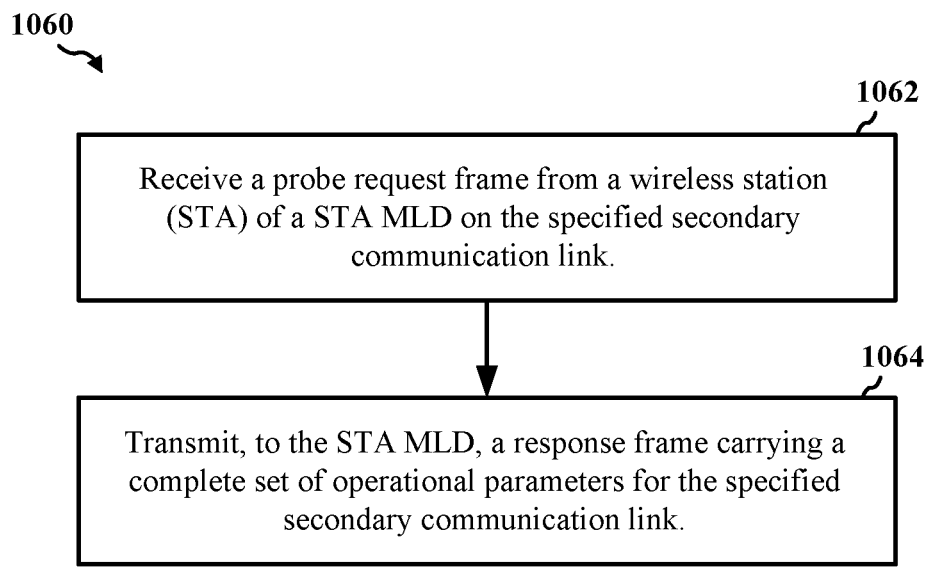

FIG. 10G shows a flowchart illustrating an example process 1060 for wireless communication that supports communications between MLDs according to some implementations. The process 1060 may be performed by a first wireless communication device such as the wireless communication device 500 described above with reference to FIG. 5. In some implementations, the process 1060 may be performed by a wireless communication device operating as or within an AP, such as one of the APs 102 and 602 described above with reference to FIGS. 1 and 6A, respectively. For the example of FIG. 10G, the process 1060 is performed by the AP MLD described with reference to FIG. 9. In some implementations, the process 1060 of FIG. 10G may be performed after the AP MLD transmits the frame in block 904 of FIG. 9.

At block 1062, a respective secondary AP of the AP MLD may receive a probe request frame from a wireless station (STA) of a STA MLD on the specified secondary communication link. At block 1064, the respective secondary AP may transmit, to the STA MLD, a response frame carrying a complete set of operation parameters for the specified secondary communication link.

In some implementations, the response frame may be one of a unicast probe response frame or a beacon frame. In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 10H:
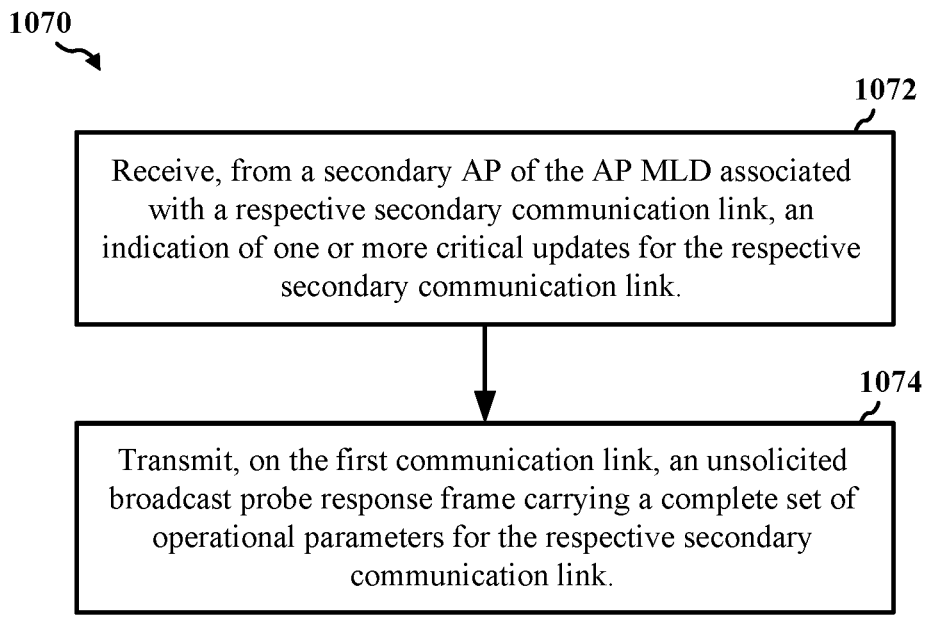

FIG. 10H shows a flowchart illustrating an example process 1070 for wireless communication that supports communications between MLDs according to some implementations. The process 1070 may be performed by a first wireless communication device such as the wireless communication device 500 described above with reference to FIG. 5. In some implementations, the process 1070 may be performed by a wireless communication device operating as or within an AP, such as one of the APs 102 and 602 described above with reference to FIGS. 1 and 6A, respectively. For the example of FIG. 10H, the process 1070 is performed by the AP MLD described with reference to FIG. 9. In some implementations, the process 1070 of FIG. 10H may be performed after the AP MLD transmits the frame in block 904 of FIG. 9.

At block 1072, the first AP receives, from a secondary AP of the AP MLD associated with a respective secondary communication link, an indication of one or more critical updates for the respective secondary communication link. At block 1074, the first AP transmits, on the first communication link, an unsolicited broadcast probe response frame carrying a complete set of operation parameters for the respective secondary communication link. In some other implementations, the unsolicited broadcast probe response frame may carry only the portions of the operation parameters that were updated or changed.

In some implementations, the transmission of the unsolicited broadcast probe response frame occurs a time period after a most recent beacon frame transmission from the first AP of the AP MLD. In some instances, the most recent beacon frame transmission from the first AP of the AP MLD includes an indication of the transmission of the unsolicited broadcast probe response frame from the first AP of the AP MLD.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 11:
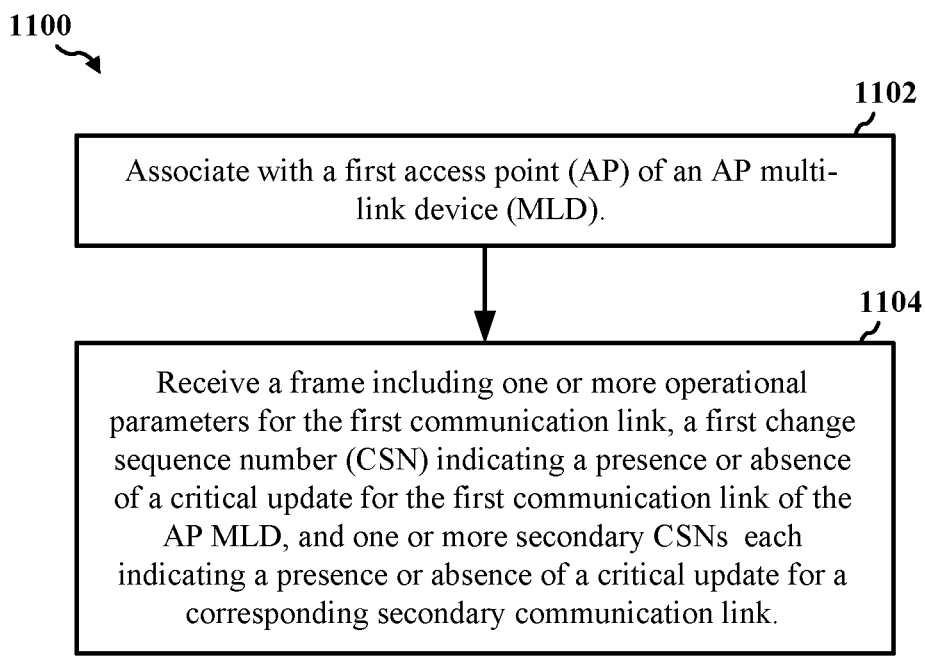
FIG. 11 shows a flowchart illustrating an example process for wireless communication that supports indicating critical updates for MLDs according to some implementations.

FIG. 11 shows a flowchart illustrating an example process 1100 for wireless communication that supports communications between MLDs according to some implementations. The process 1100 may be performed by a first wireless communication device such as the wireless communication device 500 described above with reference to FIG. 5. In some implementations, the process 1100 may be performed by a wireless communication device operating as or within a wireless station (STA), such as one of the STAs 104 and 604 described above with reference to FIGS. 1 and 6B, respectively. For the example of FIG. 11, the process 1100 is performed by a STA of a STA MLD.

At block 1102, the STA MLD associates with a first access point (AP) of an AP MLD. The AP MLD includes one or more secondary APs associated with one or more respective secondary communication links of the AP MLD. At block 1104, the STA MLD receives a frame from the first AP on a first communication link of the AP MLD. The frame may include one or more operation parameters for the first communication link, a first change sequence number (CSN) indicating a presence or absence of a critical update for the first communication link of the AP MLD, and one or more secondary CSNs, each secondary CSN of the one or more secondary CSNs indicating a presence or absence of a critical update for a corresponding secondary communication link of the one or more secondary communication links of the AP MLD.

In some implementations, the frame may be one of a beacon frame, a probe response frame, an association response frame, or a reassociation response frame. In some implementations, the critical update may correspond to a change in one or more operation parameters of a basic service set (BSS) associated with at least one of the first communication link or the one or more secondary communication links. In some implementations, the one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the first CSN may indicate a most recent critical update to the one or more operation parameters for the first communication link, and each secondary CSN of the one or more secondary CSNs may indicate a most recent critical update to the one or more operation parameters for the corresponding secondary communication link of the AP MLD. In some instances, the first CSN and the one or more secondary CSNs may be carried in a sequence counter field of the frame. In some other instances, the first CSN and the one or more secondary CSNs may be carried in an information element.

In some implementations, the frame may include a Multi-Link Element (MLE) carrying the one or more secondary CSNs. In some instances, the MLE may include one or more per-link profile subelements, each per-link profile subelement of the one or more per-link profile subelements carrying a corresponding secondary CSN of the one or more secondary CSNs. In some other instances, the MLE may include a common parameters field carrying the one or more secondary CSNs.

In some implementations, the frame may be a beacon frame including one or more per-link profile elements, each per-link profile element of the one or more per-link profile elements carrying the secondary CSN and a complete set of operation parameters for a corresponding secondary communication link of the one or more secondary communication links. In some instances, each per-link profile element of the one or more per-link profile elements may be an information element (IE) that includes the corresponding secondary CSN of the one or more secondary CSNs. In some other implementations, each per-link profile element may carry only the portions of the operation parameters that were updated or changed.

In some other implementations, the frame may include a multiple link attribute (MLA) element including one or more per-link profile subelements, each per-link profile subelement of the one or more per-link profile subelements carrying the secondary CSN and a complete set of operation parameters for a corresponding secondary communication link of the one or more secondary communication links. In some instances, the frame may include a reduced neighbor report (RNR) element carrying the one or more secondary CSNs. In some other instances, the RNR element may include one or more neighbor AP information fields, each neighbor AP information field of the one or more neighbor AP information fields carrying a corresponding secondary CSN of the one or more secondary CSNs.

In some implementations, the frame may be a beacon frame carrying one or more profiles, each profile of the one or more profiles carrying a complete set of operation parameters for a corresponding secondary communication link of the one or more secondary communication links. In some other implementations, the frame may further include one or more Do Not Transmit (DNT) indications, each DNT indication of the one or more DNT indications associated with a corresponding secondary communication link of the one or more secondary communication links of the AP MLD. In some instances, the frame may further include a DNT indication for the first communication link. Each DNT indication may indicate whether wireless communication devices are to refrain from transmitting on the corresponding secondary communication link of the AP MLD. In some instances, at least some of the wireless communication devices may monitor the first communication link but not the one or more secondary communication links for the DNT indications. In some implementations, the DNT indication for a respective secondary communication link may be based on one or more of a channel switch announcement for the respective secondary communication link, a quiet time announcement for the respective secondary communication link, or an unavailability of the secondary AP of the AP MLD associated with the respective secondary communication link.

Figure 12A:
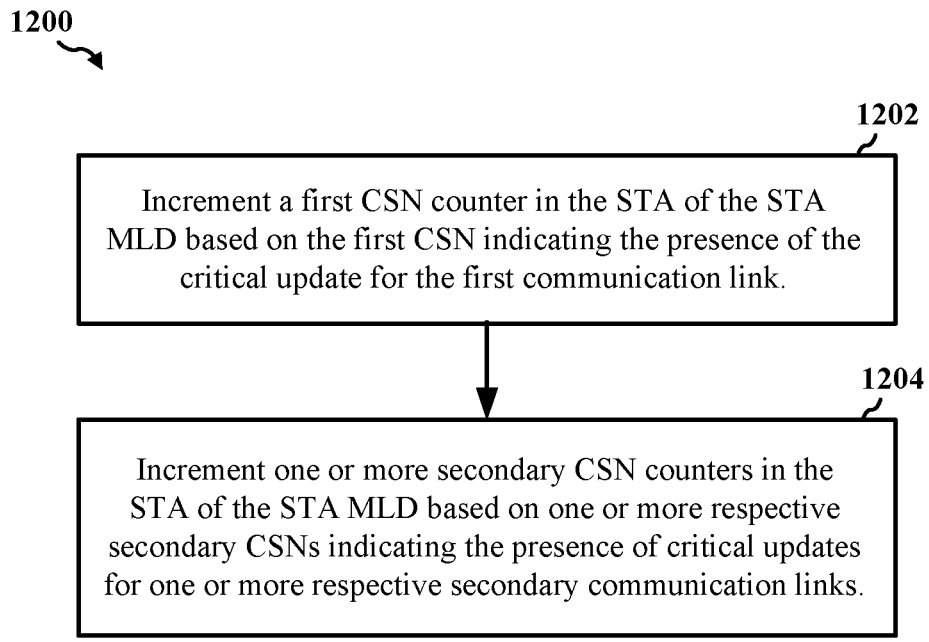
FIGS. 12A-12G show flowcharts illustrating example processes for wireless communication that supports indicating critical updates for MLDs according to some implementations.

FIG. 12A shows a flowchart illustrating an example process 1200 for wireless communication that supports communications between MLDs according to some implementations. The process 1200 may be performed by a first wireless communication device such as the wireless communication device 500 described above with reference to FIG. 5. In some implementations, the process 1200 may be performed by a wireless communication device operating as or within a wireless station (STA), such as one of the STAs 104 and 604 described above with reference to FIGS. 1 and 6B, respectively. For the example of FIG. 12A, the process 1200 is performed by a STA multi-link device (MLD). In some implementations, the process 1200 of FIG. 12A may be performed after the STA MLD receives the frame in block 1104 of FIG. 11.

At block 1202, the STA MLD increments a first CSN counter in the STA of the STA MLD based on the first CSN indicating the presence of the critical update for the first communication link of the AP MLD. At block 1204, the STA MLD increments one or more secondary CSN counters in the STA of the STA MLD based on the one or more respective secondary CSNs indicating the presence of the critical update for one or more respective secondary communication links of the AP MLD.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 12B:
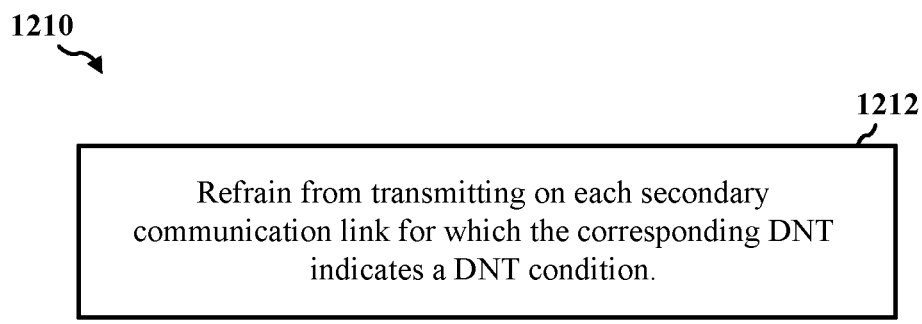

FIG. 12B shows a flowchart illustrating an example process 1210 for wireless communication that supports communications between MLDs according to some implementations. The process 1210 may be performed by a first wireless communication device such as the wireless communication device 500 described above with reference to FIG. 5. In some implementations, the process 1210 may be performed by a wireless communication device operating as or within a wireless station (STA), such as one of the STAs 104 and 604 described above with reference to FIGS. 1 and 6B, respectively. For the example of FIG. 12B, the process 1210 is performed by a STA multi-link device (MLD). In some implementations, the process 1210 of FIG. 12B may be performed after the STA MLD receives the frame in block 1104 of FIG. 11. At block 1212, the STA MLD refrains from transmitting on each secondary communication link for which the corresponding DNT indicates a DNT condition.

In some implementations, the frame may further include a DNT indication for the first communication link. In some instances, the DNT indication for the first communication link and the one or more DNT indications for the one or more respective secondary communication links may be carried in a bitmap of the frame.

In some implementations, the DNT indication for a respective secondary communication link may be based on one or more of a channel switch announcement for the respective secondary communication link, a quiet time announcement for the respective secondary communication link, or an unavailability of the secondary AP of the AP MLD associated with the respective secondary communication link.

In some implementations, each DNT indication of the one or more DNT indications may indicate whether wireless communication devices are to refrain from transmitting on the corresponding secondary communication link of the AP MLD. In some instances, the STA of the STA MLD may monitor the first communication link but not the one or more secondary communication links for the DNT indications.

In some implementations, the one or more DNT indications for the one or more respective secondary communication links may be carried in a Multi-Link Element (MLE) of the frame. In some instances, the MLE may include one or more per-link profile subelements, each per-link profile subelement of the one or more per-link profile subelements carrying the DNT indication for the corresponding secondary communication link of the one or more secondary communication links. In some other instances, the one or more per-link profile subelements may be an information element (IE). In some instances, the MLE may include a common parameters field carrying the one or more DNT indications for the one or more respective secondary communication links.

In some implementations, the frame may include a Multi-Link Element (MLE) including one or more per-link profile subelements, where each per-link profile subelement carries the DNT indication and a complete set of operation parameters for a corresponding secondary communication link.

In some implementations, the one or more DNT indications for the one or more respective secondary communication links may be carried in a reduced neighbor report (RNR) element of the frame. In some instances, the RNR element may include one or more neighbor AP information fields, where each neighbor AP information field carries the DNT indication for the corresponding secondary communication link.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 12C:
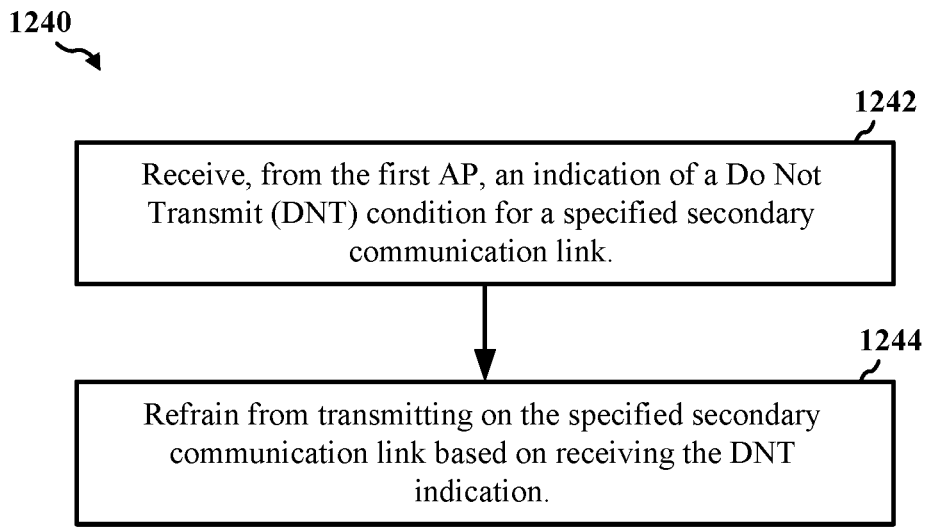

FIG. 12C shows a flowchart illustrating an example process 1220 for wireless communication that supports communications between MLDs according to some implementations. The process 1220 may be performed by a first wireless communication device such as the wireless communication device 500 described above with reference to FIG. 5. In some implementations, the process 1220 may be performed by a wireless communication device operating as or within a wireless station (STA), such as one of the STAs 104 and 604 described above with reference to FIGS. 1 and 6B, respectively. For the example of FIG. 12C, the process 1220 is performed by a STA multi-link device (MLD). In some implementations, the process 1220 of FIG. 12C may be performed after the STA MLD receives the frame in block 1104 of FIG. 11.

At block 1222, the STA MLD receives, from the first AP of the AP MLD on the first communication link, an indication of a Do Not Transmit (DNT) condition for a specified secondary communication link of the one or more secondary communication links of the AP MLD. At block 1224, the STA MLD refrains from transmitting on the specified secondary communication link based on receiving the DNT indication.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 12D:
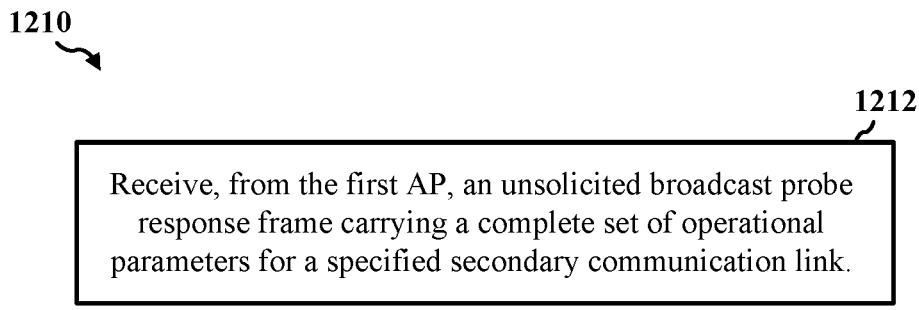

FIG. 12D shows a flowchart illustrating an example process 1230 for wireless communication that supports communications between MLDs according to some implementations. The process 1230 may be performed by a first wireless communication device such as the wireless communication device 500 described above with reference to FIG. 5. In some implementations, the process 1230 may be performed by a wireless communication device operating as or within a wireless station (STA), such as one of the STAs 104 and 604 described above with reference to FIGS. 1 and 6B, respectively. For the example of FIG. 12D, the process 1230 is performed by a STA multi-link device (MLD). In some implementations, the process 1230 of FIG. 12D may be performed after the STA MLD receives the frame in block 1104 of FIG. 11.

At block 1232, the STA MLD receives, from the first AP of the AP MLD on the first communication link, an unsolicited broadcast probe response frame carrying a complete set of operation parameters for a specified secondary communication link of the one or more secondary communication links.

In some implementations, transmission of the unsolicited broadcast probe response frame may occur a time period after a most recent beacon frame transmission from the first AP of the AP MLD. In some instances, the most recent beacon frame transmission from the first AP of the AP MLD may include an indication of the transmission of the unsolicited broadcast probe response frame from the first AP of the AP MLD. In some implementations, the unsolicited broadcast probe response frame may carry the complete set of operation parameters for each secondary communication link of the one or more secondary communication links.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 12E:
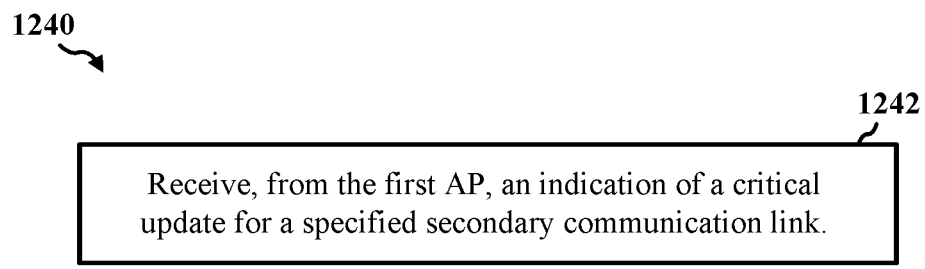

FIG. 12E shows a flowchart illustrating an example process 1240 for wireless communication that supports communications between MLDs according to some implementations. The process 1240 may be performed by a first wireless communication device such as the wireless communication device 500 described above with reference to FIG. 5. In some implementations, the process 1240 may be performed by a wireless communication device operating as or within a wireless station (STA), such as one of the STAs 104 and 604 described above with reference to FIGS. 1 and 6B, respectively. For the example of FIG. 12E, the process 1240 is performed by a STA multi-link device (MLD). In some implementations, the process 1240 of FIG. 12E may be performed after the STA MLD receives the frame in block 1104 of FIG. 11.

At block 1242, the STA MLD receives, from the first AP of the AP MLD on the first communication link, an indication of a critical update for a specified secondary communication link of the one or more secondary communication links of the AP MLD.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 12F:
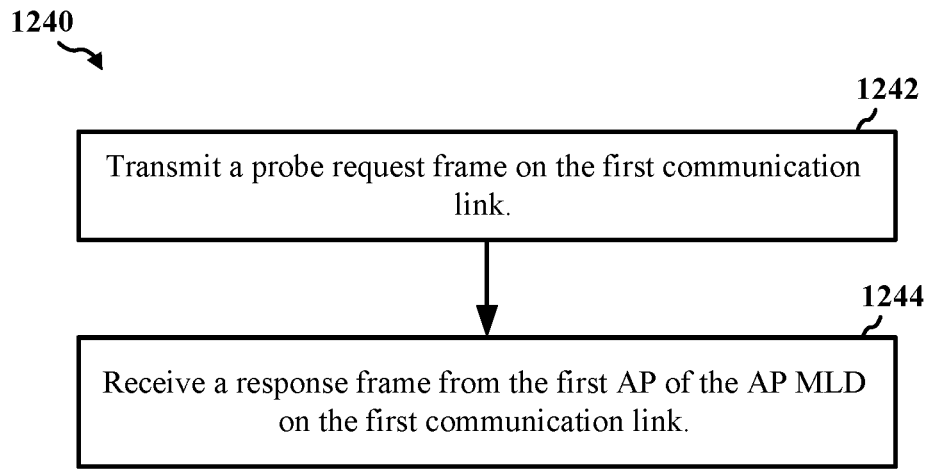

FIG. 12F shows a flowchart illustrating an example process 1250 for wireless communication that supports communications between MLDs according to some implementations. The process 1250 may be performed by a first wireless communication device such as the wireless communication device 500 described above with reference to FIG. 5. In some implementations, the process 1250 may be performed by a wireless communication device operating as or within a wireless station (STA), such as one of the STAs 104 and 604 described above with reference to FIGS. 1 and 6B, respectively. For the example of FIG. 12F, the process 1250 is performed by a STA multi-link device (MLD). In some implementations, the process 1250 of FIG. 12F may be performed after the STA MLD receives the indication of the critical update in block 1242 of FIG. 12E.

At block 1252, the STA MLD transmits a probe request frame on the first communication link. At block 1254, the STA MLD receives a response frame from the first AP of the AP MLD on the first communication link.

In some implementations, the response frame may carry a complete set of operation parameters for the specified secondary communication link. In some implementations, the response frame may carry a complete set of operation parameters for each secondary communication link of the one or more secondary communication links. In some implementations, the probe request frame may be a broadcast probe request frame.

In some implementations, the probe request frame may carry a CSN indicating a most-recently received critical update for the specified secondary communication link, and the response frame may carry an indication of the one or more secondary CSNs for the specified secondary communication link that were missed by the STA of the STA MLD. In some implementations, the response frame may be a unicast probe response frame carrying one or more critical updates for the specified secondary communication link that were missed by the STA.

In some implementations, the response frame may be one of a unicast probe response frame or a broadcast probe response frame that carries a complete set of operation parameters for the specified secondary communication link. In some implementations, the response frame may be a broadcast probe response frame that carries a complete set of operation parameters for each secondary communication link of the specified secondary communication link and the other non-specified secondary communication links.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 12G:
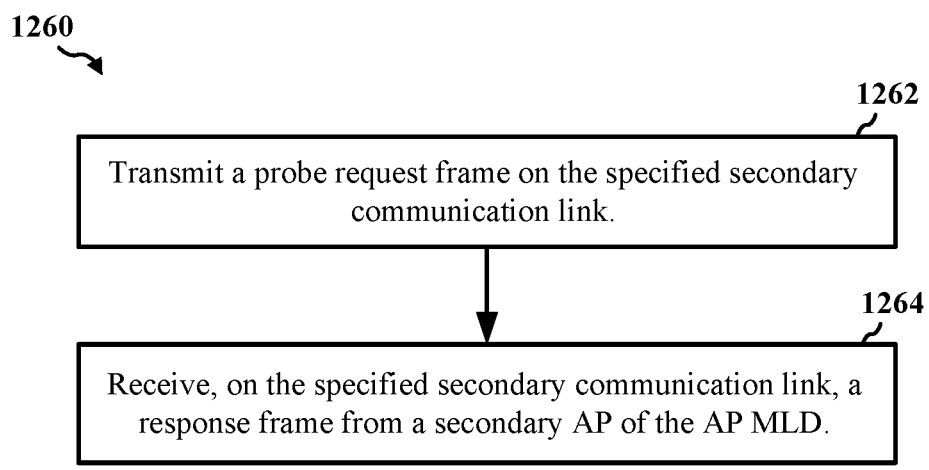

FIG. 12G shows a flowchart illustrating an example process 1260 for wireless communication that supports communications between MLDs according to some implementations. The process 1260 may be performed by a first wireless communication device such as the wireless communication device 500 described above with reference to FIG. 5. In some implementations, the process 1260 may be performed by a wireless communication device operating as or within a wireless station (STA), such as one of the STAs 104 and 604 described above with reference to FIGS. 1 and 6B, respectively. For the example of FIG. 12G, the process 1260 is performed by a STA multi-link device (MLD). In some implementations, the process 1260 of FIG. 12G may be performed after the STA MLD receives the indication of the critical update in block 1242 of FIG. 12E.

At block 1262, the STA MLD transmits a probe request frame on the specified secondary communication link. At block 1264, the STA MLD receives, on the specified secondary communication link, a response frame from a secondary AP of the AP MLD associated with the specified secondary communication link.

In some implementations, the response frame may carry a complete set of operation parameters for the specified secondary communication link. In some other implementations, the response frame may carry a complete set of operation parameters for each secondary communication link of the one or more secondary communication links. In some instances, the probe request frame may be a broadcast probe request frame.

In some implementations, the probe request frame may carry a CSN indicating a most-recently received critical update for the specified secondary communication link, and the response frame may carry an indication of the one or more secondary CSNs for the specified secondary communication link that were missed by the STA of the STA MLD. In some instances, the response frame may be a unicast probe response frame carrying one or more critical updates for the specified secondary communication link that were missed by the STA.

In some implementations, the response frame may be one of a unicast probe response frame or a broadcast probe response frame that carries a complete set of operation parameters for the specified secondary communication link. In some other implementations, the response frame may be a broadcast probe response frame that carries a complete set of operation parameters for each secondary communication link of the specified secondary communication link and the other non-specified secondary communication links.

In some implementations, the set of operation parameters may include one or more of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

Figure 13:
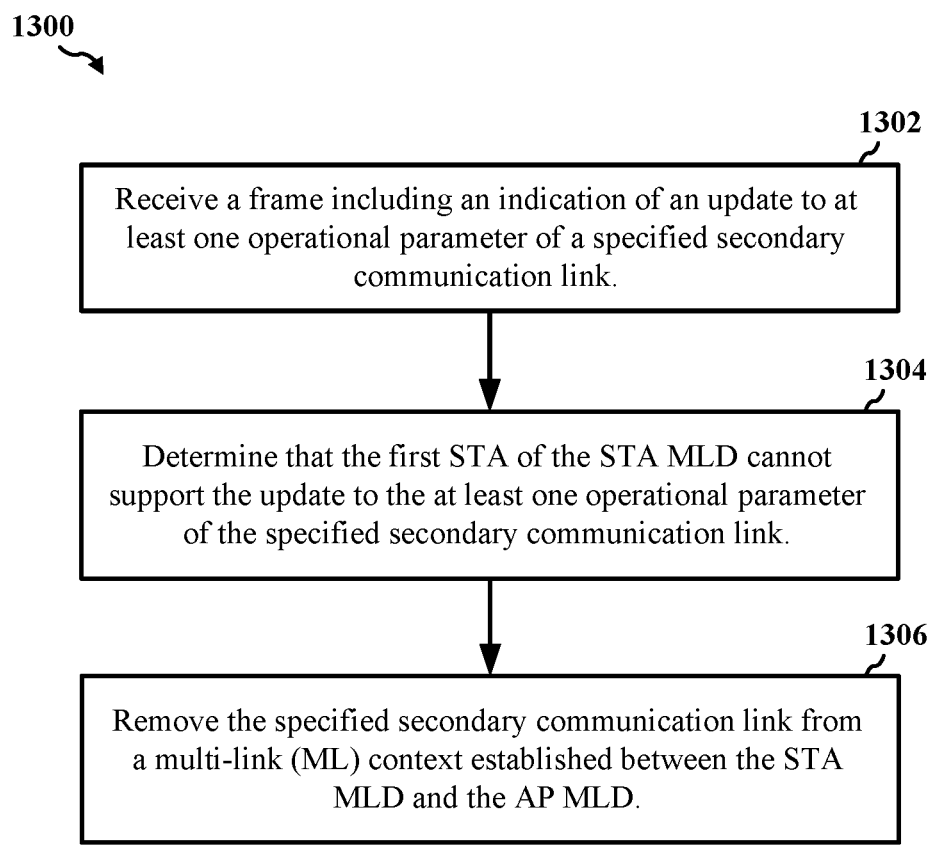
FIG. 13 shows a flowchart illustrating an example process for wireless communication that supports indicating critical updates for MLDs according to some other implementations.

FIG. 13 shows a flowchart illustrating an example process 1300 for wireless communication that supports communications between MLDs according to some implementations. The process 1300 may be performed by a first wireless communication device such as the wireless communication device 500 described above with reference to FIG. 5. In some implementations, the process 1300 may be performed by a wireless communication device operating as or within a wireless station (STA), such as one of the STAs 104 and 604 described above with reference to FIGS. 1 and 6B, respectively. For the example of FIG. 13, the process 1300 is performed by a STA MLD including at least a first STA. The first STA may be associated with a first communication link of an AP MLD, which may include one or more secondary communication links different than the first communication link. In some implementations, the AP MLD includes a first AP associated with the first communication link, and includes one or more secondary APs associated with one or more respective secondary communication links of the AP MLD.

At block 1302, the first STA receives a frame on the first communication link, the frame including an indication of an update to at least one operation parameter of a specified secondary communication link of the AP MLD. At block 1304, the STA MLD determines, based on receiving the indication of the update, that the first STA of the STA MLD cannot support the update to the at least one operation parameter of the specified secondary communication link. At block 1306, the STA MLD removes the specified secondary communication link from a multi-link (ML) context established between the STA MLD and the AP MLD.

In some implementations, the specified secondary communication link from the ML context may be removed by transmitting an action frame to the first AP of the AP MLD on the first communication link, the action frame including a request to update the ML context by removing the specified secondary communication link from the ML context. In some instances, the action frame may be a ML Setup Update Action frame. In some other instances, the action frame further may include an element including one or more updates to a traffic identifier (TID) mapping associated with the ML context. In some instances, the one or more updates to the traffic identifier (TID) mapping may include re-mapping TIDs from the specified secondary communication link to one or more of the first communication link or other non-specified secondary communication links of the one or more secondary communication links.

In some other implementations, the specified secondary communication link from the ML context may be removed by transmitting an action frame to the first AP of the AP MLD on the first communication link, the action frame including a request to disable the specified secondary communication link. In some other implementations, the specified secondary communication link is removed from the ML context without disassociating from the first AP of the AP MLD. In some instances, the specified secondary communication link is removed from the ML context without tearing down the ML context.

In some implementations, the specified secondary communication link from the ML context may be removed by re-mapping traffic identifiers (TIDs) from the specified secondary communication link to one or more of the first communication link or other non-specified secondary communication links of the one or more secondary communication links. In some other implementations, the specified secondary communication link from the ML context may be removed by maintaining a sleep or doze state of the STA MLD on the specified secondary communication link.

Figure 14A:
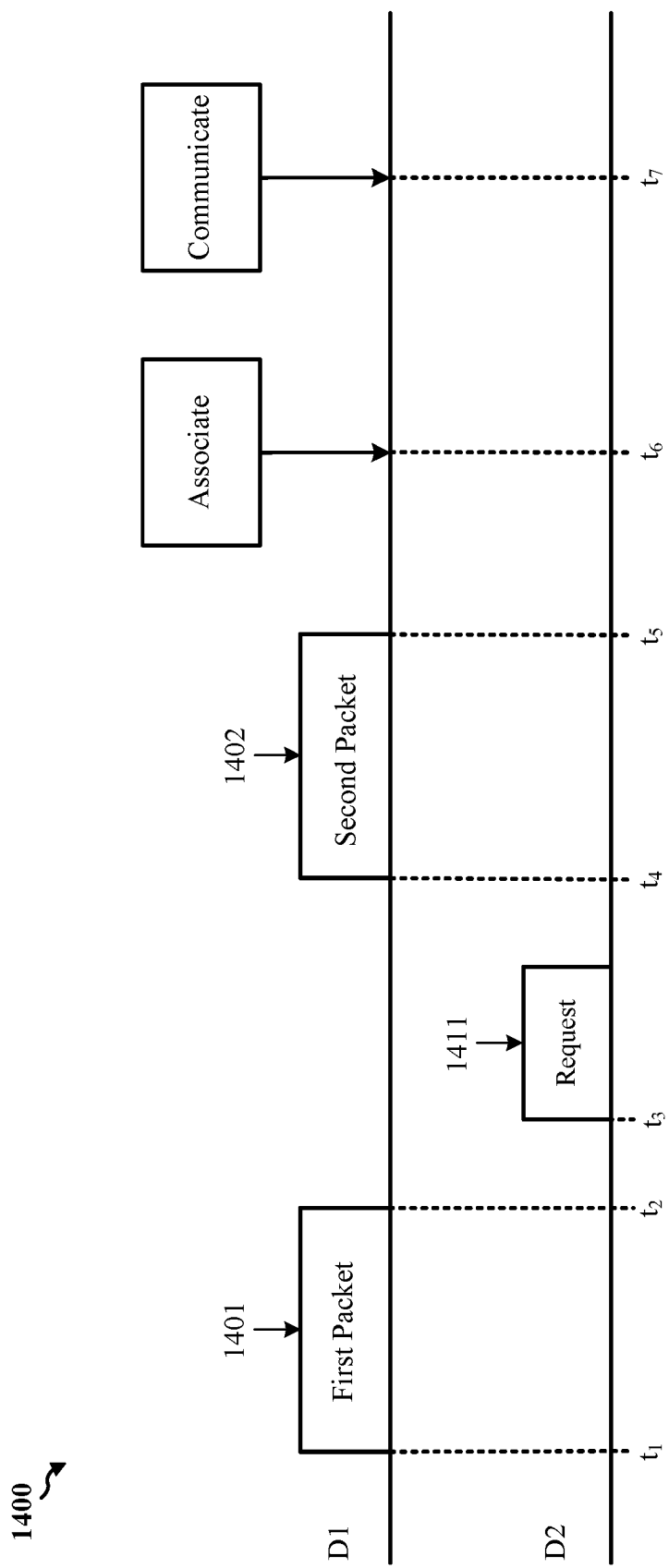
FIG. 14A shows a timing diagram depicting an example multi-link communication according to some implementations.

FIG. 14A shows a timing diagram depicting an example multi-link communication 1400 according to some implementations. In the example of FIG. 14A, the ML communication may be performed between a first wireless communication device ("first device D1") and a second wireless communication device ("second device D2"). Each of the devices D1 and D2 may be any suitable wireless communication device such as one of the STAs 104 and 604 described above with reference to FIGS. 1 and 6B, respectively, or one of the APs 102 and 602 described above with reference to FIGS. 1 and 6A, respectively. In the timing diagram 1400, the first device D1 may be the transmitting device, and the second device D2 may be the receiving device. Each of the first device D1 and the second device D2 may be an MLD. For example, the first device D1 may be an AP MLD, and the second device D2 may be a STA MLD.

At time $t_1$, the first device D1 transmits a first packet 1401 on a first communication link (not shown for simplicity), the first packet 1401 including ML information (such as capabilities and parameters) for at least the first communication link and a second communication link (not shown for simplicity). Although the example of FIG. 14A is described in terms of the first and the second communication links, in some implementations, there may be any number of additional communication links, such as a third, fourth, or fifth communication link. The first communication link and the second communication link may operate on different frequency bands or on different channels on the same frequency band. For example, the first communication link may operate on a 2.4 GHz frequency band, the second communication link may operate on a 5 GHz frequency band, and another link (not shown for simplicity) may operate on a 6 GHz frequency band. The first packet 1401 may be a beacon frame or any other frame that may be used to communicate ML information.

In some implementations, the ML information may include one or more of: a first operating class for the first communication link; a first wireless channel for the first communication link; a first BSSID for the first communication link; a second operating class for the second communication link; a second wireless channel for the second communication link; or a second BSSID for the second communication link. In some implementations, some or all of the ML information may be included in a link attribute element of the first packet 1401, as further described with respect to FIG. 14B and FIG. 15, or in a multiple link element of the first packet 1401, as further described with respect to FIG. 14B, FIG. 15, and FIGS. 16A-16C. In some aspects, at least one of the operating classes, the wireless channels, or the BSSIDs may be different. As one non-limiting example, a pair of AP entities having the same operating class may communicate on the same wireless channel. However, the pair of APs may be physically separate (non-collocated) and may thus have different MAC addresses (BSSIDs).

Between times $t_1$ and $t_2$, the second device D2 receives the first packet 1401 from the first device D1 on the first communication link. In some implementations, the first device D1 and the second device D2 may establish at least one ML communication parameter for communicating on the first and the second communication links, as further described with respect to FIG. 14B. In short, because the first packet 1401 includes ML information (such as ML capabilities, ML operating parameters and constraints, among other information) about all of the links that the first device D1 is operating on, aspects of the present disclosure enable a STA MLD (such as the second device D2) to discover an AP MLD (such as the first device D1) on any link that the AP MLD has setup a BSS.

At time $t_3$, the second device D2 transmits an MLA request 1411 on the first communication link based at least in part on the ML information. The MLA request 1411 may be an association request frame. In some implementations, the MLA request 1411 may include a preference for one or more of the first communication link or the second communication link to be designated as an anchor link, as further described with respect to FIG. 14B and FIG. 15. In some aspects, a client device (such as the second device D2) may save power by waiting (for a beacon, for example) on an anchor link while there is otherwise no active traffic.

Between times $t_3$ and $t_4$, the first device D1 receives the MLA request 1411 from the second device D2 on the first communication link. In some aspects, the MLA request 1411 may indicate one or more capabilities or security parameters of the second device D2.

At time $t_4$, the first device D1 transmits a second packet 1402 on the first communication link, the second packet 1402 including ML information for at least the first communication link and the second communication link. In some implementations, the second packet 1402 may be an association response frame. In some other implementations, the second packet 1402 may be some other appropriate frame. In some aspects, the second packet 1402 may confirm or renegotiate one or more of the second device D2 capabilities for association over multiple links. Thus, the first device D1 and the second device D2 may establish a common security context that may apply to the multiple links. For example, the first device D1 and the second device D2 may establish a single encryption key that may apply to each of the first communication link and the second communication link.

In some implementations, the first device D1 may assign a different AID for each link. For example, in the second packet 1402, the first device D1 may indicate that the AID is 25 for the first communication link and the AID is 26 for the second communication link. In some other implementations, the first device D1 may assign a common AID across all links.

Between times $t_4$ and $t_5$, the second device D2 receives the second packet 1402 from the first device D1 on the first communication link. Then, at time $t_6$, the first device D1 associates with the second device D2 based at least in part on the ML information in the second packet 1402. In some implementations, between times $t_6$ and $t_7$, the first device D1 and the second device D2 may establish a BA session for at least one TID. Finally, at time $t_7$, the first device D1 may communicate with the second device D2 on the first or the second communication link based on the association with the second wireless communication device on the first communication link.

By exchanging the ML information included in the first packet 1401, the first device D1 and the second device D2 may implement aspects of the present disclosure to provide faster discovery of links available for communication between the first device D1 and the second device D2. Further, by exchanging the ML information included in the second packet 1422 or the MLA request 1431, the first device D1 or the second device D2 also may implement aspects of the present disclosure to provide faster switching between links and more efficient communications over the links. For example, the first device D1 and the second device D2 may switch from communicating over the first communication link to the second communication link without disassociation or reassociation, saving time and resources. Specifically, the second device D2 may receive ML information (such as in the first packet 1401) for the first communication link, the second communication link, or any links on which the first device D1 has setup a BSS. Thus, aspects of the present disclosure enable the second device D2 to discover the first device D1 on any link that the first device D1 has setup a BSS.

Figure 14B:
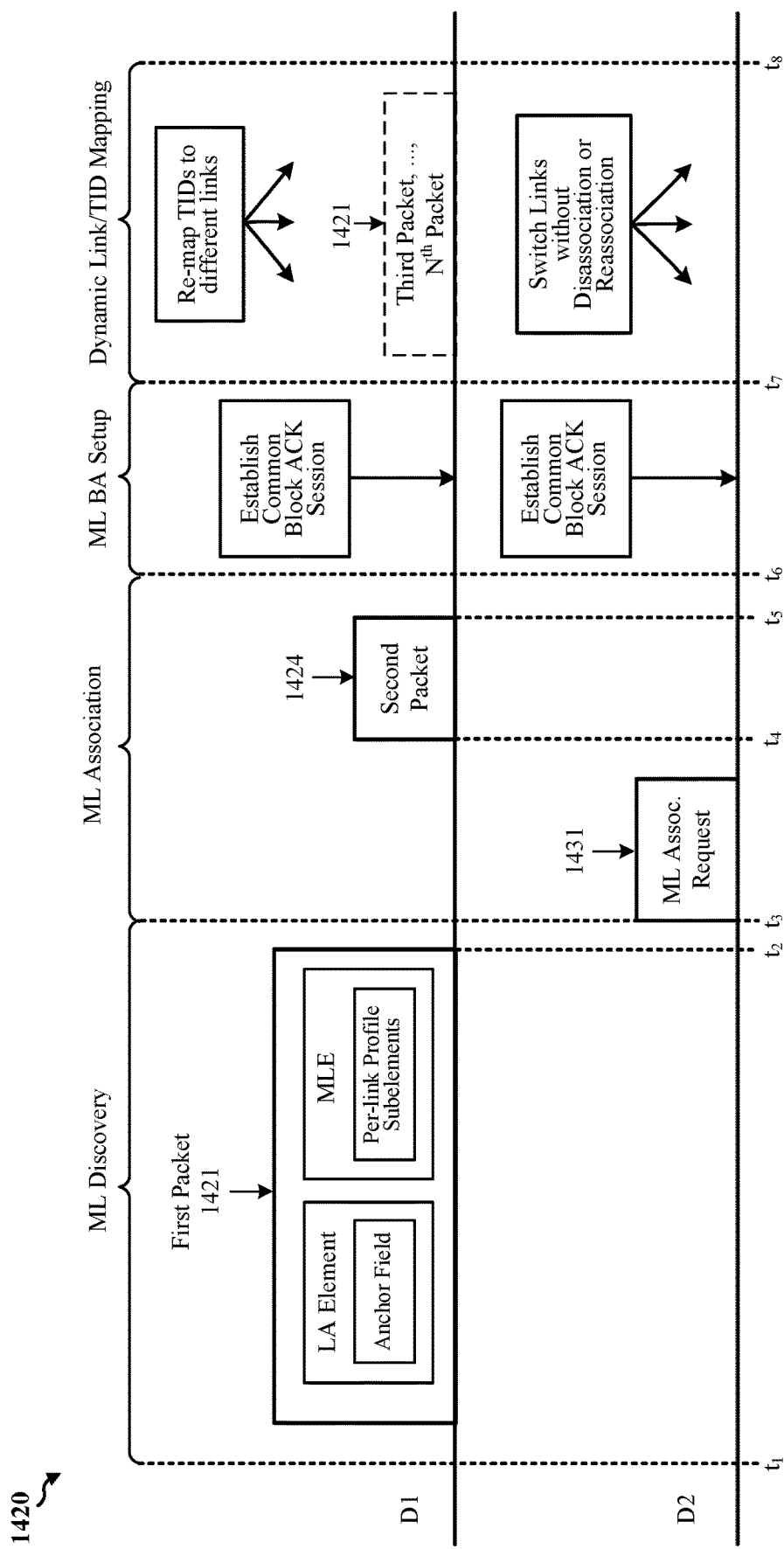
FIG. 14B shows a timing diagram depicting an example multi-link communication according to some implementations.

FIG. 14B shows a timing diagram depicting an example multi-link communication 1420 according to some implementations. In the example of FIG. 14B, the communications may be exchanged between a first wireless communication device ("first device D1") and a second wireless communication device ("second device D2"). Each of the devices D1 and D2 may be any suitable wireless communication device such as one of the STAs 104 and 604 described above with reference to FIGS. 1 and 6B, respectively, or one of the APs 102 and 602 described above with reference to FIGS. 1 and 6A, respectively. In the timing diagram 1420, the first device D1 may be the transmitting device, and the second device D2 may be the receiving device. Each of the devices D1 and D2 may be an MLD. In some implementations, the multi-link communication 1420 may be a more detailed example of the multi-link communication 1400 shown in FIG. 14A.

At time $t_1$, the first device D1 transmits the first packet 1421 on a first communication link (not shown for simplicity). As described with respect to FIG. 14A, the first packet 1421 may include ML information for at least the first communication link and a second communication link (not shown for simplicity). Although the example of FIG. 14B is described in terms of the first and the second communication links, in some implementations, there may be any number of additional communication links, such as a third, fourth, or fifth communication link. For example, the first packet 1421 may uniquely identify each link based on a limited set of information (tuple). In some implementations, the tuple may include {operating class, channel, and BSSID}, which may be indicated in a field (such as a 6-octet field) of the first packet 1421, where operating class indicates an operating class for the link, channel indicates a channel for the link, and BSSID indicates a BSSID for the link. An example operating class may be one of a 2.4 GHz frequency spectrum, a 5 GHz frequency spectrum, or a 6 GHz frequency spectrum.

In the example of FIG. 14B, the first packet 1421 is shown to include a Link Attribute Element. "Link Attribute Element" is an example name, and in some implementations, the Link Attribute Element may have any other name. The Link Attribute Element may include certain ML information for one or more links. In some instances, the Link Attribute Element may include discovery information such as a first operating class, a first wireless channel, and a first BSSID for the first communication link.

The Link Attribute Element also is shown to include an Anchor Field in this example. The Anchor field may indicate that the first communication link is an anchor link. For example, the first communication link may be an anchor link if the Anchor bit is set to 1, or some other appropriate value, in the profile for the first communication link in the Link Attribute Element. In addition, or in the alternative, the Anchor Field may indicate that the first communication link is not an anchor link. For example, the first communication link may not be an anchor link if the Anchor bit is set to 0, or some other appropriate value, in the profile for the first communication link in the Link Attribute Element. In some other implementations, setting the Anchor bit of the Anchor Field to 0 may indicate that the first device D1 has not designated an anchor link.

The first packet 1421 also is shown to include a Multi-Link Element (MLE). "The Multi-Link Element" is an example name, and in some implementations, the MLE may have any other name. The MLE may include certain ML information for one or more links other than the first or first communication link. As an example, the MLE may include ML information for one or more secondary communication links (such as the second communication link and a third communication link). For purposes of discussion herein, the first communication link may be referred to as the "first communication link," and each of the one or more other links (such as the second communication link) may be referred to as a "secondary communication link." The MLE may include one or more per-link profile subelements, each of which may include ML information specific to a different secondary communication link. As an example, one of the per-link profile subelements may include a second operating class, a second wireless channel, and a second BSSID for the second communication link. In some implementations, the per-link profile subelement for the second communication link may indicate one or more link attributes that are different between the first communication link and the second communication link. Example implementations of the MLE are shown in FIG. 15 and FIGS. 16A-16C.

Between times $t_1$ and $t_2$, the second device D2 receives the first packet 1421 from the first device D1 on the first communication link. In some implementations, the first device D1 and the second device D2 may establish at least one ML communication parameter for communicating on the first communication link based on information included in the Link Attribute Element. Some example ML communication parameters may include, but are not limited to, a frequency band, high-throughput (HT) capabilities, very high-throughput (VHT) capabilities, high-efficiency (HE) capabilities, or extremely high-throughput (EHT) capabilities. In some implementations, the first device D1 and the second device D2 may establish at least one ML communication parameter for communicating on a different communication link based on information included in the MLE. For example, the first device D1 and the second device D2 may establish at least one ML communication parameter for communicating on the second communication link based on information included in the corresponding per-link profile subelement for the second communication link in the MLE. In some aspects, at least one of the ML communication parameters may be the same for each of the first and the second communication links.

At time $t_3$, the second device D2 transmits an MLA request 1431 on the first communication link based at least in part on the ML information included in the first packet 1421. In some implementations, such as when the Anchor Field of the first packet 1421 has not designated an anchor link, the MLA request 1431 may indicate a preference for one or more of the first communication link or the second communication link to be designated as an anchor link. For example, the second device D2 may indicate its preference for an anchor link by setting the Anchor bit to 1 for the preferred anchor link in the MLA request 1431. In some aspects, the second device D2 may indicate more than one preferred anchor link by setting the Anchor bit to 1 for each of the preferred anchor links in the MLA request 1431.

Between times $t_3$ and $t_4$, the first device D1 receives the MLA request 1431 from the second device D2 on the first communication link.

At time $t_4$, the first device D1 transmits a second packet 1422 on the first communication link, the second packet 1422 including ML information for at least the first communication link and the second communication link. In some implementations, if the second device D2 indicated a preference for an anchor link in the MLA request 1431, the first device D1 may indicate an assigned anchor link for the second device D2 by setting the Anchor bit to 1 (or some other appropriate value) for one of the links in the second packet 1422. In some aspects, even though the second device D2 may indicate a preference for a particular link to be designated as the anchor link, the first device D1 may designate one or more different links as anchor links.

Between times $t_4$ and $t_5$, the second device D2 receives the second packet 1422 from the first device D1 on the first communication link. Using the ML information in the second packet 1402, the first device D1 and the second device D2 may then associate, for example, between times $t_5$ and $t_6$. In some implementations, the first device D1 and the second device D2 may associate by establishing a common security context between a first MAC-SAP endpoint of the first wireless communication device and a second MAC-SAP endpoint of the second wireless communication device. In some aspects, each of the first and second MAC-SAP endpoints may be used to communicate over both the first and second communication links. In some aspects, the common security context may include a single encryption key shared by the first MAC-SAP endpoint and the second MAC-SAP endpoint.

Between times $t_6$ and $t_7$, the first device D1 and the second device D2 may establish a common BA session together for one or more TIDs. Thus, the first device D1 and the second device D2 may map MSDUs for the one or more TIDs with one or more of the first and the second communication links. By establishing the common BA session and mapping the one or more TIDs, the first device D1 and the second device D2 may implement aspects of the present disclosure to map (or remap, affiliate, or reaffiliate) the one or more TIDs to multiple links without tearing-down the common BA session or establishing a new BA session. Then, the first device D1 and the second device D2 may communicate on the first communication link or the second communication link according to their respectively mapped TIDs. In some implementations, the BA session may be established during "MLA Setup," between times $t_3$ and $t_6$.

After time $t_7$, one or more link conditions (such as an amount of latency) may change, causing the first device D1 to remap one or more of the TIDs to one or more different links. As a non-limiting example, between times $t_6$ and $t_7$, the first device D1 may have initially mapped a first TID (such as TID=4) to the first communication link. Thus, the first device D1 and the second device D2 may exchange packets with TID=4 on the first communication link prior to time $t_7$. After time $t_7$, the first device D1 may remap TID=4 to the second communication link. In some implementations, the first device D1 may indicate the remapping of TID=4 to the second device D2 in a third packet 1423. In some aspects, the first device D1 may indicate the remapping of TID=4 in an ADDBA Capabilities field of the third packet 1423. In some implementations, the first device D1 may transmit one or more additional packets between times $t_7$ and $t_8$, as indicated by $N^{th}$ Packet.

Between times $t_7$ and $t_8$, the first device D1 may remap one or more TIDs from one communication link to another communication link. The first device D1 may indicate the remapping to the second device D2 in the third packet 1423. For example, the first device D1 may remap a first TID (such as TID=4) from the first communication link to the second communication link and indicate the remapping in the third packet 1423. Upon receiving the third packet 1423, the second device D2 may switch from sending packets with TID=4 on the first communication link to sending packets with TID=4 on the second communication link. Since the second device D2 has already received information about each of the first and the second communication links from the first packet 1421 or the second packet 1422, the second device D2 may switch from communicating over the first communication link for TID=4 to communicating over the second communication link for TID=4 without disassociating from or re-associating with the first device D1, saving time and resources.

As another non-limiting example, the first device D1 and the second device D2 may establish a common BA session together. In some implementations, the first device D1 may indicate that one or more of the communication links are active or enabled (available for communication) or that one or more of the communication links are not active or disabled (not available for communication). In this example, the first device D1 may indicate that each of the first and the second communication links are active and that a third communication link is inactive. For example, while establishing the common BA session, the first device D1 may set a first bit corresponding to the first communication link to 1, a second bit corresponding to the second communication link to 1, and a third bit corresponding to the third communication link to 0. Thus, the common BA session may map TID=4 to the first communication link and the second communication link and not the third communication link. Then, conditions for one or more of the links may change. For example, interference on the third communication link may decrease, and interference on the second communication link may increase. Thus, in this example, the first device D1 may transmit a single signal (such as the third packet 1423) to dynamically remap TID=4 to the first communication link and the third communication link. For example, the third packet 1423 may indicate that the first bit is set to 1, the second bit is set to 0, and the third bit is set to 1. Since the second device D2 has already received information about each of the communication links and setup the common BA session with the first device D1, the second device D2 may dynamically switch from communicating over the first and the second communication links for TID=4 to communicating over the first and the third communication links for TID=4 without disassociating from or re-associating with the first device D1, and without transmitting additional communications to the first device D1, saving time and resources.

In addition, or in the alternative, the first device D1 may dynamically map one or more other TIDs to any subset of the communication links using the third packet 1423. As a non-limiting example, the third packet 1423 may dynamically map TID=2 to the third communication link, TID=5 to the first communication link and the second communication link, TID=3 to a fourth communication link, and TID=6 to all of the first, the second, the third, and the fourth communication links. In addition, or in the alternative, a client device may indicate to the first device D1 that the client device is capable of operating on a single link, despite there being more than one link enabled. For example, the second device D2 may have one antenna and thus be capable of operating on a single link. In this example, the first device D1 may dynamically map TIDs to a single communication link for communications with the second device D2.

Figure 15:
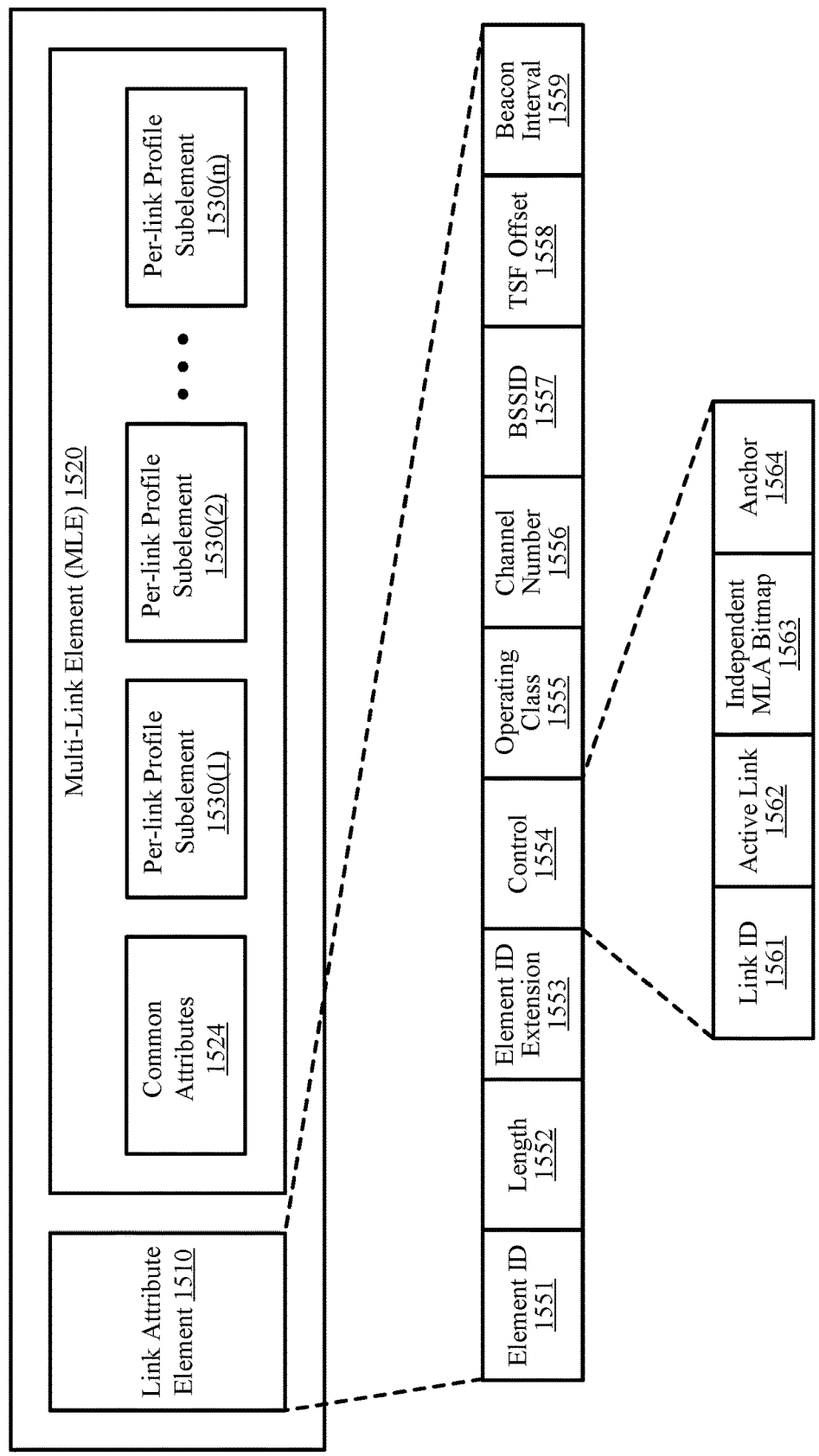
FIG. 15 shows an example frame including a Link Attribute Element and a Multi-Link Element (MLE) usable for communications between wireless communication devices.

FIG. 15 shows an example frame 1500 including a Link Attribute Element 1510 and a Multi-Link Element (MLE) 1520 usable for communications between wireless communication devices. The frame 1500 may be a beacon frame, an association frame, or some other appropriate frame. In some aspects, the frame 1500 may be an example implementation of the first packet 1401, the MLA request 1411, or the second packet 1402 described with respect to FIG. 14A, or an example implementation of the first packet 1421, the MLA request 1431, the second packet 1422, or the third packet 1423 described with respect to FIG. 14B. In some implementations, the frame 1500 may be transmitted by the first device D1 and received by the second device D2, or vice versa. For ease of explanation, some information elements of the frame 1500 may also be referred to as a "field," a "subfield," an "element," or a "subelement," which may be considered interchangeable terms for purposes of discussion herein. In some implementations, the information elements of the frame 1500 may be referred to with any other appropriate term.

The Link Attribute Element 1510 may include information about the first communication link described with respect to FIG. 14A and FIG. 14B. In some implementations, the Link Attribute Element 1510 may include discovery information for the first communication link of an MLD. In some other implementations, the Link Attribute Element 1510 may include discovery information for one or more secondary communication links of the MLD.

The Link Attribute Element 1510 is shown to include a plurality of fields, including: an Element ID field 1551, a Length field 1552, an Element ID Extension field 1553, a Control field 1554, an Operating Class field 1555, a Channel Number field 1556, a BSSID field 1557, a Timing Synchronization Function (TSF) Offset field 1558, and a Beacon Interval field 1559. In some implementations, the Element ID field 1551 may be 1 octet long and include an identifier for the Link Attribute Element 1510. In some aspects, the Link Attribute Element 1510 may facilitate the establishment of a common BA session between the first device D1 and the second device D2, as described with respect to FIG. 14B. In some implementations, the Length field 1552 may be 1 octet long and indicate a length of the Link Attribute Element 1510. In some implementations, the Element ID Extension field 1553 may be 1 octet long. In some implementations, the Operating Class field 1555 may be 0 octets or 1 octet long and indicate an operating class for the first communication link. In some implementations, the Channel Number field 1556 may be 0 octets or 1 octet long and indicate a channel number for the first communication link.

In some implementations, the BSSID field 1557 may be 0 or 6 octets long and indicate a BSSID associated with the first communication link. In some implementations, the TSF Offset field 1558 may be 0 or 2 octets long and indicate a TSF offset timing value for packets transmitted over the first communication link. In some aspects, a value of 0 in the TSF Offset field 1558 and the Beacon Interval field 1559 may indicate that the first device D1 is not transmitting beacons on the first communication link. In some implementations, the Beacon Interval field 1559 may be 0 or 2 octets long and indicate a beacon interval for beacons transmitted over the first communication link. In some aspects, the values in the TSF Offset field 1558 or the Beacon Interval field 1559 may facilitate faster link switching for certain types of non-AP entities, such as a STA MLD with a single radio. In some implementations, the first device D1 may indicate that beacons will not be sent on one or more links. For example, the first device D1 may indicate that it is capable of communicating on the second communication link and that the second communication link is dedicated as a data-only channel. In this way, the first device D1 may indicate that the second device D2 may utilize the second communication link but that the first device D1 will not broadcast beacons on the second communication link.

In some implementations, the Control field 1554 may be 1 octet long (8 bits) and include a plurality of subelements, or "subfields," "fields," or "control information." The plurality of subelements may include: a Link ID subelement 1561 (bits 1 and 2), an Active Link subelement 1562 (bit 3), an Independent MLA Bitmap subelement 1563 (bits 4-7), and an Anchor subelement 1564 (bit 8). In some implementations, the Link ID subelement 1561 may include a unique identifier for the first communication link. In some aspects, the first device D1 may assign the unique identifier. In some implementations, the Control field 1554 may not include the Link ID subelement 1561 or the Link ID subelement 1561 may be included in some other portion of the frame 1500. In some implementations, the Active Link subelement 1562 may indicate whether the first communication link is currently enabled. As a non-limiting example, the first device D1 may indicate that it is capable of operating on one or more links, and the first device D1 may provide channel numbers and BSSIDs for each of the one or more links. In some implementations, the Active Link subelement 1562 may indicate one or more links that the first device D1 is not operating on. As an example, the first device D1 may indicate that a particular link is disabled so that certain types of (such as non-EHT) devices do not attempt to communicate over the particular link.

In some aspects, the bit of the Active Link subelement 1562 may be reserved for the first communication link. In some implementations, the Independent MLA Bitmap subelement 1563 may be a bitmap that indicates a particular (second) link with which the first communication link may perform independent multi-link association (MLA). In some aspects, a bit position of the Independent MLA Bitmap subelement 1563 may correspond to the value of the Link ID subelement 1561. In some aspects, the bitmap may be a two-bit link identifier capable of indicating up to four combinations, 0-3. For example, if the second bit is turned on (set to 1) for the second communication link, then the first communication link may be capable of operating independently with respect to the second communication link.

In some implementations, the Anchor subelement 1564 may indicate whether the first communication link is designated as an anchor link. In some aspects, for an auxiliary link, if the Active Link subelement 1562 is set to 0 for a particular link, the Anchor subelement 1564 may be reserved, and the particular link may be unavailable as an anchor link.

For the example of FIG. 15, the fields 1551-1559 are included in the Link Attribute Element 1510. In some implementations, the Link Attribute Element 1510 may not include one or more of the fields 1551-1559 or subelements 1561-1564. In some implementations, the Link Attribute Element 1510 may include one or more different information elements. As one non-limiting example, the Link Attribute Element 1510 may not include any of the Operating Class field 1555, the Channel Number field 1556, the BSSID field 1557, the TSF Offset field 1558, or the Beacon Interval field 1559. As another non-limiting example, the Link Attribute Element 1510 may include each of the Operating Class field 1555, the Channel Number field 1556, the BSSID field 1557, the TSF Offset field 1558, and the Beacon Interval field 1559.

The MLE 1520 is also shown to include a Common Attributes subelement 1525 and one or more Per-link Profile Subelements 1530(1)-1530(n). The Common Attributes subelement 1525 may include one or more attributes common to each of the communication links associated with an MLD (such as the first device D1 and the second device D2). In some instances, each of the Per-link Profile Subelements 1530(1)-1530(n) may include a value of the most-recent critical update for a respective secondary AP of the AP MLD. In other instances, each of the Per-link Profile Subelements 1530(1)-1530(n) may indicate a presence or absence of a critical update associated with the respective secondary AP of the AP MLD. In some other implementations (not shown for simplicity), each of the Per-link Profile Subelements 1530(1)-1530(n) may include each of the Operating Class field 1555, the Channel Number field 1556, the BSSID field 1557, the TSF Offset field 1558, and the Beacon Interval field 1559, as further described with respect to FIG. 11. And in some other implementations (not shown for simplicity), each of the Per-link Profile Subelements 1530(1)-1530(n) may not include any of the Operating Class field 1555, the Channel Number field 1556, the BSSID field 1557, the TSF Offset field 1558, or the Beacon Interval field 1559.

FIG. 16A shows an example MLE 1600 usable for communications between wireless communication devices. In some aspects, the MLE 1600 may be an example implementation of the MLE 1520 described with respect to FIG. 15. In some implementations, the MLE 1520 may be included in a frame (such as the frame 1500, a beacon frame, an association request frame, an association response frame, or any other appropriate frame) transmitted by the first device D1 and received by the second device D2, or vice versa. For ease of explanation, some information elements of the MLE 1600 may be referred to as a "field," a "subfield," an "element," or a "subelement," which may be considered interchangeable terms for purposes of discussion herein. In some implementations, the information elements of the MLE 1600 may be referred to with any other appropriate term.

The MLE 1600 is shown to include a plurality of fields, including: an Element ID field 1601, a Length field 1602, an Element ID Extension field 1603, a Common Parameters field 1604, and one or more Optional Subelements fields 1605. In some implementations, the Element ID field 1601 may be 1 octet long and include an identifier for the MLE 1600. In some implementations, the Length field 1602 may be 1 octet long and indicate a length of the MLE 1600. In some implementations, the Element ID Extension field 1603 may be 1 octet long. In some implementations, the Common Parameters field 1604 may be 1 octet long and include common information for each of the secondary communication link. Although only one Optional Subelement field 1605 is shown for simplicity, the MLE 1600 may include any suitable number of Optional Subelements fields 1605.

In some implementations, each of the Optional Subelements fields 1605 may correspond to one of the secondary communication links, and may include ML information (or "ML attributes") for the corresponding secondary communication link that differs from the first communication link. To save bits, in some aspects, ML attributes that are not included in a corresponding MLE 1600 may be assumed to be inherited from the first communication link. As one non-limiting example, a Link Attribute Element, such as the Link Attribute Element 1510 of FIG. 15, may include a beacon interval for the first communication link, and the Optional Subelements field 1605 corresponding to a secondary communication link may not include a beacon interval for the secondary communication link. In this example, the beacon interval for the secondary communication link may be inherited from the beacon interval for the first communication link included in the Link Attribute Element 1510. In this way, one or more information elements in the Optional Subelements field 1605 corresponding to the secondary communication link may be excluded, or may include different information. In some implementations, the MLE 1600 may include a single Optional Subelements field 1605 that includes ML information for all or a subset of the secondary communication link.

The Optional Subelements field 1605 is shown to include a plurality of fields, including: a Subelement ID=0 field 1611, a Length field 1612, and a Data field 1613. In some implementations, the Subelement ID=0 field 1611 may be 1 octet long and include an identifier (such as a value from 0-255) of the corresponding Optional Subelements field 1605. In some aspects, values 1-255 may be reserved.

In some implementations, the Length field 1612 may be 1 octet long and indicate a length of the corresponding Optional Subelements field 1605. In some implementations, the Data field 1613 may be of variable length, and may include ML information for a corresponding secondary communication link. In some implementations, the Data field 1613 may be an example implementation of one of the Per-link Profile Subelements 1530(1)-1530(n) described with respect to FIG. 15.

FIG. 16B shows an example Data field 1620 usable for communications between wireless communication devices. The Data field 1620 may be an example implementation of the Data field 1613 of FIG. 16A, and is shown to include a plurality of fields, including an Element ID field 1621, a Length field 1622, an Element ID Extension field 1623, a Control field 1624, an Operating Class field 1625, a Channel Number field 1626, a BSSID field 1627, a TSF Offset field 1628, and a Beacon Interval field 1629, which may be the same or similar to the Element ID field 1551, the Length field 1552, the Element ID Extension field 1553, the Control field 1554, the Operating Class field 1555, the Channel Number field 1556, the BSSID field 1557, the TSF Offset field 1558, and the Beacon Interval field 1559, described with respect to FIG. 15, respectively.

In some implementations, the Control field 1624 may be 1 octet long (8 bits) and include a plurality of subelements including: a Link ID subelement 1641 (bits 1 and 2), an Active Link subelement 1642 (bit 3), an Independent MLA Bitmap subelement 1643 (bits 4-7), and an Anchor subelement 1644 (bit 8), which may be the same or similar to the Link ID subelement 1561, the Active Link subelement 1562, the Independent MLA Bitmap subelement 1563, and the Anchor subelement 1564, described with respect to FIG. 15, respectively, except including information about the corresponding secondary communication link, rather than the first communication link.

In some implementations, one or more information elements may be combined, added, moved (to one or more other information elements), removed, or otherwise modified for the MLE 1600. Furthermore, the names shown for information elements associated with the MLE 1600 are example names, and in some implementations, one or more of the information elements 1601-1644 may have a different name.

FIG. 16C shows an example Data field 1630 usable for communications between wireless communication devices. In some implementations, the Data field 1630 may be an example implementation of the Data field 1613 of the Optional Subelements field 1605 of FIG. 16A. The Data field 1630 is shown to include an Element ID field 1631, a Length field 1632, and an Element ID Extension field 1633. The Element ID field 1631, the Length field 1632, and the Element ID Extension field 1633 may be the same or similar to the Element ID field 1601, the Length field 1602, and the Element ID Extension field 1603, respectively, except that the Element ID field 1631, the Length field 1632, and the Element ID Extension field 1633 may include information about the corresponding secondary communication link, rather than the MLE 1600. In some aspects, the Element ID Extension field 1633 may be 0 octets or 1 octet long. The Data field 1634 may be of variable length, and may indicate HT capabilities, VHT capabilities, HE capabilities, EHT capabilities, MLD capabilities, among other capabilities.

Figure 17A:
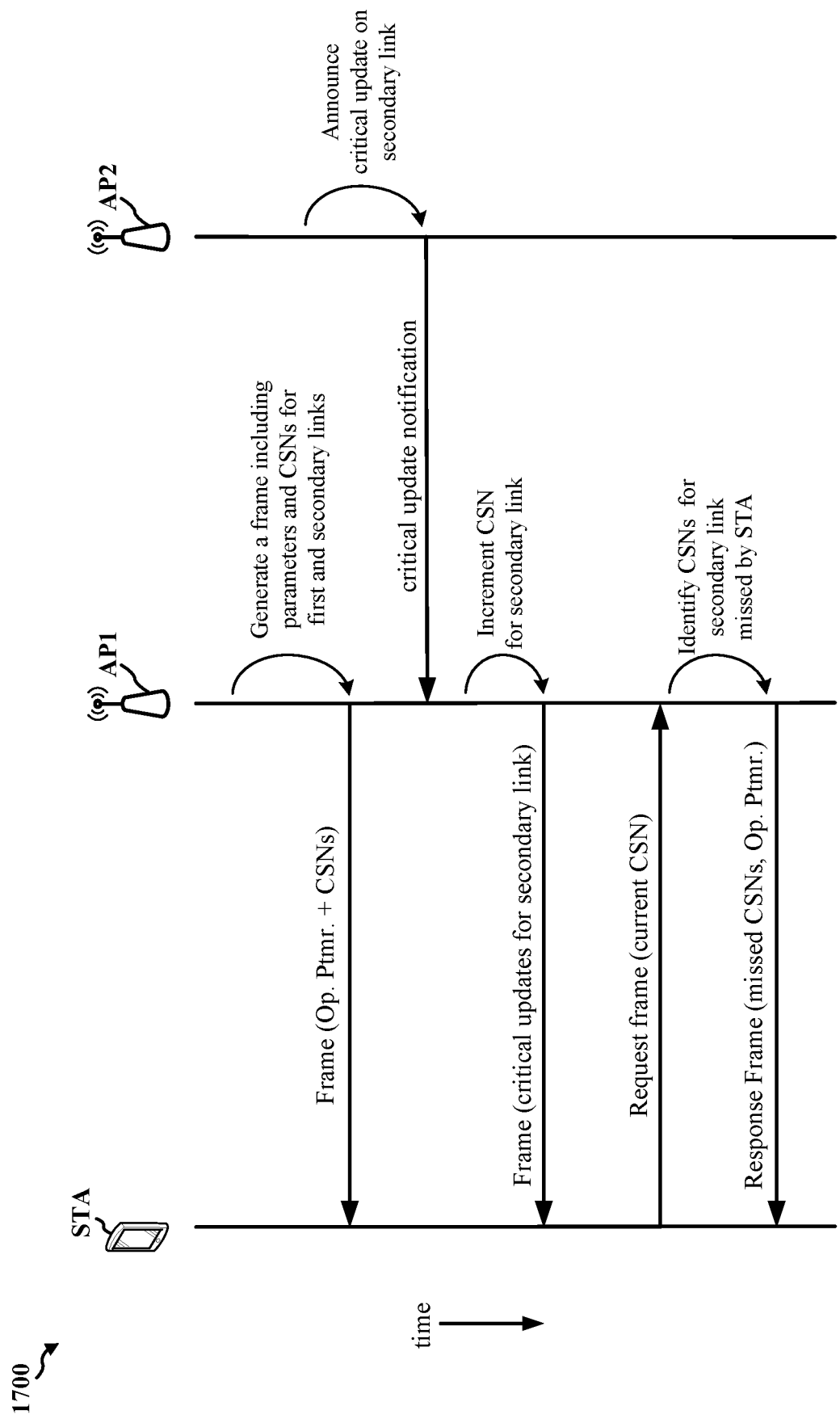
FIG. 17A shows a sequence diagram depicting an example multi-link communication according to some implementations.

FIG. 17A shows a sequence diagram depicting an example multi-link (ML) communication 1700 according to some implementations. In the example of FIG. 17A, the ML communication 1700 may be performed between a STA of a STA MLD and an AP MLD including a first AP (AP1) and a second AP (AP2). AP1 may be associated with a first communication link of the AP MLD, and AP2 may be associated with a secondary communication link of the AP MLD. In some implementations, AP1 and AP2 may be example implementations of one of the APs 102 and 602 described above with reference to FIGS. 1 and 6A, respectively, and the STA may be an example implementation of one of the STAs 104 and 604 described above with reference to FIGS. 1 and 6B, respectively.

AP1 generates a frame including one or more operation parameters for the first communication link, a first change sequence number (CSN) or value indicating a presence or absence of a critical update for the first communication link of the AP MLD, and one or more secondary CSNs or values each indicating a presence or absence of a critical update for a corresponding secondary communication link of the AP MLD. In some instances, the first CSN or value may be carried in a first change sequence field of the frame, and the one or more secondary CSNs may be carried in one or more respective secondary change sequence fields of the frame. In one implementation, a critical update flag or CSN change indicator may be carried in a critical update flag subfield of the frame. AP1 transmits the frame to the STA over the first communication link. In some implementations, the frame may be a beacon frame including a first change sequence field carrying the first CSN, including one or more secondary change sequence fields carrying the secondary CSNs, including one or more Per-link Profile Subelements carrying the one or more operation parameters for the first communication link, and a complete set of operation parameters for the corresponding secondary communication link. Transmission of such a beacon frame may reduce power consumption of the STA (such as because the STA does not need to monitor the corresponding secondary communication link), may reduce frame exchange overhead, and may increase the size of the beacon frame.

The STA receives the frame, and obtains the operation parameters for the first communication link, the CSN or value for the first communication link, and the CSN or value for the secondary communication link. In this way, the STA may determine the current operation parameters and whether there has been a critical update for the first AP and the associated first communication link, and may also determine whether there has been a critical update for the secondary AP and associated secondary communication link without monitoring the secondary communication link.

AP1 receives, from AP2, a notification of a critical update for the secondary communication link and associated secondary AP. AP1 increments the secondary CSN or value corresponding to the secondary communication link and associated secondary AP, and transmits a frame to the STA over the first communication link. In some implementations, the frame may include the updated CSN or value for the secondary communication link and associated secondary AP. In some other implementations, the frame may include a complete set of operation parameters for the secondary communication link and associated secondary AP. In some other implementations, the frame may include a complete set of operation parameters for each of the secondary communication links associated with the respective secondary APs of the AP MLD.

The STA may transmit a probe request frame to AP1 over the first communication link. In some implementations, the probe request frame may include the most-recently received CSN or value for the secondary communication link and associated secondary AP.

AP1 may identify the CSNs for the secondary communication link and associated secondary AP that were missed (or otherwise not correctly decoded) by the STA. AP1 may transmit a response frame to the STA on the first communication link. In some implementations, the response frame carries the CSN(s) for the secondary communication link and associated secondary AP that were missed by the STA. In some other implementations, the response frame carries a complete set of operation parameters for the secondary communication link and associated secondary AP for which one or more operation parameters were updated. In some other implementations, the response frame carries a complete set of operation parameters for each secondary communication link associated with the respective secondary APs of the AP MLD.

In some implementations, the response frame may be a unicast probe response frame carrying one or more critical updates for the specified secondary communication link that were missed by the STA. In some other implementations, response frame may be a broadcast probe response frame carrying a complete set of operation parameters for each secondary communication link associated with the respective secondary APs of the AP MLD. Transmitting a broadcast probe response frame carrying a complete set of operation parameters for all of the secondary communication links may reduce power consumption of the STA (such as because the STA does not need to monitor any of the secondary communication links), may reduce frame exchange overhead, and may increase the size of the broadcast probe response frame.

In addition, or in the alternative, AP1 may transmit an unsolicited broadcast probe response frame to the STA over the first communication link, the unsolicited broadcast probe response frame carrying a complete set of operation parameters for the secondary communication link and associated secondary AP. Transmitting an unsolicited broadcast probe response frame carrying the complete set of operation parameters for the secondary communication link and associated secondary AP may reduce power consumption of the STA (such as because the STA does not need to monitor the secondary communication link), may reduce frame exchange overhead, and may increase the size of the unsolicited broadcast probe response frame (but not as much as the aforementioned broadcast probe response frame).

Figure 17B:
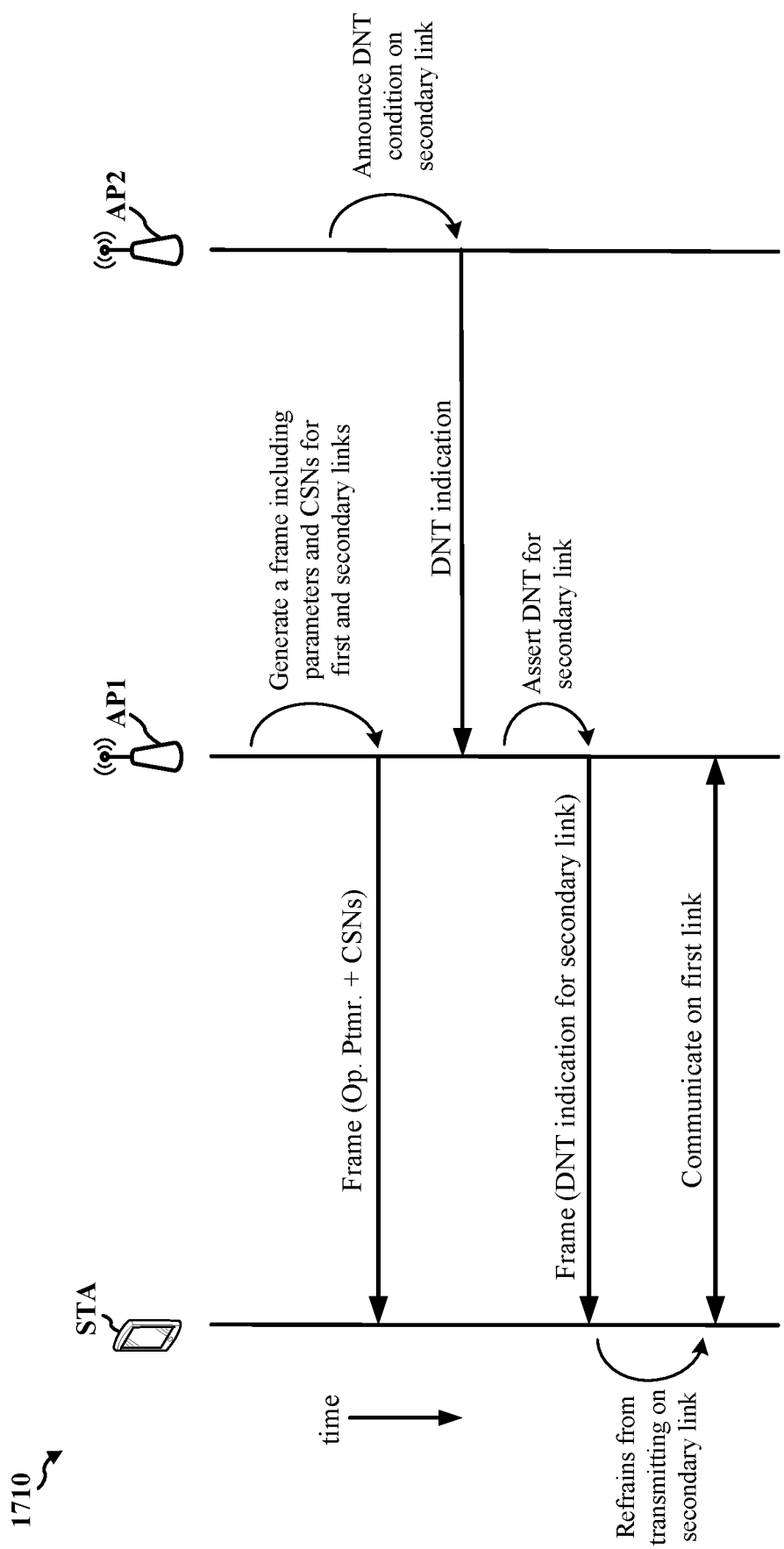
FIG. 17B shows a sequence diagram depicting another example multi-link communication according to some implementations.

FIG. 17B shows a sequence diagram depicting another example multi-link communication 1710 according to some implementations. In the example of FIG. 17B, the ML communication 1710 may be performed between a STA of a STA MLD and an AP MLD including a first AP (AP1) and a second AP (AP2). AP1 may be associated with a first communication link of the AP MLD, and AP2 may be associated with a secondary communication link of the AP MLD. In some implementations, AP1 and AP2 may be example implementations of one of the APs 102 and 602 described above with reference to FIGS. 1 and 6A, respectively, and the STA may be an example implementation of one of the STAs 104 and 604 described above with reference to FIGS. 1 and 6B, respectively.

AP1 generates a frame including one or more operation parameters for the first communication link, a first change sequence number (CSN) or value indicating a presence or absence of a critical update for the first communication link of the AP MLD, and one or more secondary CSNs or values each indicating a presence or absence of a critical update for a corresponding secondary communication link of the AP MLD, and transmits the frame to the STA over the first communication link. In some implementations, the frame may be a beacon frame carrying the first CSN in a first change sequence field, carrying the secondary CSNs in respective secondary change sequence fields, the one or more operation parameters for the first communication link in an MLE, and a complete set of operation parameters for the corresponding secondary communication link in a corresponding Per-link Profile Subelement. Transmission of such a beacon frame may reduce power consumption of the STA (such as because the STA does not need to monitor the corresponding secondary communication link), may reduce frame exchange overhead, and may increase the size of the beacon frame.

The STA receives the frame, and obtains the operation parameters for the first communication link, the CSN or value for the first communication link, and the CSN or value for the secondary communication link. In this way, the STA may determine the current operation parameters and whether there has been a critical update for the first communication link, and may also determine whether there has been a critical update for the secondary communication link without monitoring the secondary communication link.

AP1 receives, from AP2, a Do Not Transmit (DNT) indication for the secondary communication link. AP1 asserts the DNT indication for the secondary communication link, and transmits a frame on the first communication link. The frame, which may be a unicast frame, a broadcast frame, or an unsolicited probe response frame, includes the asserted DNT indication for the secondary communication link. In some implementations, the DNT indication may be based on one or more of a channel switch announcement for the secondary communication link, a quiet time announcement for the secondary communication link, or an unavailability of the secondary AP of the AP MLD associated with the secondary communication link, and may indicate whether wireless communication devices are to refrain from transmitting on the secondary communication link of the AP MLD. In some instances, at least some of the wireless communication devices may monitor the first communication link but not the secondary communication links for the DNT indications.

In some implementations, the frame may be a unicast probe response frame carrying one or more critical updates for the specified secondary communication link that were missed by the STA. Transmission of such a unicast probe response frame may result in a minimal size of the unicast probe response frame, and may increase the frame exchange overhead (such as because additional frames may be needed to carry the operation parameters for the specified secondary communication link). In some other implementations, the frame may be a broadcast probe response frame that carries a complete set of operation parameters for the specified secondary communication link. Transmission of such a broadcast probe response frame may increase the frame size, and may reduce the frame exchange overhead. In some other implementations, the frame may be an unsolicited broadcast probe response frame carrying a complete set of operation parameters for all of the secondary communication links. Transmission of such an unsolicited broadcast probe response frame may increase the frame size, and may further reduce the frame exchange overhead (such as compared with the aforementioned broadcast probe response frame).

In this way, the STA may determine there is a DNT condition on the secondary communication link, and refrain from transmitting on the secondary communication link, without monitoring the secondary communication link. As such, the STA may receive DNT conditions for the secondary communication link without consuming power associated with performing scanning operations on the secondary communication link. The STA may communicate with AP1 on the first communication link.

Figure 18:
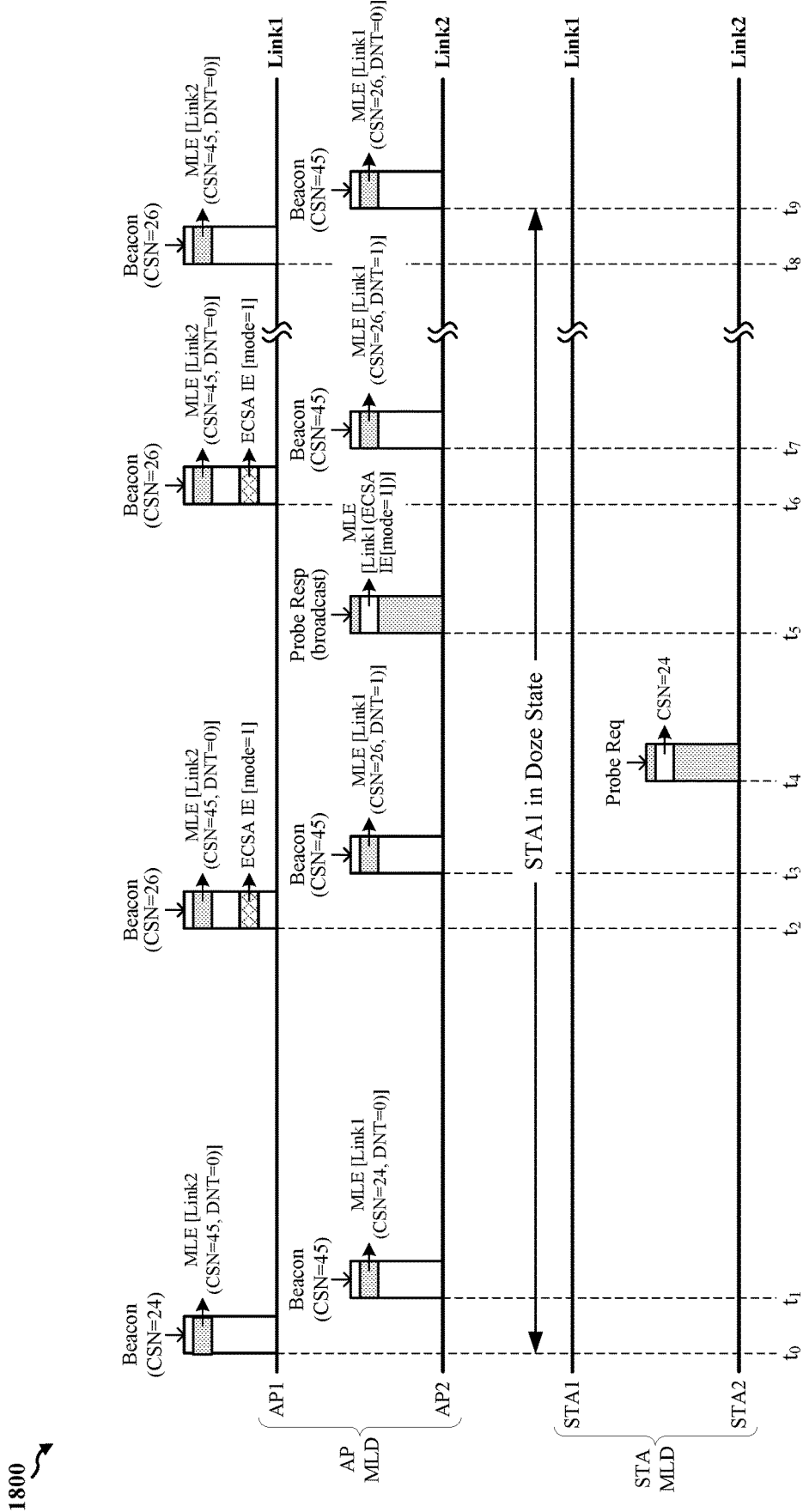
FIG. 18 shows a timing diagram depicting an example multi-link communication according to some implementations.

FIG. 18 shows a timing diagram depicting an example multi-link communication 1800 according to some implementations. In the example of FIG. 18, the ML communication 1800 may be performed between a STA MLD and an AP MLD. The AP MLD is shown to include a first AP (AP1) associated with a first communication link (Link1) of the AP MLD, and a second AP (AP2) associated with a secondary communication link (Link2) of the AP MLD. The STA MLD is shown to include a first station (STA1) and a second station (STA2). For the example of FIG. 18, STA1 is associated with the first communication link (Link1), and STA2 is associated with the secondary communication link (Link2). In some implementations, AP1 and AP2 may be example implementations of one of the APs 102 and 602 described above with reference to FIGS. 1 and 6A, respectively, and STA1 and ST2 may be an example implementation of one of the STAs 104 and 604 described above with reference to FIGS. 1 and 6B, respectively.

Initially, the CSN of AP1 starts at 25, and the CSN of AP2 starts at 45. For the example of FIG. 18, STA1 maintains a doze state on Link1. At time to, AP1 sends a beacon frame on Link1 that indicates a CSN=25 for Link1. The beacon frame also includes an MLE indicating the CSN=45 and DNT=0 for Link2. Neither STA1 nor STA2 receive the beacon frame from AP1.

At time $t_1$, AP2 sends a beacon frame on Link2 that indicates a CSN=45 for Link2. The beacon frame also includes an MLE indicating a CSN=25 for Link1 and DNT=0. STA2 receives the beacon frame, obtains the CSN=25 and DNT=0 for Link1, and obtains the CSN=45 for Link2. Based on the DNT=0, STA 2 determines that it is allowed to transmit on Link1.

At time $t_2$, AP1 sends a beacon frame including an ECSA IE with a mode=1, and that indicates an incremented CSN=26 for Link1. The beacon frame also includes an MLE indicating the CSN=45 and DNT=0 for AP2. Neither STA1 nor STA2 receive the beacon frame from AP1.

At time $t_3$, which is a TBTT after time $t_1$, AP2 sends a beacon frame on Link2 that indicates a CSN=45 for Link2. The beacon frame also includes an MLE indicating a CSN=26 and DNT=1 for Link1. STA2 receives the beacon frame, obtains the CSN=26 and DNT=1 for Link1, and obtains the CSN=45 for Link2. Based on the DNT=1, STA 2 refrains from transmitting on Link1. In some implementations, the beacon frame transmitted at time $t_3$ may indicate that AP2 will be transmitting a probe response frame that includes the critical update for Link1.

At time $t_4$, STA2 sends a probe request frame to AP2 on Link2. The probe request frame includes the last CSN for Link1 received by STA, which is CSN=25 (thereby indicating that STA2 missed one critical update on Link1).

At time $t_5$, AP2 sends a probe response frame on Link2. The probe response frame includes an MLE indicating the ECSA for Link1 with mode=1. In some implementations, the probe response frame may be a broadcast probe response frame that include the full profile for Link2. STA2 receives the probe response frame, obtains the ECSA for Link1 with mode=1 for Link1, and determines that it is not permitted to transmit on Link1.

At time $t_6$, AP1 sends a beacon frame on Link1 that indicates a CSN=26 for Link1 and that includes an MLE indicating a CSN=45 for Link2 and DNT=0 for Link2. The beacon frame also indicates an ECSA for Link1 with mode=1. Neither STA1 nor STA2 receive the beacon frame from AP1.

At time $t_7$, AP2 sends a beacon frame on Link2 that indicates a CSN=45 for Link2 and that includes an MLE indicating a CSN=26 for Link1 and DNT=1 for Link1. STA2 receives the beacon frame, obtains the CSN=26 and DNT=1 for Link1, and obtains the CSN=45 for Link2. Based on the DNT=1, STA2 refrains from transmitting on Link1.

At time $t_8$, AP1 is on the new channel, and sends a beacon frame on Link1 that indicates a CSN=26 for Link1 and that includes an MLE indicating a CSN=45 and DNT=0 for Link2. STA2 receives the beacon frame, obtains the CSN=26 and DNT=0 for Link1, and obtains the CSN=45 for Link2. Based on the DNT=0, STA2 may contend for medium access on Link1.

At time $t_9$, AP2 sends a beacon frame on Link2 that indicates a CSN=45 for Link2 and that includes an MLE indicating a CSN=26 for Link1 and DNT=0 for Link1. STA2 receives the beacon frame, obtains the CSN=26 and DNT=0 for Link1, and obtains the CSN=45 for Link2. Based on the DNT=1, STA2 refrains from transmitting on Link1.

For the example of FIG. 18, the DNT for Link1 is asserted at time $t_2$ based on the ECSA on L1. In other implementations, the DNT for Link1 may be asserted for other reasons or conditions including (but not limited to) other critical updates to Link1, a presence of radar signals, an unavailability of AP1, or some other errors associated with AP1 or Link1).

Figure 19:
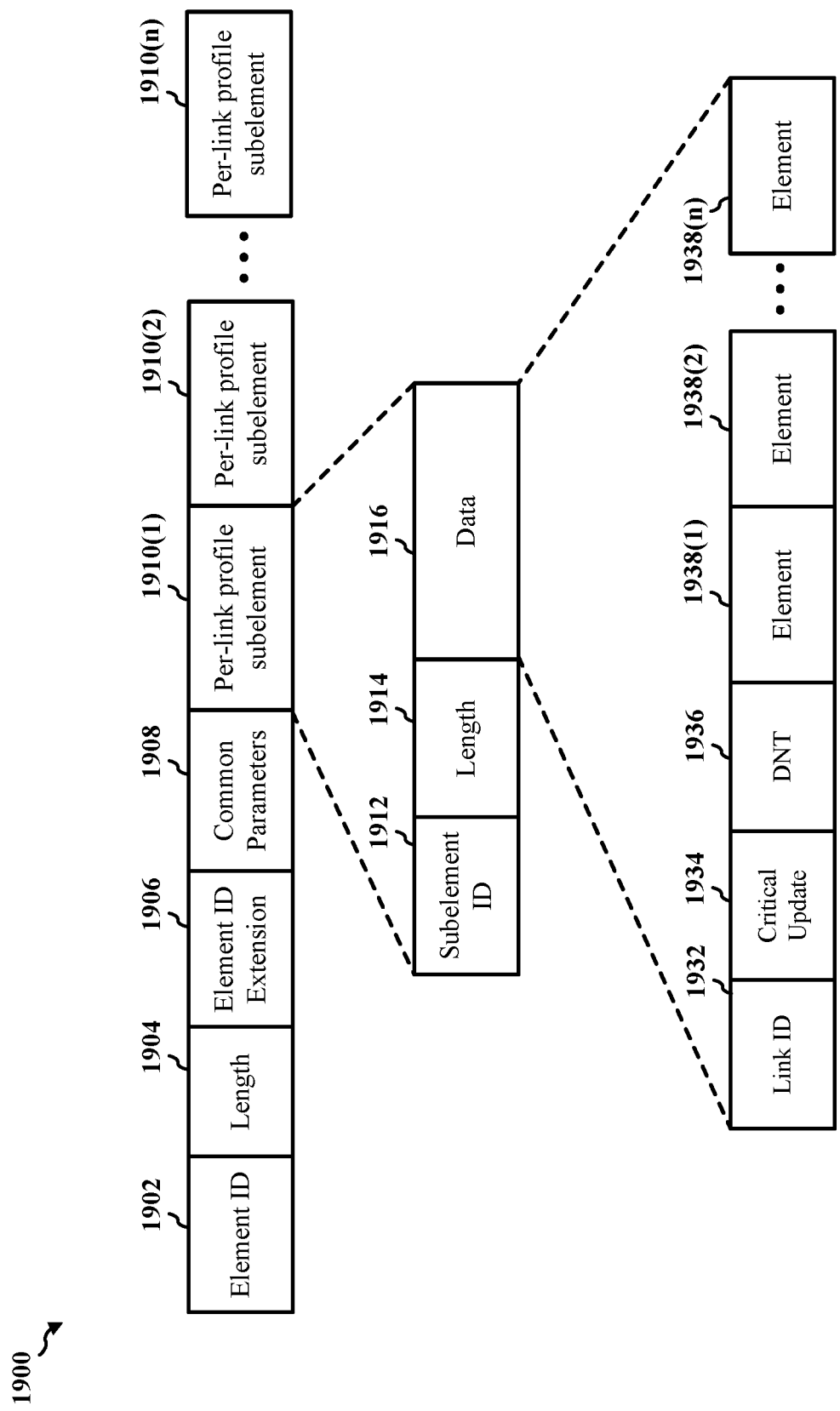
FIG. 19 shows an example MLE usable for communications between wireless communication devices.

FIG. 19 shows an example MLE 1900 usable for communications between wireless communication devices. In some aspects, the MLE 1900 may be an example implementation of the MLE 1520 described with respect to FIG. 15. In some implementations, the MLE 1520 may be included in a frame (such as the frame 1500, a beacon frame, an association request frame, an association response frame, or any other appropriate frame) transmitted by the first device D1 and received by the second device D2, or vice versa. For ease of explanation, some information elements of the MLE 1900 may be referred to as a "field," a "subfield," an "element," or a "subelement," which may be considered interchangeable terms for purposes of discussion herein. In some implementations, the information elements of the MLE 1900 may be referred to with any other appropriate term.

The MLE 1900 is shown to include a plurality of fields, including: an Element ID field 1902, a Length field 1904, an Element ID Extension field 1906, a Common Parameters field 1908, and one or more per-link profile subelements 1910(1)-1910(n). In some implementations, the Element ID field 1902 may be 1 octet long and include an identifier for the MLE 1900. In some implementations, the Length field 1904 may be 1 octet long and indicate a length of the MLE 1900. In some implementations, the Element ID Extension field 1906 may be 1 octet long. In some implementations, the Common Parameters field 1908 may be 1 octet long and include common information for each of the secondary communication link. The per-link profile subelements 1910(1)-1910(n) may be of varying length, and may carry information including (but not limited to) CSNs for corresponding secondary communication links, critical updates for corresponding secondary communication links, operation parameters for corresponding secondary communication links, partial profiles for corresponding secondary communication links, DNT indications for corresponding secondary communication links, discovery information for corresponding secondary communication links, and capability information for corresponding secondary communication links.

To save bits, in some aspects, attributes, capabilities, operation parameters, or other values that are not included in a corresponding per-link profile subelement 1910 may be assumed to be inherited from the first communication link. As one non-limiting example, a Link Attribute Element, such as the Link Attribute Element 1510 of FIG. 15, may include the CSN for the first communication link, and the per-link profile subelement 1910 corresponding to a secondary communication link may not include the CSN for the secondary communication link. In this example, the CSN for the secondary communication link may be inherited from the CSN for the first communication link included in the Link Attribute Element 1510. In this way, one or more of the per-link profile subelements 1910(1)-1910(n) may be excluded, or may include different information. In some other implementations, the MLE 1900 may include a single per-link profile subelement 1910 that includes information for all or a subset of the secondary communication link.

In some implementations, the Data field 1916 may include a plurality of subelements including: a Link ID subelement 1932, a critical update field 1934, a DNT field 1936, and one or more elements 1938(1)-1938(n) that carry any suitable information for corresponding secondary communication links.

In some implementations, one or more information elements or fields may be combined, added, moved (to one or more other information elements), removed, or otherwise modified for the MLE 1900. Furthermore, the names shown for information elements or fields associated with the MLE 1900 are example names, and in some implementations, one or more of the information elements or fields may have a different name.

Figure 20:
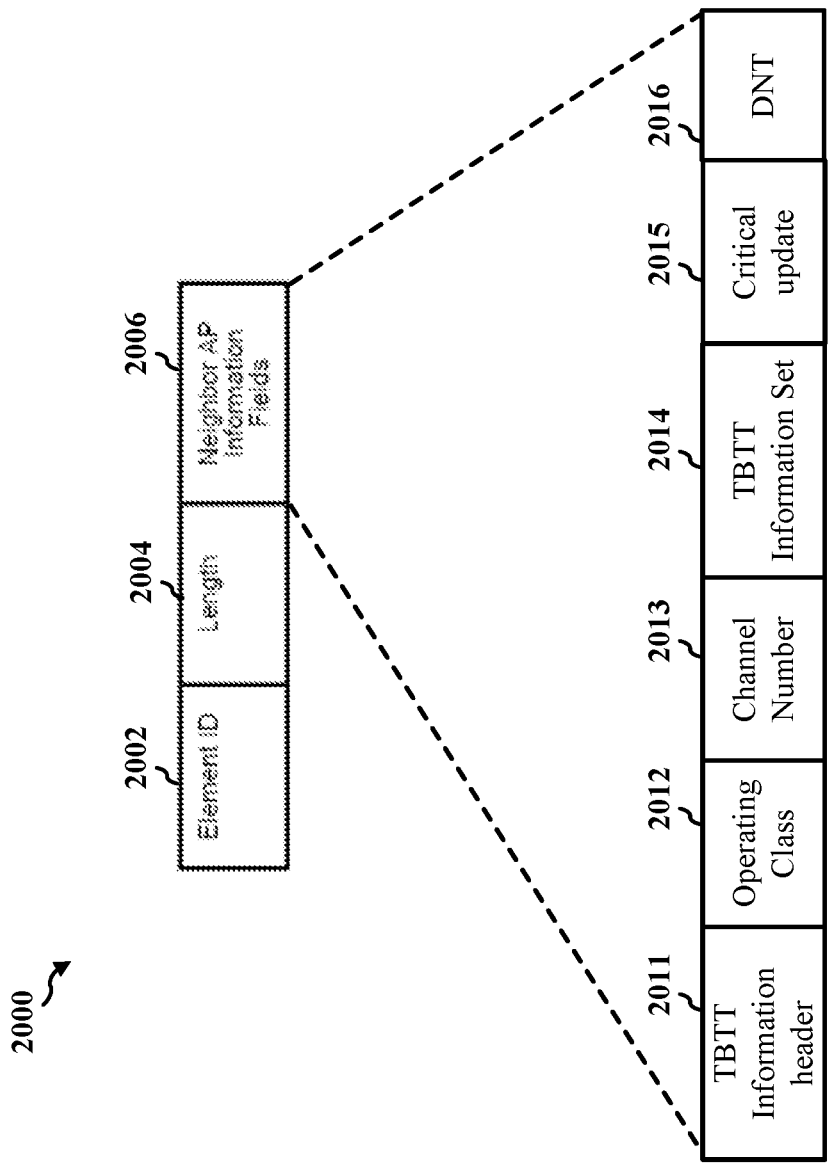
FIG. 20 shows an example Reduced Neighbor Report (RNR) Element usable for communications between wireless communication devices.

FIG. 20 shows an example Reduced Neighbor Report (RNR) Element 2000 usable for communications between wireless communication devices. The RNR element 2000 is shown to include an Element ID field 2002, a Length field 2004, and one or more neighbor AP information fields 2006 (only one neighbor AP information field shown for simplicity).

In some implementations, each Neighbor AP Information field 2006 includes a TBTT Information header 2011, an operating class field 2012, a channel number field 2013, a TBTT Information set field 2014, a critical update field 2015, and a DNT field 2016. The critical update field 2015 may carry an indication of a critical update for a corresponding secondary communication link, and the DNT field 2016 may carry a DNT indication for a corresponding secondary communication link. In some other implementations, the RNR element 2000 may be extended to include a Link ID field that stores one or more unique link IDs that may be used to map entries in the Neighbor AP Information fields 2006 with information stored in the per-link profile subelements in a MLE.

In some implementations, one or more information elements or fields may be combined, added, moved (to one or more other information elements), removed, or otherwise modified for the RNR element 2000. Furthermore, the names shown for information elements or fields associated with the RNR element 2000 are example names, and in some implementations, one or more of the information elements or fields may have a different name.

Figure 21:
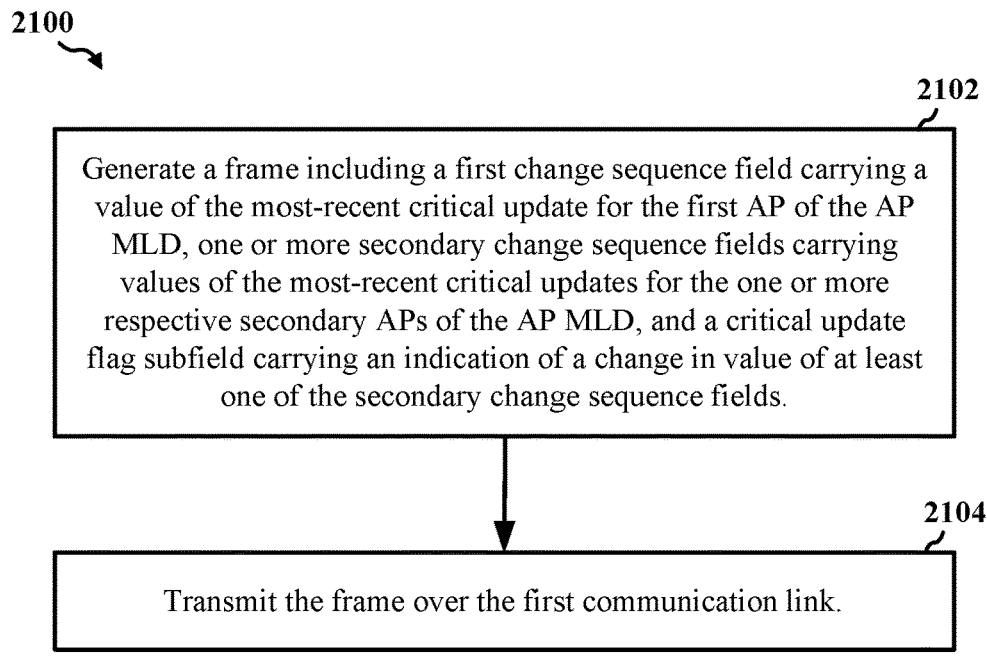
FIG. 21 shows a flowchart illustrating an example process for wireless communication that supports indicating critical updates for MLDs according to some other implementations.

FIG. 21 shows a flowchart illustrating an example process 2100 for wireless communication that supports indicating critical updates for MLDs according to some implementations. The process 2100 may be performed by a first wireless communication device such as the wireless communication device 500 described above with reference to FIG. 5. In some implementations, the process 2100 may be performed by a wireless communication device operating as or within an AP, such as one of the APs 102 and 602 described above with reference to FIGS. 1 and 6A, respectively. For the example of FIG. 21, the process 2100 is performed by an AP MLD including a first AP and one or more secondary APs. The first AP may be associated with a first communication link of the AP MLD, and each secondary AP may be associated with a corresponding secondary communication link of one or more secondary communication links of the AP MLD.

At block 2102, the first AP of the AP MLD generates a frame including a first change sequence field carrying a CSN or value of the most-recent critical update for the first AP of the AP MLD, including one or more secondary fields carrying the CSNs or values of the most-recent critical updates for the one or more respective secondary APs of the AP MLD, and including a critical update flag subfield carrying an indication of a change in value of at least one of the one or more secondary change sequence fields. At block 2104, the AP MLD transmits the frame over the first communication link. The frame may be one of a beacon frame, a probe response frame, an association response frame, a reassociation response frame, or a fast initial link setup (FILS) discovery frame. In some implementations, the frame may be a beacon frame, and the critical update flag or change indicator may be carried in an initial portion of the beacon frame. In some instances, the critical update flag or change indicator may be carried in a field or element preceding a traffic indication map (TIM) element of the beacon frame. For example, in some aspects, the critical update flag or change indicator may be carried in a critical update flag subfield of the beacon frame.

In some implementations, the most-recent critical update for the first communication link and the first AP corresponds to a change in one or more operation parameters of a basic service set (BSS) associated with the first communication link or the first AP, and the most-recent critical update for a respective secondary communication link and the respective secondary AP corresponds to a change in one or more operation parameters of a BSS associated with the respective secondary communication link and the respective secondary AP. In some instances, the first CSN or value carried in the first change sequence field indicates a most recent critical update to the one or more operation parameters for the first AP and associated first communication link, and each secondary CSN or value carried in the one or more secondary change sequence fields may indicate the most-recent critical update for a respective secondary AP and associated secondary communication link of the AP MLD. In other implementations, the flag or change indicator carried in the critical update flag subfield, which may be a single-bit indicator, can be used to indicate whether (or not) there has been a change in the value of any of the one or more secondary change sequence fields.

In some implementations, the critical update flag subfield will carry a certain value set to indicate that there has been a change in the value for the first CSN carried in the first change sequence field or for the one or more secondary CSNs carried in the one or more respective secondary change sequence fields. In implementations for which the critical update flag subfield is one bit long, the value may be set to 1 to indicate a change in value for first CSN or the one or more secondary CSNs. In some instances, the AP MLD may advertise a flag or update indicator value=1 in each of multiple beacon frames to increase the likelihood that nearby wireless communication devices (such as STAs) are able to receive the critical update indications. In some implementations, the AP may advertise a flag or update indicator value=1 for all beacon frames transmitted during a DTIM period. Power save STAs are expected to wake-up during transmission of the DTIM beacon, and therefore may receive the critical update indication. In some implementation, the AP MLD may advertise a flag or update indicator value=1 in the change sequence field for a duration equal to the maximum of Listen interval for all associated STAs.

The one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the critical update flag or change indicator may be carried in a Capability Information field of the frame. In some instances, the critical update flag or change indicator may be carried in a reserved portion of the Capability Information field of the frame. In other implementations, the critical update flag or change indicator may be carried in a medium access control (MAC) header of the frame. In other implementations, the critical update flag or change indicator may be carried in a physical layer (PHY) preamble of the frame. In some instances, the critical update flag or change indicator may be carried in a signaling field of the PHY preamble. In some other implementations, the critical update flag subfield may also carry one or more secondary flags or change indicators, where each secondary flag or change indicator may indicate a presence or absence of a change in value of a corresponding secondary CSN or value of the one or more secondary change sequence fields.

In some implementations, the one or more secondary flags or change indicators may be carried in a Capability Information field of the frame. In some instances, the one or more secondary flags or change indicators may be carried in a reserved portion of the Capability Information field of the frame. In other implementations, the one or more secondary flags or change indicators may be carried in a MAC header of the frame. In some other implementations, the one or more secondary flags or change indicators may be carried in PHY preamble of the frame. In some instances, the one or more secondary flags or change indicators may be carried in a signaling field of the PHY preamble.

Figure 22:
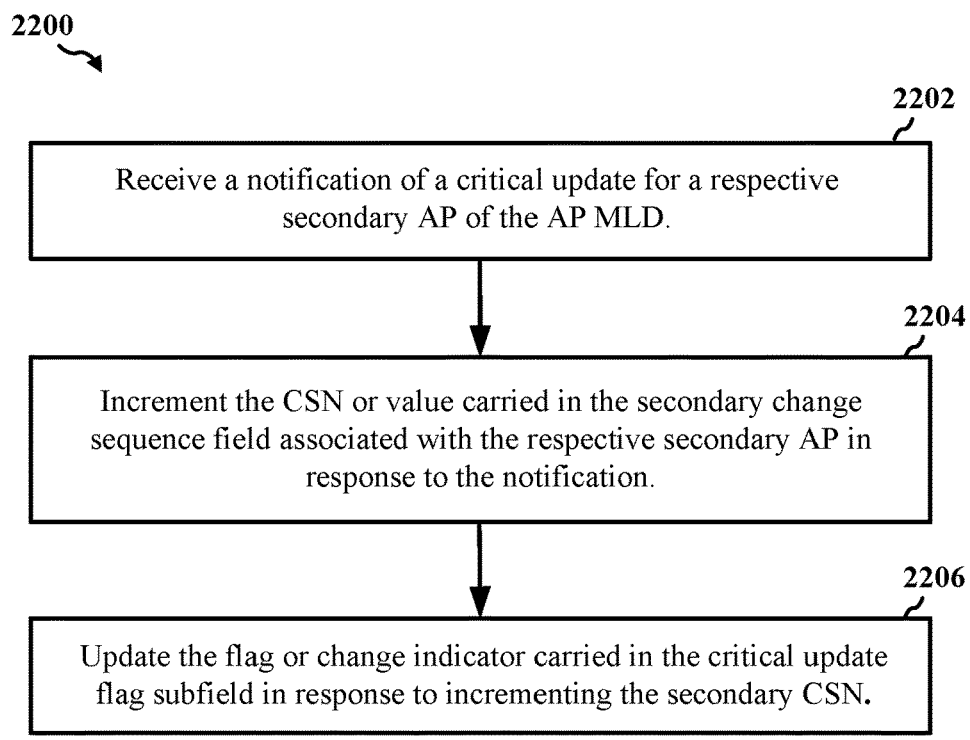
FIG. 22 shows a flowchart illustrating an example process for wireless communication that supports indicating critical updates for MLDs according to some implementations.

FIG. 22 shows a flowchart illustrating an example process 2200 for wireless communication that supports indicating critical updates for MLDs according to some implementations. The process 2200 may be performed by a first wireless communication device such as the wireless communication device 500 described above with reference to FIG. 5. In some implementations, the process 2200 may be performed by a wireless communication device operating as or within an AP, such as one of the APs 102 and 602 described above with reference to FIGS. 1 and 6A, respectively. For the example of FIG. 22, the process 2200 is performed by the AP MLD described with reference to FIG. 21. In some implementations, the process 2200 of FIG. 22 may be performed after the AP MLD transmits the frame in block 2104 of FIG. 21.

At block 2202, the first AP receives a notification of the critical update for a respective secondary AP of the AP MLD. In some instances, the first AP may receive the notification from the respective secondary AP. At block 2204, the AP MLD increments the secondary CSN or value carried in the secondary change sequence field associated with the respective secondary AP in response to the notification. At block 2204, the AP MLD updates the flag or change indicator carried in the critical update flag subfield in response to incrementing the secondary CSN. In some instances, the AP MLD may update the flag or change indicator by transitioning a bit carried in the critical update flag subfield from a first logic state to a second logic state, for example, where the first logic state of the bit indicates no change in the critical updates for the respective AP and associated communication link, and the second logic state of the bit indicates there has been a change in the critical updates for the respective AP and associated communication link. In this way, a wireless communication device (such as the STA MLD) receiving a frame that carries a critical update flag or an indicator bit set to the second logic state may determine that one or more operation parameters of the respective AP and associated communication link have changed.

Figure 23:
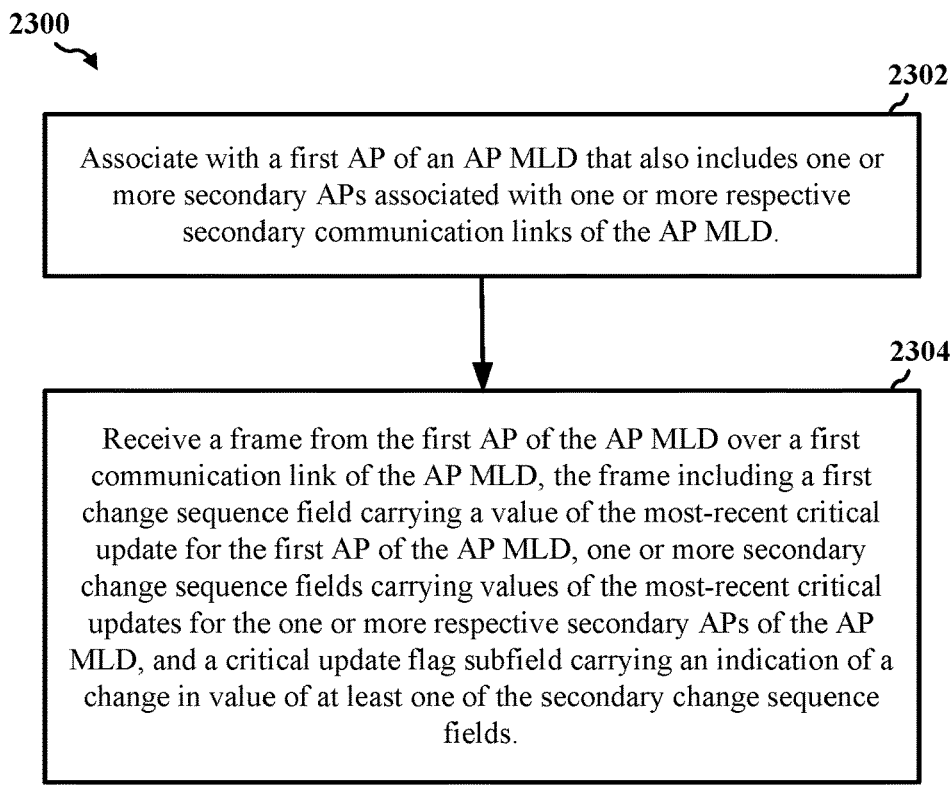
FIG. 23 shows a flowchart illustrating an example process for wireless communication that supports indicating critical updates for MLDs according to some implementations.

FIG. 23 shows a flowchart illustrating an example process 2300 for wireless communication that supports indicating critical updates for MLDs according to some implementations. The process 2300 may be performed by a first wireless communication device such as the wireless communication device 500 described above with reference to FIG. 5. In some implementations, the process 2300 may be performed by a wireless communication device operating as or within a STA, such as one of the STAs 104 and 604 described above with reference to FIGS. 1 and 6B, respectively. For the example of FIG. 23, the process 2300 is performed by a STA MLD.

At block 2302, the STA MLD associates with a first AP of an AP MLD that also includes one or more secondary APs associated with one or more respective secondary communication links of the AP MLD. At block 2304, the STA MLD receives a frame from the first AP of the AP MLD over a first communication link of the AP MLD. The frame may include a first change sequence field carrying a CSN or value of the most-recent critical update for the first communication link or first AP of the AP MLD, may include one or more secondary change sequence fields carrying CSNs or values of the most-recent critical updates for the one or more respective secondary communication links or respective secondary APs of the AP MLD, and may include a critical update flag subfield carrying a critical update flag or a change indicator indicating a change in value of at least one of the secondary change sequence fields. The frame may be one of a beacon frame, a probe response frame, an association response frame, a reassociation response frame, or a FILS discovery frame. In some implementations, the frame may be a beacon frame, and the critical update flag or change indicator may be carried in an initial portion of the beacon frame. In some instances, the critical update flag or change indicator may be carried in a field or element preceding a traffic indication map (TIM) element of the beacon frame.

In some implementations, the critical update for the first AP or the first communication link corresponds to a change in one or more operation parameters of a basic service set (BSS) associated with the first communication link or the first AP, and the critical update for a respective secondary AP or respective secondary communication link corresponds to a change in one or more operation parameters of a BSS associated with the respective secondary communication link or the respective secondary AP. In some instances, the CSN or value carried in the first change sequence field indicates a most recent critical update to the one or more operation parameters for the first AP or communication link, and each secondary CSN or value carried in a respective secondary change sequence field may indicate the most-recent critical update for a corresponding secondary AP or secondary communication link of the AP MLD. In other implementations, the flag or change indicator carried in the critical update flag subfield, which may be a single-bit indicator, can be used to indicate whether (or not) there has been a change in the value or CSN of any of the secondary change sequence fields.

The one or more operation parameters may include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

In some implementations, the critical update flag or change indicator may be carried in a Capability Information field of the frame. In some instances, the critical update flag or change indicator may be carried in a reserved portion of the Capability Information field of the frame. In other implementations, the critical update flag or change indicator may be carried in a medium access control (MAC) header of the frame. In other implementations, the critical update flag or change indicator may be carried in a physical layer (PHY) preamble of the frame. In some instances, the critical update flag or change indicator may be carried in a signaling field of the PHY preamble. In some other implementations, the critical update flag subfield may also carry one or more secondary critical update flags or change indicators, where each secondary critical update flag or change indicator may indicate a presence or absence of a change in value of a corresponding secondary CSN or value of the one or more secondary change sequence fields.

In some implementations, the one or more secondary critical update flags or CSN change indicators may be carried in a Capability Information field of the frame. In some instances, the one or more secondary critical update flags or change indicators may be carried in a reserved portion of the Capability Information field of the frame. In other implementations, the one or more secondary critical update flags or change indicators may be carried in a MAC header of the frame. In some other implementations, the one or more secondary critical update flags or change indicators may be carried in PHY preamble of the frame. In some instances, the one or more secondary critical update flags or change indicators may be carried in a signaling field of the PHY preamble.

Figure 24:
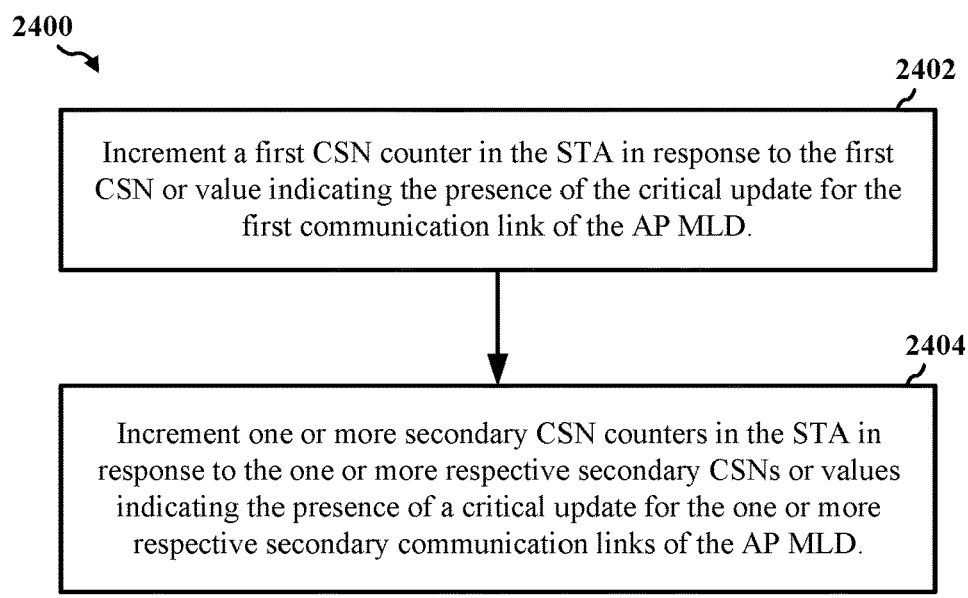
FIG. 24 shows a flowchart illustrating an example process for wireless communication that supports indicating critical updates for MLDs according to some implementations.

FIG. 24 shows a flowchart illustrating an example process 2400 for wireless communication that supports indicating critical updates for MLDs according to some implementations. In some implementations, the process 2400 may be performed by a wireless communication device operating as or within a STA, such as one of the STAs 104 and 604 described above with reference to FIGS. 1 and 6B, respectively. For the example of FIG. 24, the process 2400 is performed by the STA MLD discussed above with reference to FIG. 23. In some implementations, the process 2400 of FIG. 24 may be performed after the STA MLD receives the frame in block 2304 of FIG. 23.

At block 2402, the STA MLD increments a first CSN counter in response to the first CSN or value carried in the first change sequence field indicating the presence of the critical update for the first communication link of the AP MLD. At block 2404, the STA MLD increments one or more secondary CSN counters in the STA of the STA MLD in response to the one or more respective secondary CSNs or values carried in the one or more respective secondary change sequence fields indicating the presence of a critical update for the one or more respective secondary communication links of the AP MLD.

Figure 25:
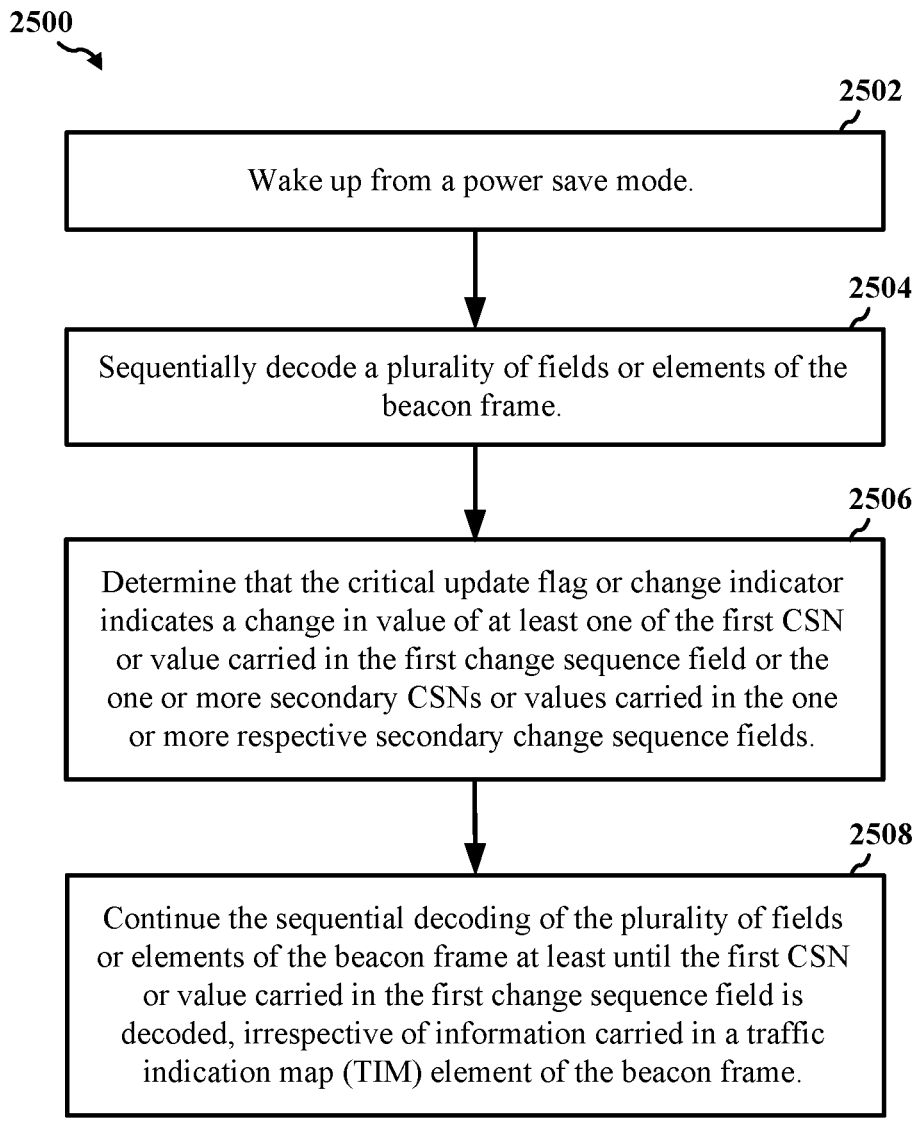
FIG. 25 shows a flowchart illustrating an example process for wireless communication that supports indicating critical updates for MLDs according to some implementations.

FIG. 25 shows a flowchart illustrating an example process 2500 for wireless communication that supports indicating critical updates for MLDs according to some implementations. In some implementations, the process 2500 may be performed by a wireless communication device operating as or within a STA, such as one of the STAs 104 and 604 described above with reference to FIGS. 1 and 6B, respectively. For the example of FIG. 25, the process 2500 is performed by the STA MLD discussed above with reference to FIG. 23. In some implementations, the process 2500 of FIG. 25 may be performed after the STA MLD receives the frame in block 2304 of FIG. 23.

At block 2502, the STA MLD wakes up from a power save mode. At block 2504, the STA MLD sequentially decodes a plurality of fields or elements of the beacon frame. At block 2506, the STA MLD determines that the critical update flag or change indicator indicates a change in value of at least one of the first CSN or value carried in the first change sequence field or the secondary CSNs or values carried in the respective secondary change sequence fields. At block 2508, the STA MLD continues the sequential decoding of the plurality of fields or elements of the beacon frame until at least until the first CSN or value carried in the first change sequence field is decoded, irrespective of information carried in a traffic indication map (TIM) element of the beacon frame.

Figure 26:
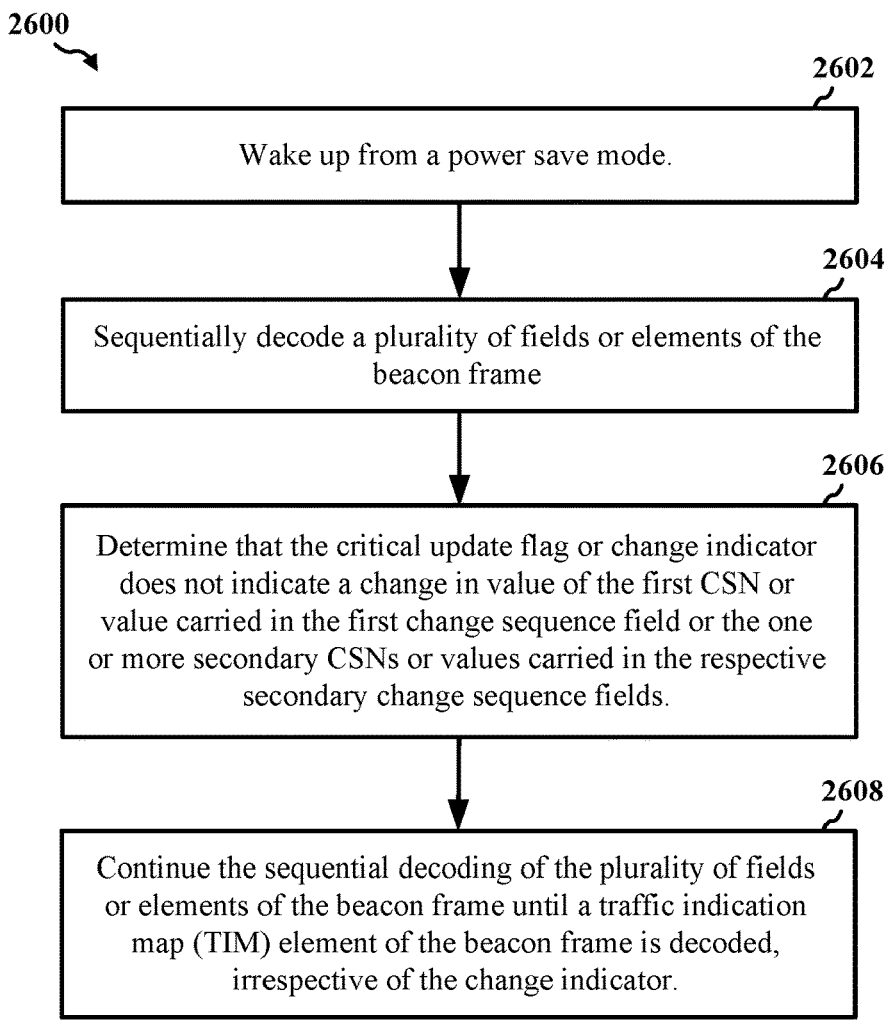
FIG. 26 shows a flowchart illustrating an example process for wireless communication that supports indicating critical updates for MLDs according to some implementations.

FIG. 26 shows a flowchart illustrating an example process 2600 for wireless communication that supports indicating critical updates for MLDs according to some implementations. In some implementations, the process 2600 may be performed by a wireless communication device operating as or within a STA, such as one of the STAs 104 and 604 described above with reference to FIGS. 1 and 6B, respectively. For the example of FIG. 26, the process 2600 is performed by the STA MLD discussed above with reference to FIG. 23. In some implementations, the process 2600 of FIG. 26 may be performed after the STA MLD receives the frame in block 2304 of FIG. 23.

At block 2602, the STA MLD wakes up from a power save mode. At block 2604, the STA MLD sequentially decodes a plurality of fields or elements of the beacon frame. At block 2606, the STA MLD determines that the critical update flag or change indicator does not indicate a change in value of the first CSN or value carried in the first change sequence field or the one or more secondary CSNs or values carried in the respective secondary change sequence fields. At block 2608, the STA MLD continues the sequential decoding of the plurality of fields or elements of the beacon frame until a traffic indication map (TIM) element of the beacon frame is decoded, irrespective of the change indicator.

Figure 27:
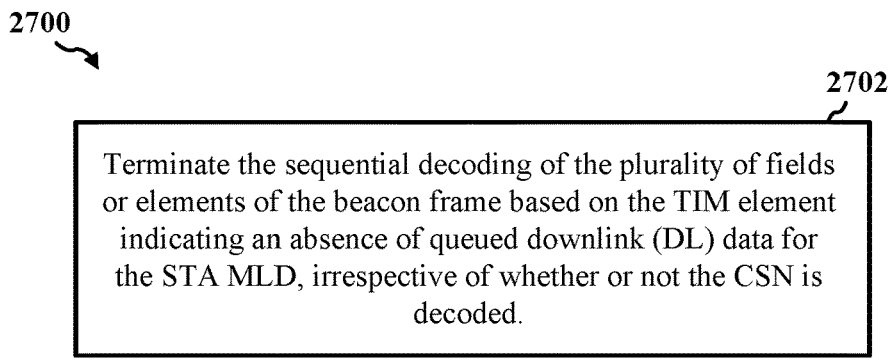
FIG. 27 shows a flowchart illustrating an example process for wireless communication that supports indicating critical updates for MLDs according to some implementations.

FIG. 27 shows a flowchart illustrating an example process 2700 for wireless communication that supports indicating critical updates for MLDs according to some implementations. In some implementations, the process 2700 may be performed by a wireless communication device operating as or within a STA, such as one of the STAs 104 and 604 described above with reference to FIGS. 1 and 6B, respectively. For the example of FIG. 27, the process 2700 is performed by the STA MLD discussed with reference to FIG. 23. In some implementations, the process 2700 of FIG. 27 may be performed after the STA MLD continues sequentially decoding the beacon frame in block 2608 of FIG. 26. At block 2702, the STA MLD terminates the sequential decoding of the plurality of fields or elements of the beacon frame based on the TIM element indicating an absence of queued downlink (DL) data for the STA MLD, irrespective of whether or not the CSN or value carried in a corresponding change sequence field is decoded.

Figures 28, 29:
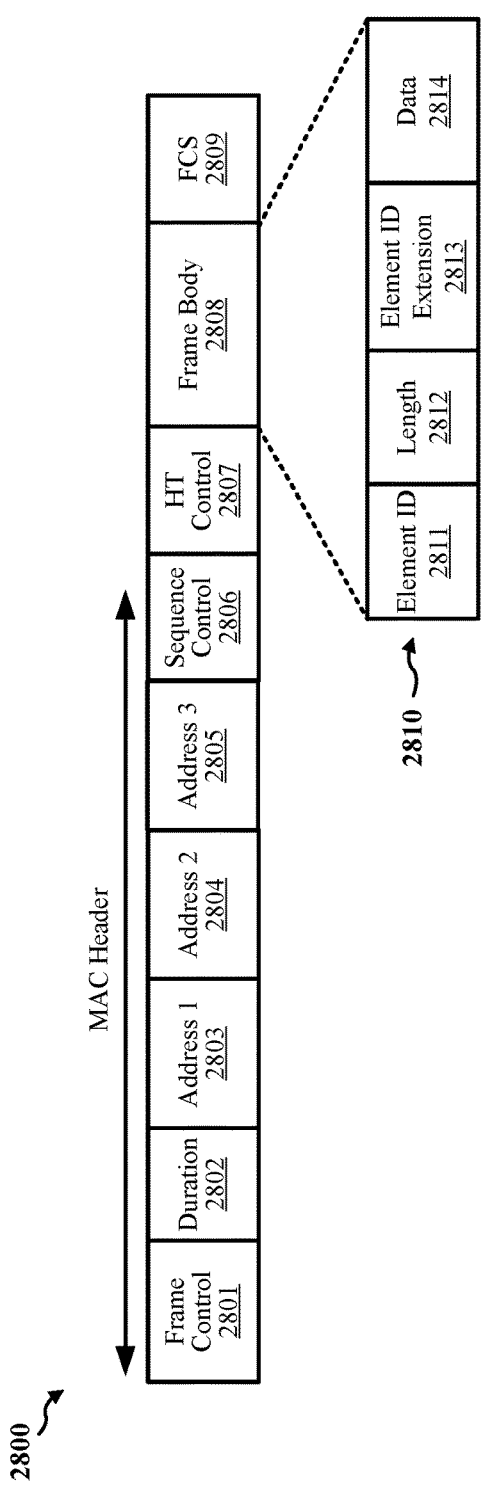
FIG. 28 shows an example beacon frame usable for communications between wireless communication devices.
FIG. 29 shows an example capability information field usable for communications between wireless communication devices.

FIG. 28 shows an example beacon frame 2800 usable for communications between wireless communication devices. The beacon frame 2800 is shown to include a frame control field 2801, a duration field 2802, an address 1 field 2803, an address 2 field 2804, a sequence control field 2805, an HT control field 2806, a frame body 2807, and an Frame Check Sequence (FCS) field 2808. The frame control field 2801 may carry control information indicating certain parameters of the beacon frame 2800 such as a protocol version, a type, and a subtype. The duration field 2802 may carry information indicating the total length (in bytes) of the beacon frame 2800. The Address 1 field 2803, the Address 2 field 2804, and the Address 3 field 2805 may include individual or group addresses for all or a portion of the beacon frame 2800, such as a basic service set identifier (BSSID), a source address (SA), a destination address (DA), a transmitting STA address (TA), or a receiving STA address (RA). The sequence control field 2806 may indicate a sequence number, a fragment number, or both, corresponding to the beacon frame 2800. The HT control field 2807 may contain control information for the beacon frame 2800. The FCS field 2809 may contain information for validating or interpreting all or a portion of the beacon frame 2800.

The frame body 2808 may include any suitable number of fields or elements (such as information elements). In some implementations, the beacon frame 2800 may include one or more mandatory fields such as, for example, a timestamp field, a beacon interval field, a capability information field, an SSID field, and a supported rate field, among others. The beacon frame 2800 may also include one or more information elements such as, for example, a DSSS parameters element, a CF parameters set element, a traffic indication map (TIM) element, among others. The beacon frame 2800 is shown to include an information element 2810 that includes an element ID field 2811, a length field 2812, an element ID extension field 2813, and an information field 2914. The element ID field 2811 carries information indicating the type and format of the information element 2810. The length field 2812 carries information indicating the length or size of the information element 2810. The element ID extension field 2813 carries information indicating the type and/or contents of the beacon frame 2800. The information field 2914 may carry any suitable type of data (such as discovery information for an AP MLD, operation parameters for one or more APs of the AP MLD, capability information for one or more APs of the AP MLD, among others).

FIG. 29 shows an example Capability Information field 2900 usable for communications between wireless communication devices. The Capability Information field 2900 is shown to include a ESS field 2901, an IBSS field 2902, two reserved fields 2903 and 2904, a privacy field 2905, a short preamble field 2906, two additional reserved fields 2907 and 2908, a spectrum management field 2909, a QoS field 2910, a short time slot field 2911, an APSD field 2912, a radio measurement field 2913, an EPD field 2914, and two additional reserved fields 2915 and 2916.

In some implementations, the critical update flag or change indicator may be a single-bit indicator that can be carried in one of the reserved fields (or bits) 2903, 2904, 2907, 2908, 2915, or 2916. In some instances, the AP MLD may map the critical update flag or change indicator to one of the reserved fields 2903, 2904, 2907, 2908, 2915, or 2916 of the Capability Information field 2900 carried in beacon frame 2800, and may indicate whether or not there has been a change in the critical updates or operation parameters for one or more of the first AP or the secondary APs by embedding the indicator bit in a selected one of the reserved fields 2903, 2904, 2907, 2908, 2915, or 2916.

In some other implementations, the critical update flag may be a multi-bit value that can be carried in a plurality of the reserved fields 2903, 2904, 2907, 2908, 2915, or 2916 of the Capability Information field 2900 (rather than only one of the reserved fields). Using a multi-bit change indicator, rather than a single-bit change indicator, may allow the AP MLD to identify which communication links of the AP MLD is associated with a critical update using the beacon frame 2800. For example, if four of the reserved fields 2903, 2904, 2907, 2908, 2915, or 2916 of the Capability Information field 2900 are available, the AP MLD may use a 4-bit critical update flag to uniquely identify four different communication links having recent critical updates (such as by using each bit of the critical update flag or change indicator to indicate a presence or absence of a critical update for a corresponding communication link).

Implementation examples are described in the following numbered clauses:

1. A method for wireless communication performed by an access point (AP) multi-link device (MLD), including:
   generating a frame by a first AP of the AP MLD associated with a first communication link of the AP MLD, the AP MLD further including one or more secondary APs associated with one or more respective secondary communication links of the AP MLD, the frame including:
   a first change sequence number (CSN) indicating a presence or absence of a critical update for the first communication link of the AP MLD;
   one or more secondary CSNs, each secondary CSN of the one or more secondary CSNs indicating a presence or absence of a critical update for a corresponding secondary communication link of the one or more secondary communication links of the AP MLD; and
   a CSN update indicator field carrying a change indicator indicating a presence or absence of a change in value of at least one of the first CSN or the one or more secondary CSNs;
   transmitting the frame on the first communication link of the AP MLD.
2. The method of clause 1, where the critical update for the first communication link corresponds to a change in one or more operation parameters of a basic service set (BSS) associated with the first communication link.
3. The method of clause 2, where the first CSN indicates a most recent critical update to the one or more operation parameters for the first communication link.
4. The method of clause 2, where the critical update for a respective secondary communication link corresponds to a change in one or more operation parameters of a basic service set (BSS) associated with the respective secondary communication link.
5. The method of clause 4, where each secondary CSN of the one or more secondary CSNs indicates a most recent critical update to the one or more operation parameters for the corresponding secondary communication link of the AP MLD.
6. The method of any one or more of clauses 2-5, where the one or more operation parameters include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.
7. The method of any one or more of clauses 1-6, where the frame includes one of a beacon frame, a probe response frame, an association response frame, or a reassociation response frame.
8. The method of clause 7, where the change indicator is carried in each beacon frame transmitted during a time period.
9. The method of clause 8, where the time period includes a delivery traffic indication map (DTIM) period.
10. The method of any one or more of clauses 1-9, where the change indicator is carried in an initial portion of a beacon frame.
11. The method of clause 9, further including: transmitting all beacon frames within a delivery traffic indication map (DTIM) period with the change indicator.
12. The method of any one or more of clauses 1-11, where the change indicator is carried in a Capability Information field of the frame.
13. The method of clause 11, where the change indicator is carried in a reserved portion of the Capability Information field of the frame.
14. The method of any one or more of clauses 1-11, where the change indicator is carried in a medium access control (MAC) header of the frame.
15. The method of any one or more of clauses 1-11, where the change indicator is carried in a physical layer (PHY) preamble of the frame.

16. The method of clause 14, where the change indicator is carried in a signaling field of the PHY preamble.
17. The method of any one or more of clauses 1-16, where the frame includes a beacon frame, and the change indicator is carried in a field or element preceding a traffic indication map (TIM) element of the beacon frame.
18. The method of any one or more of clauses 10-15, where the change indicator is a single bit.
19. The method of any one or more of clauses 1-18, where the CSN update indicator field further carries one or more secondary change indicators, each secondary change indicator of the one or more secondary change indicators indicating a presence or absence of a change in value of a corresponding secondary CSN of the one or more secondary CSNs.
20. The method of clause 18, where the one or more secondary change indicators are carried in a Capability Information field of the frame.
21. The method of clause 18, where the one or more secondary change indicators are carried in a reserved portion of the Capability Information field of the frame.
22. The method of clause 18, where the one or more secondary change indicators are carried in a medium access control (MAC) header of the frame.
23. The method of clause 18, where the one or more secondary change indicators are carried in a physical layer (PHY) preamble of the frame.
24. The method of clause 23, where the one or more secondary change indicators are carried in a signaling field of the PHY preamble.
25. The method of clause 18, where the frame includes a beacon frame, and the one or more secondary change indicators are carried in a field or element preceding a traffic indication map (TIM) element of the beacon frame.
26. The method of any one or more of clauses 1-25, further including:
receiving, by the first AP of the AP MLD from a secondary AP of the one or more secondary APs of the AP MLD associated with a respective secondary communication link of the one or more secondary communication links of the AP MLD, a notification of the critical update for the respective secondary communication link;
incrementing the secondary CSN corresponding to the respective secondary communication link based on the notification; and
updating the change indicator carried in the CSN update indicator field based on incrementing the secondary CSN.
27. The method of clause 26, where the secondary CSN includes a modulo of a maximum value that can be represented in the CSN update indicator field.
28. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one of clauses 1-27.
29. A method for wireless communication performed by a wireless station (STA) of a STA multi-link device (MLD), including:
receiving a frame from a first access point (AP) of an AP MLD on a first communication link of the AP MLD, the AP MLD further including one or more secondary APs associated with one or more respective secondary communication links of the AP MLD, the frame including:
a first change sequence number (CSN) indicating a presence or absence of a critical update for the first communication link or the first AP of the AP MLD;
one or more secondary CSNs, each secondary CSN of the one or more secondary CSNs indicating a presence or absence of a critical update for a corresponding secondary communication link of the one or more secondary communication links of the AP MLD; and
a CSN update indicator field carrying a change indicator indicating a presence or absence of a change in value of at least one of the first CSN or the one or more secondary CSNs.
30. The method of clause 29, where the critical update for the first communication link corresponds to a change in one or more operation parameters of a basic service set (BSS) associated with the first communication link or the first AP.
31. The method of any one or more of clauses 29-30, where the first CSN indicates a most recent critical update to the one or more operation parameters for the first communication link.
32. The method of any one or more of clauses 29-30, where the critical update for a respective secondary communication link corresponds to a change in one or more operation parameters of a basic service set (BSS) associated with the respective secondary communication link.
33. The method of clause 29, where each secondary CSN of the one or more secondary CSNs indicates a most recent critical update to the one or more operation parameters for the corresponding secondary communication link of the AP MLD.
34. The method of any one or more of clauses 29-32, where the one or more operation parameters include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.
35. The method of clause 29, where the frame includes one of a beacon frame, a probe response frame, an association response frame, or a reassociation response frame.
36. The method of clause 29, where the change indicator is carried in an initial portion of a beacon frame.
37. The method of clause 29, where the change indicator is carried in a Capability Information field of the frame.
38. The method of clause 37, where the change indicator is carried in a reserved portion of the Capability Information field of the frame.

39. The method of clause 29, where the change indicator is carried in a medium access control (MAC) header of the frame.

40. The method of clause 29, where the change indicator is carried in a physical layer (PHY) preamble of the frame.

41. The method of clause 40, where the change indicator is carried in a signaling field of the PHY preamble.

42. The method of clause 29, where the frame includes a beacon frame, and the change indicator is carried in a field or element preceding a traffic indication map (TIM) element of the beacon frame.

43. The method of clause 29, where the CSN update indicator field further carries one or more secondary change indicators, each secondary change indicator of the one or more secondary change indicators indicating a presence or absence of a change in value of a corresponding secondary CSN of the one or more secondary CSNs.

44. The method of clause 43, where the one or more secondary change indicators are carried in a Capability Information field of the frame.

45. The method of clause 43, where the one or more secondary change indicators are carried in a reserved portion of the Capability Information field of the frame.

46. The method of clause 43, where the one or more secondary change indicators are carried in a medium access control (MAC) header of the frame.

47. The method of clause 43, where the one or more secondary change indicators are carried in a physical layer (PHY) preamble of the frame.

48. The method of clause 47, where the one or more secondary change indicators are carried in a signaling field of the PHY preamble.

49. The method of clause 48, where the frame includes a beacon frame, and the one or more secondary change indicators are carried in a field or element preceding a traffic indication map (TIM) element of the beacon frame.

50. The method of any one or more of clauses 29-49, further including:
incrementing a first CSN counter in the STA of the STA MLD based on the first CSN indicating the presence of the critical update for the first communication link of the AP MLD; and
incrementing one or more secondary CSN counters in the STA of the STA MLD based on the one or more respective secondary CSNs indicating the presence of a critical update for one or more respective secondary communication links of the AP MLD.

51. The method of any one or more of clauses 29-50, where the secondary CSN includes a modulo of a maximum value that can be represented in the CSN update indicator field.

52. The method of any one or more of clauses 29-50, where the frame includes a beacon frame, receiving the frame including:
waking up from a power save mode;
sequentially decoding a plurality of fields or elements of the beacon frame;
determining that the change indicator indicates a change in value of at least one of the first CSN or the one or more secondary CSNs; and
continuing the sequential decoding of the plurality of fields or elements of the beacon frame at least until the first CSN is decoded, irrespective of information carried in a traffic indication map (TIM) element of the beacon frame.

53. The method of any one or more of clauses 29-50, where the frame includes a beacon frame, receiving the frame including:
waking up from a power save mode;
sequentially decoding a plurality of fields or elements of the beacon frame;
determining that the change indicator does not indicate a change in value of the first CSN or the one or more secondary CSNs; and
continuing the sequential decoding of the plurality of fields or elements of the beacon frame until a traffic indication map (TIM) element of the beacon frame is decoded, irrespective of the change indicator.

54. The method of clause 53, further including:
terminating the sequential decoding of the plurality of fields or elements of the beacon frame based on the TIM element indicating an absence of queued downlink (DL) data for the STA MLD, irrespective of whether or not the CSN is decoded.

55. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one of clauses 29-54.

56. A method for wireless communication performed by an access point (AP) multi-link device (MLD) including a first AP associated with a first communication link of the AP MLD and including one or more secondary APs associated with one or more respective secondary communication links of the AP MLD, the method including:
generating a frame by the first AP of the AP MLD, the frame including:
a first change sequence field carrying a value of the most-recent critical update for the first AP of the AP MLD;
one or more secondary change sequence fields carrying values of the most-recent critical updates for the one or more respective secondary APs of the AP MLD; and
a critical update flag subfield carrying an indication of a change in value of at least one of the one or more secondary change sequence fields; and
transmitting the frame over the first communication link of the AP MLD.

57. The method of clause 56, where the most-recent critical update for the first AP corresponds to a change in one or more operation parameters of a basic service set (BSS) associated with the first AP of the AP MLD.

58. The method of clause 57, where the most-recent critical update for a respective secondary AP corresponds to a change in one or more operation parameters of the BSS associated with the respective secondary AP of the AP MLD.

59. The method of any one or more of clauses 56-58, where the one or more operation parameters include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

60. The method of any one or more of clauses 56-59, where the frame is one of a beacon frame, a probe response frame, an association response frame, a reassociation response frame, or a fast initial link setup (FILS) discovery frame.

61. The method of any one or more of clauses 56-60, where the critical update flag subfield is carried in each beacon frame or probe response frame transmitted by the first AP during a time period.

62. The method of clause 61, where the time period is a delivery traffic indication map (DTIM) period.

63. The method of any one or more of clauses 56-62, further including:
transmitting all beacon frames within a delayed traffic indication map (DTIM) period with the value carried in the critical update flag subfield.

64. The method of any one or more of clauses 56-63, where the critical update flag subfield is carried in a Capability Information field of a beacon frame or a probe response frame.

65. The method of any one or more of clauses 56-65, further including:
receiving, by the first AP of the AP MLD, a notification of the critical update for a respective secondary AP of the AP MLD;
incrementing the value carried in the secondary change sequence field associated with the respective secondary AP in response to the notification; and
updating the critical update flag subfield in response to incrementing the value carried in the secondary change sequence field associated with the respective secondary AP.

66. A method for wireless communication performed by a wireless station (STA) of a STA multi-link device (MLD), including:
associating with a first access point (AP) of an AP MLD, the AP MLD further including one or more secondary APs associated with one or more respective secondary communication links of the AP MLD; and
receiving a frame from the first AP over a first communication link of the AP MLD, the frame including:
a first change sequence field carrying a value of the most-recent critical update for the first AP of the AP MLD;
one or more secondary change sequence fields carrying values of the most-recent critical updates for the one or more respective secondary APs of the AP MLD; and
a critical update flag subfield carrying an indication of a change in value of at least one of the one or more secondary change sequence fields.

67. The method of clause 66, where the most-recent critical update for the first AP corresponds to a change in one or more operation parameters of a basic service set (BSS) associated with the first AP of the AP MLD.

68. The method of any one or more of clauses 66-67, where the most-recent critical update for a respective secondary AP corresponds to a change in one or more operation parameters of the BSS associated with the respective secondary AP of the AP MLD.

69. The method of any one or more of clauses 67-68, where the one or more operation parameters include at least one of a channel switch announcement (CSA), an extended CSA, a wide bandwidth CSA, enhanced distributed channel access (EDCA) parameters, multi-user (MU) EDCA parameters, a quiet time element, a direct sequence spread spectrum (DSSS) parameter set, a contention free (CF) parameter set, operating mode (OM) parameters, uplink (UL) orthogonal frequency division multiple access (OFDMA) random access (UORA) parameters, target wait time (TWT) parameters, basic service set (BSS) color change, fast initial link setup (FILS) parameters, spatial reuse (SR) parameters, a high-throughput (HT) operation, a very high-throughput (VHT) operation, a high efficiency (HE) operation, or an extremely high-throughput (EHT) operation.

70. The method of any one or more of clauses 66-69, where the frame is one of a beacon frame, a probe response frame, an association response frame, a reassociation response frame, or a fast initial link setup (FILS) discovery frame.

71. The of any one or more of clauses 66-70, where the critical update flag subfield is carried in a Capability Information field of a beacon frame or a probe response frame.

72. The method of any one or more of clauses 66-71, where the frame is a beacon frame, and receiving the frame includes:
waking up from a power save mode;
sequentially decoding a plurality of fields or elements of the beacon frame;
determining that the critical update flag subfield indicates a change in value of at least one of the first change sequence field or the one or more secondary change sequence fields; and
continuing the sequential decoding of the plurality of fields or elements of the beacon frame at least until the first change sequence field is decoded, irrespective of information carried in a traffic indication map (TIM) element of the beacon frame.

73. An access point (AP) multi-link device (MLD) including a first AP associated with a first communication link of the AP MLD and including one or more secondary APs associated with one or more respective secondary communication links of the AP MLD, the AP MLD including:
at least one modem;
at least one processor communicatively coupled with the at least one modem; and
at least one memory communicatively coupled with the at least one processor and storing processor-readable code that, when executed by the at least one processor in conjunction with the at least one modem, causes the AP MLD to perform operations including:
generating a frame by the first AP of the AP MLD, the frame including:
a first change sequence field carrying a value of the most-recent critical update for the first AP of the AP MLD;
one or more secondary change sequence fields carrying values of the most-recent critical updates for the one or more respective secondary APs of the AP MLD; and a critical update flag subfield carrying an indication of a change in value of at least one of the one or more secondary change sequence fields; and
transmitting the frame over the first communication link of the AP MLD.

74. The AP MLD of clause 73, where the most-recent critical update for the first AP corresponds to a change in one or more operation parameters of a basic service set (BSS) associated with the first AP of the AP MLD.

75. The AP MLD of any one or more of clauses 73-74, where the most-recent critical update for a respective secondary AP corresponds to a change in one or more operation parameters of the BSS associated with the respective secondary AP of the AP MLD.

76. The AP MLD of any one or more of clauses 73-75, where the frame is one of a beacon frame, a probe response frame, an association response frame, a reassociation response frame, or a fast initial link setup (FILS) discovery frame.

77. The AP MLD of any one or more of clauses 73-76, where the critical update flag subfield is carried in each beacon frame or probe response frame transmitted by the first AP during a time period.

78. The AP MLD of any one or more of clauses 73-77, where execution of the processor-readable code by the at least one processor causes the AP MLD to perform operations further including:
transmitting all beacon frames within a delayed traffic indication map (DTIM) period with the value carried in the critical update flag subfield.

79. The AP MLD of any one or more of clauses 73-78, where execution of the processor-readable code by the at least one processor causes the AP MLD to perform operations further including:
receiving, by the first AP of the AP MLD, a notification of the critical update for a respective secondary AP of the AP MLD;
incrementing the value carried in the secondary change sequence field associated with the respective secondary AP in response to the notification; and
updating the critical update flag subfield in response to incrementing the value carried in the secondary change sequence field associated with the respective secondary AP.

80. The AP MLD of any one or more of clauses 73-79, where the critical update flag subfield is carried in a Capability Information field of a beacon frame or a probe response frame.

81. A wireless station (STA) multi-link device (MLD), including:
at least one modem;
at least one processor communicatively coupled with the at least one modem; and
at least one memory communicatively coupled with the at least one processor and storing processor-readable code that, when executed by the at least one processor in conjunction with the at least one modem, causes the STA MLD to perform operations including:
associating with a first access point (AP) of an AP MLD, the AP MLD further including one or more secondary APs associated with one or more respective secondary communication links of the AP MLD, and
receiving a frame from the first AP over a first communication link of the AP MLD, the frame including:
a first change sequence field carrying a value of the most-recent critical update for the first AP of the AP MLD;
one or more secondary change sequence fields carrying values of the most-recent critical updates for the one or more respective secondary APs of the AP MLD; and
a critical update flag subfield carrying an indication of a change in value of at least one of the one or more secondary change sequence fields.

82. The STA MLD of clause 81, where the most-recent critical update for the first AP corresponds to a change in one or more operation parameters of a basic service set (BSS) associated with the first AP of the AP MLD.

83. The STA MLD of any one or more of clauses 81-82, where the most-recent critical update for a respective secondary AP corresponds to a change in one or more operation parameters of the BSS associated with the respective secondary AP of the AP MLD.

84. The STA MLD of any one or more of clauses 81-83, where the critical update flag subfield is carried in a Capability Information field of a beacon frame or a probe response frame.

85. The STA MLD of any one or more of clauses 81-84, where the frame is a beacon frame, and receiving the frame includes:
waking up from a power save mode;
sequentially decoding a plurality of fields or elements of the beacon frame;
determining that the critical update flag subfield indicates a change in value of at least one of the first change sequence field or the one or more secondary change sequence fields; and
continuing the sequential decoding of the plurality of fields or elements of the beacon frame at least until the first change sequence field is decoded, irrespective of information carried in a traffic indication map (TIM) element of the beacon frame.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus for wireless communication corresponding to an access point (AP) multi-link device (MLD) comprising a first AP in association with a first communication link of the AP MLD, comprising:
   at least one processor; and
   at least one memory coupled with the at least one processor and storing instructions executable by the at least one processor to cause the apparatus to:
      generate a frame by the first AP, the frame comprising:
         a first change counter field carrying an incremental counter value in association with a most-recent critical update for the first AP;
         a capability information field carrying a first bit in association with a first critical update indicating a first change in value of the first change counter field for the first AP and a second bit in association with a second critical update indicating a second change in value of a second change counter field for a second AP different than the first AP; and
         a reduced neighbor report comprising the second change counter field carrying a second incremental counter value in association with a second most-recent critical update for the second AP; and
      transmit the frame via the first communication link from the first AP.

2. The apparatus of claim 1, wherein the first AP corresponds to a first Basic Service Set Identifier (BSSID) and the second AP corresponds to a second BSSID different than the first BSSID.

3. The apparatus of claim 1, wherein the frame further includes a first set of operation parameters in association with the most-recent critical update for the first AP.

4. The apparatus of claim 1, wherein the second change counter field indicates a change to a Basic Service Set (BSS) parameter in association with the second AP.

5. The apparatus of claim 1, wherein the frame further includes a second set of operation parameters in association with the second most-recent critical update for the second AP.

6. The apparatus of claim 5, wherein the second set of operation parameters comprises one or more of a channel switch announcement, an extended channel switch announcement, or a quiet time element.

7. The apparatus of claim 1, wherein the frame is one of a beacon frame, a probe response frame, an association response frame, a reassociation response frame, or a fast initial link setup (FILS) discovery frame.

8. An apparatus for wireless communication corresponding to a wireless station (STA) of a STA multi-link device (MLD), comprising:
   at least one processor; and
   at least one memory coupled with the at least one processor and storing instructions executable by the at least one processor to cause the apparatus to:
      associate with a first access point (AP) of an AP MLD; and
      receive a frame from the first AP via a first communication link of the AP MLD, the frame comprising:
         a first change counter field carrying an incremental counter value in association with a most-recent critical update for the first AP;
         a capability information field carrying a first bit in association with a first critical update indicating a first change in value of the first change counter field for the first AP and a second bit in association with a second critical update indicating a second change in value of a second change counter field for a second AP different than the first AP; and
         a reduced neighbor report comprising the second change counter field carrying a second incremental counter value in association with a second most-recent critical update for the second AP.

9. The apparatus of claim 8, wherein the first AP corresponds to a first Basic Service Set Identifier (BSSID) and the second AP corresponds to a second BSSID different than the first BSSID.

10. The apparatus of claim 8, wherein the frame further includes a first set of operation parameters in association with the most-recent critical update for the first AP.

11. The apparatus of claim 8, wherein the second change counter field indicates a change to a Basic Service Set (BSS) parameter in association with the second AP.

12. The apparatus of claim 8, wherein the frame further includes a second set of operation parameters in association with the second most-recent critical update for the second AP.

13. The apparatus of claim 12, wherein the second set of operation parameters comprises one or more of a channel switch announcement, an extended channel switch announcement, or a quiet time element.

14. The apparatus of claim 8, wherein the frame is one of a beacon frame, a probe response frame, an association response frame, a reassociation response frame, or a fast initial link setup (FILS) discovery frame.

15. A method for wireless communication performed by an access point (AP) multi-link device (MLD) comprising a first AP in association with a first communication link of the AP MLD, the method comprising:
  generating a frame by the first AP, the frame comprising:
    a first change counter field carrying an incremental counter value in association with a most-recent critical update for the first AP;
    a capability information field carrying a first bit in association with a first critical update indicating a first change in value of the first change counter field for the first AP and a second bit in association with a second critical update indicating a second change in value of a second change counter field for a second AP different than the first AP; and
    a reduced neighbor report comprising the second change counter field carrying a second incremental counter value in association with a second most-recent critical update for the second AP; and
  transmitting the frame via the first communication link from the first AP.

16. The method of claim 15, wherein the first AP corresponds to a first Basic Service Set Identifier (BSSID) and the second AP corresponds to a second BSSID different than the first BSSID.

17. The method of claim 15, wherein the frame further includes a first set of operation parameters in association with the most-recent critical update for the first AP.

18. The method of claim 15, wherein the second change counter field indicates a change to a Basic Service Set (BSS) parameter in association with the second AP.

19. The method of claim 15, wherein the frame further includes a second set of operation parameters in association with the second most-recent critical update for the second AP.

20. The method of claim 19, wherein the second set of operation parameters comprises one or more of a channel switch announcement, an extended channel switch announcement, or a quiet time element.

* * * * *